(12) United States Patent
Rieffanaugh, Jr.

(10) Patent No.: US 9,165,269 B2
(45) Date of Patent: *Oct. 20, 2015

(54) DYNAMIC METHOD FOR COLLECTING, TRACKING, STORING, AND REPORTING OF DEVELOPMENT EVENT EFFORTS

(76) Inventor: Neal King Rieffanaugh, Jr., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/609,123

(22) Filed: Sep. 10, 2012

(65) Prior Publication Data

US 2013/0067369 A1  Mar. 14, 2013

Related U.S. Application Data

(63) Continuation-in-part of application No. 13/199,862, filed on Sep. 12, 2011, now Pat. No. 8,880,550, and a continuation-in-part of application No. 13/342,935, filed on Jan. 3, 2012, now Pat. No. 8,880,460, and a continuation-in-part of application No. 13/350,680, filed on Jan. 13, 2012, now Pat. No. 8,825,607.

(60) Provisional application No. 61/403,121, filed on Sep. 11, 2010, provisional application No. 61/460,360, filed on Dec. 31, 2010, provisional application No. 61/461,091, filed on Jan. 13, 2011.

(51) Int. Cl.
*G06F 7/00* (2006.01)
*G06F 17/30* (2006.01)
*G06Q 10/06* (2012.01)
*G06F 17/16* (2006.01)

(52) U.S. Cl.
CPC .............. *G06Q 10/06* (2013.01); *G06F 17/16* (2013.01); *G06F 17/30011* (2013.01); *G06F 17/30061* (2013.01); *G06F 17/30064* (2013.01)

(58) Field of Classification Search
CPC ... G06F 17/30; G06F 17/00; G06F 17/30014; G06F 17/30607; G06F 17/30882; G06F 17/30855
USPC .................................................. 707/722, 769
See application file for complete search history.

(56) References Cited

U.S. PATENT DOCUMENTS

| | | | | |
|---|---|---|---|---|
| 5,537,524 | A * | 7/1996 | Aprile | 345/440 |
| 6,036,345 | A * | 3/2000 | Jannette et al. | 700/97 |
| 7,908,167 | B1 * | 3/2011 | Crum et al. | 705/7.38 |
| 2007/0038977 | A1 * | 2/2007 | Savage | 717/106 |
| 2009/0006467 | A1 * | 1/2009 | Visscher | 707/103 Y |
| 2011/0295643 | A1 * | 12/2011 | Miller et al. | 705/7.23 |

* cited by examiner

*Primary Examiner* — Tony Mahmoudi
*Assistant Examiner* — Merilyn Nguyen

(57) ABSTRACT

A live dynamic real time method for collecting, tracking, storing, and reporting development event efforts embodied as a method for tracking Element Efforts resulting in end products, at least including art, industry, and nature products, and reporting Development Event Efforts by their virtual Points in Phasetime (PiPT) within designated Past, Present, and Future Project Development Phases. Dynamically generated Phasetime Reports display audited Element Project Efforts within a live Phasetime Matrix per their Phase of Development and PiPT. Development Events occur within Project Development Phases, whose number and kind are end product dependent. Development Events include Project Production Elements, Element Efforts, duration of the Efforts, and Efforts' PiPT. Tracked by Phasetime Project Development Event Instances, Element Efforts are reported in edited Storyboard Beats in Phasetime Macro, Micro, and Nano Views depicting the Efforts' effect on the end Product's Storyline. Effortology keys allow browsers to alter Storyboard Storyline Reports.

7 Claims, 60 Drawing Sheets

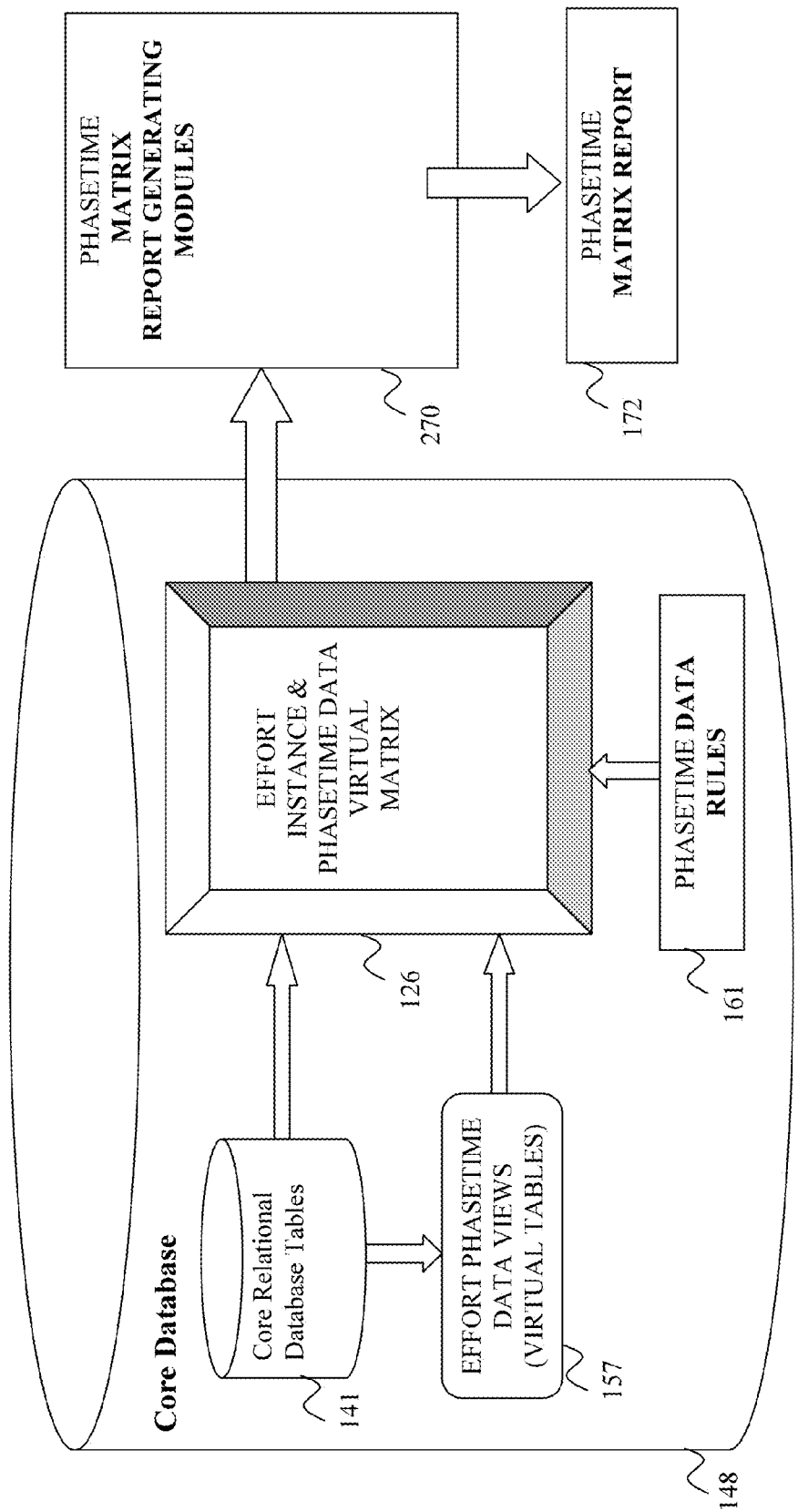

DVIVD Logic Data Flow Diagram

DVIVD Event Data Match Audit Recorder Working Panel Components Diagram

FIG. 20 DVIVD Event. Data Match Audit [5 Star] Recorder w/ Primary Level #1 CPEI

DVIVD Event Data Match Audit Recorder

HEADER SECTION

CPEI Owner Name: [Owner Name] ~ 352'
CPEI Owner ID: [CPEI Owner ID] ~ 191'
Primary CPEI ID: [CPEI ID#]
Primary CPEI Media Category: [Media Category]

☒ Registered ☐ Non Registered

5 STAR EVENT DATA RECORDER SECTION ~ 192'

01/10/2008 — One Element: Validated and Verified ☆

[Date] — Two Elements: Validated and Verified ☆ ☆

[Date] — Three Elements: Validated and Verified ☆ ☆ ☆

[Date] — Four Elements: Validated and Verified ☆ ☆ ☆ ☆

[Date] — Five Elements: DVIVD System Certified ☆ ☆ ☆ ☆ ☆

DVIVD MATCH AUDIT TESTING & FORMULAIC DATA FIELD ANALYSIS

CPEI AUDIT #1 AND AUDIT #2 DATA MATCH TESTING SECTION ~ 194'

ELEMENT OWNER AND CPEI DATA FIELD AUDIT REPORT SECTION ~ 196'

Element Owner and CPEI Data Field Audit Report Section

DVIVD Event Data Match Audit Testing Component Flow Chart

Secondary and Tertiary CPEI Display

---

Secondary Efforts

"Holden Cutterfly" (Performing Artist: Nariah Darey), Album (3 Min. 45 Sec.): R & B – 10/15/2005: Vniversal Records
- Nichael Tchlesinger: Mixed
  - Harry Blevins, Manager (2/1/05-2/15/05) ✓ ~240'

Tertiary Efforts

"Holden Cutterfly" (Performing Artist: Nariah Darey), Album (3 Min. 45 Sec.): R & B – 10/15/2005: Vniversal Records
- Nichael Tchlesinger: Mixed
  - Harry Blevins: Manager > John Tandy, Attorney (2/1/05-2/15/05) ✓

Secondary Efforts

"Holden Cutterfly" (Performing Artist: Nariah Darey), Album (3 Min. 45 Sec.): R & B – 10/15/2005: Vniversal Records
- Nichael Tchlesinger: Mixed
  - Harry Blevins, Manager (2/1/05-2/15/05) ★ ~241'

Tertiary Efforts

"Holden Cutterfly" (Performing Artist: Nariah Darey), Album (3 Min. 45 Sec.): R & B – 10/15/2005: Vniversal Records
- Nichael Tchlesinger: Mixed
  - Harry Blevins: Manager > John Tandy, Attorney (2/1/05-2/15/05) ★

Auto CPEI and Auto Inference Association Displays

DYNAMIC METHOD FOR COLLECTING, TRACKING, STORING, AND REPORTING OF DEVELOPMENT EVENT EFFORTS

CROSS REFERENCE OF RELATED APPLICATION

This is a Continuation-In-Part application claims the benefit of priority under 35 U.S.C. §119 to a non-provisional application, application Ser. No. 13/199,862, filing date Sep. 12, 2011, which is non-provisional application of a provisional application having an application No. 61/403,121 and a filing date of Sep. 11, 2010; a non-provisional application, application Ser. No. 13/342,935, filing date Jan. 3, 2012, which is a non-provisional application of a provisional application having an application No. 61/460,360 and a filing date of Dec. 31, 2010; and a non-provisional application, application Ser. No. 13/350,680, filing date Jan. 13, 2012 which is a non-provisional application of a provisional application having an application No. 61/461,091 and a filing date of Jan. 13, 2011.

BACKGROUND OF THE PRESENT INVENTION

1. Field of Invention

The present invention is related to a dynamic method for collecting, tracking, storing, and reporting of development event efforts, and particular to a dynamic method for collecting, tracking, storing, and reporting of development event efforts, wherein the method is as to their Points in phasetime within a phase of development of a product, regardless if those efforts are energies expended by elements comprising any one or more animal, vegetable or mineral substance or matter, and regardless of the nature of the product, wherein the method is a dynamic dual audit method for auditing element effort event data utilizing a DVIVD event data match audit recorder, assigning audit levels to the element effort event data, and generating audited reports of the element efforts, wherein the method is a dynamic live computer-based database formula method operated in an infrastructure search system which, when queried, conjoins project effort instance report data from formula input and stored data, into well formatted functional interaction designed rated CPEI displays that hyperlink element Primary, Secondary, Tertiary, Auto Efforts and Auto Inference Associations to CPEI associations, whether or not efforts are credited by a project owner and whether or not efforts are inputted by an element or generated from other inputted effort event data automatically.

2. Description of Related Arts

In U.S. Pat. No. 7,034,78, it includes a reference to phasetime in an unrelated field and its method has no relevance to the method of the present invention.

SUMMARY OF THE PRESENT INVENTION

The present invention provides a dynamic method for collecting, tracking, storing, and reporting of development event efforts. In one embodiment, a phasetime tracking and reporting processes and systems is disclosed which relates to scientifically gathering, storing and reporting of Element Effort Phasetime Data in a Product's Development as a Project flows through its development Phases of Production, which data is then dynamically reported by the system according to the system's Points in Phasetime process.

The present invention provides a dynamic method for collecting, tracking, storing, and reporting of development event efforts. In one embodiment, the method is directed to a dynamic live dual audit system and its first and second dual audit tests recorded in real time by the method's DVIVD 5 Star Event Data Match Audit Recorder which displays audited CPEI Match and Mismatch Reports and Mismatch audit data System location. The DVIVD Match Audit System and 5 Star Event Data Recorder System Thereof insures audited reports are as inputted by the system auditor and are validated and independently verified CPEI Element Effort Event Data displays whether said data is inputted by an Element Effort Owner or generated by the System automatically from other Element inputted effort event data.

BRIEF DESCRIPTION OF DRAWINGS

FIG. 4B is a Effort Instance & Phasetime Data Virtual Matrix drawing illustrating how Effort Instance and Phasetime Data in the Core Database is processed by the Effort Instance & Phasetime Data Virtual Matrix and how the Phasetime Matrix Report is generated by the Phasetime Matrix Report Generating Modules according to the Phasetime Data Rules, according to the above preferred embodiment of the present invention.

FIG. 20 is a visual representation of the DVIVD Event Data Match Audit Recorder according to the above preferred embodiment of the present invention.

FIGS. 25A-25D illustrate example of a report displaying a Secondary Effort and a Tertiary Effort according to the above preferred embodiment of the present invention.

DETAILED DESCRIPTION OF PREFERRED EMBODIMENT

Figure 1:
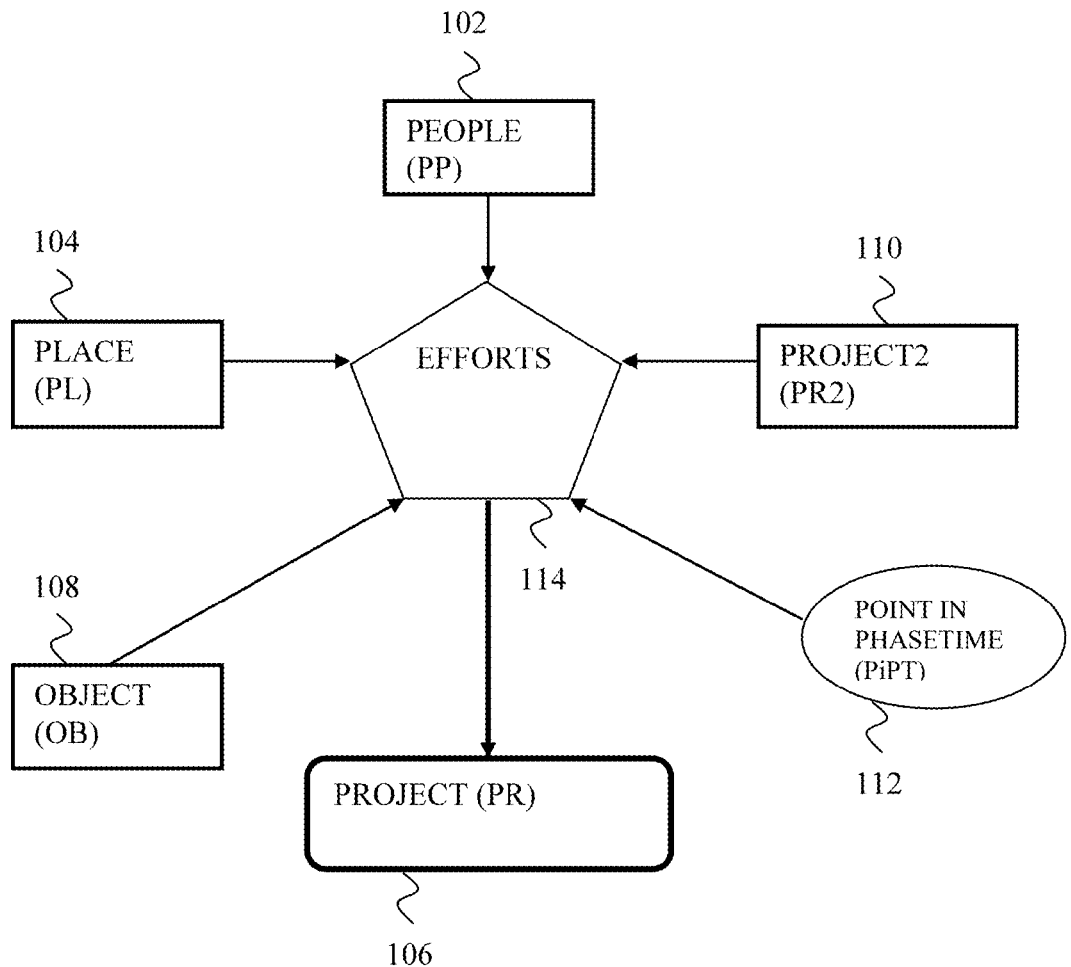
FIG. 1 is an Element Drawing illustrating the Elements and the Elements' Efforts on a Project that form Effort Instances within the "Point in Phasetime Method and System Thereof" according to a preferred embodiment of the present invention.

Referring to the drawings of the invention, a dynamic method for collecting, tracking, storing, and reporting of development event efforts is illustrated. It is understood that the components could be designed, arranged and developed in a myriad of configurations not displayed. It is also understood that the following detailed description of the present invention as referenced in the drawings are not intended to limit the scope of the present invention as claimed, but is only for illustration of the preferred embodiment of the present invention.

The present preferred embodiment of the invention will best be understood by reference to the drawings, wherein like parts are designated by like numerals throughout.

Figure 2:
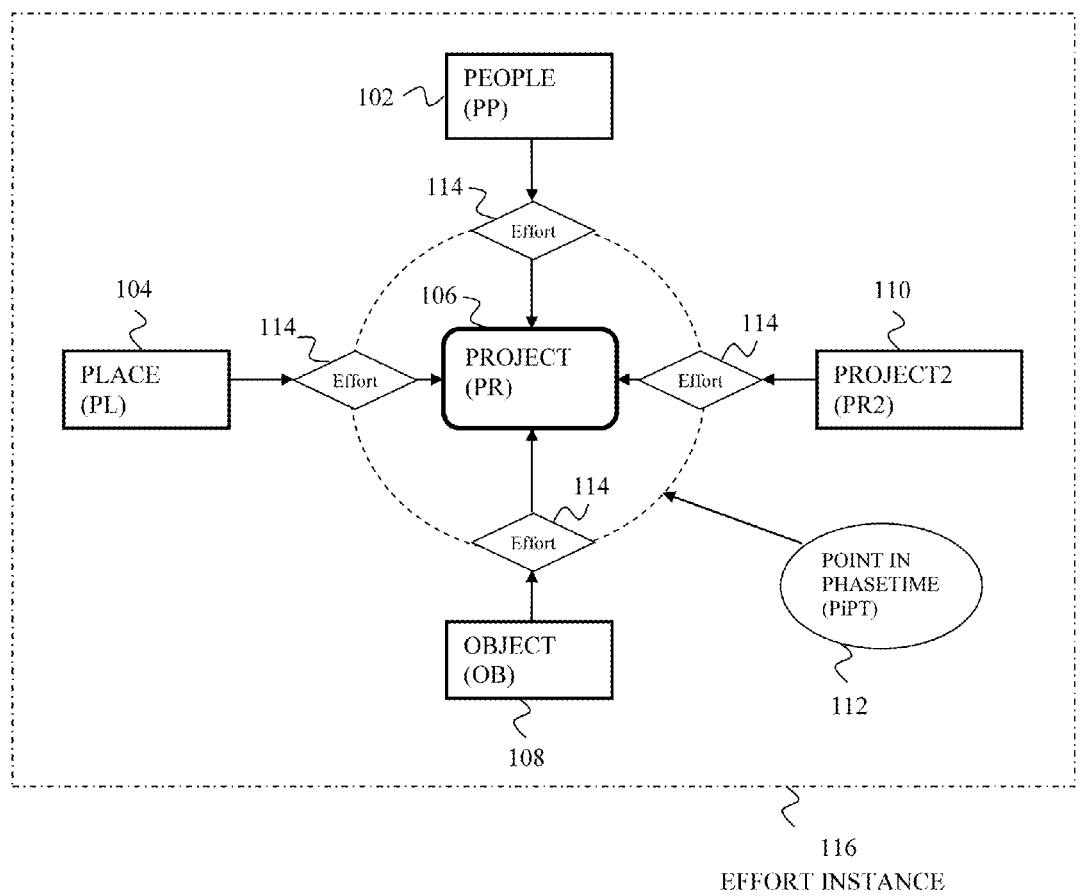
FIG. 2 is a Points in Phasetime Effort Instance Drawing that details the significance of the Effort values in the association of Elements according to the "Point in Phasetime Method and System Thereof" and establishes the core building blocks of an Effort Instance and Phasetime Data Virtual Matrix, according to the above preferred embodiment of the present invention.
Figure 4A:
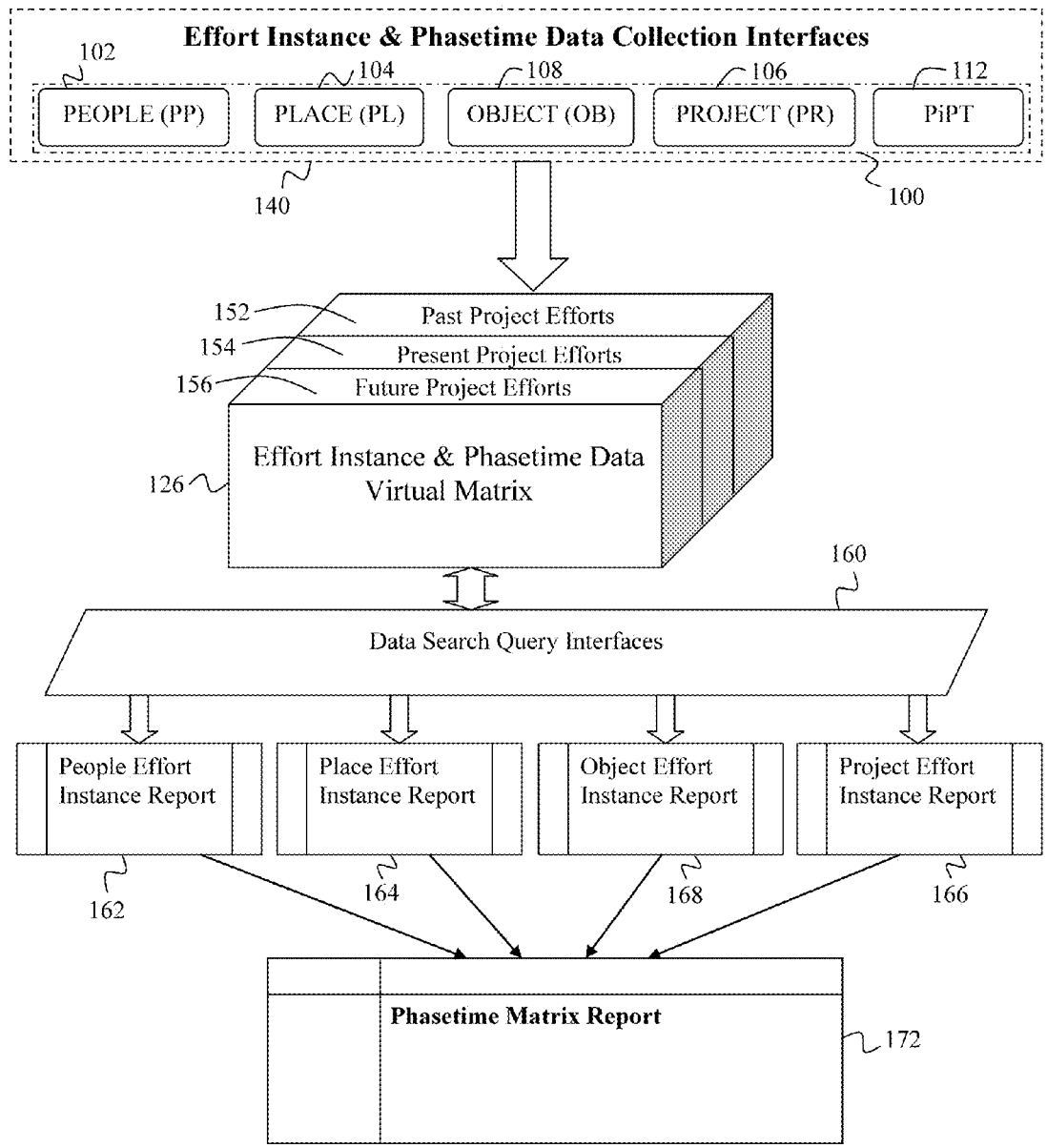
FIG. 4A is a Effort Instance & Phasetime Data Drawing illustrating the Effort Instance & Phasetime Data Collection Interfaces and the Data Search Query Interfaces which result in the Element Report data reflected in the Phasetime Matrix Report, according to the above preferred embodiment of the present invention.

Referring to FIGS. 1, 2 and 4A, a Point In Phasetime Method and System Thereof of the dynamic method for collecting, tracking, storing, and reporting of development event efforts of a preferred embodiment of the present invention is illustrated, which comprises an Effort Instances 116, as shown in FIG. 2, which are constructed of an Elements 100, as shown in FIG. 4A, that are associated to one another via an Effort 114 on a Project (PR) 106 at a Point In Phasetime (PiPT) 112.

Elements 100 are preferred to include, but are not limited to, a Project (PR) 106, a People (PP) 102, a Places (PL) 104, an object (OB) 108, a Project2 (PR2) 110, and a Point in Phasetime 112.

Figure 3:
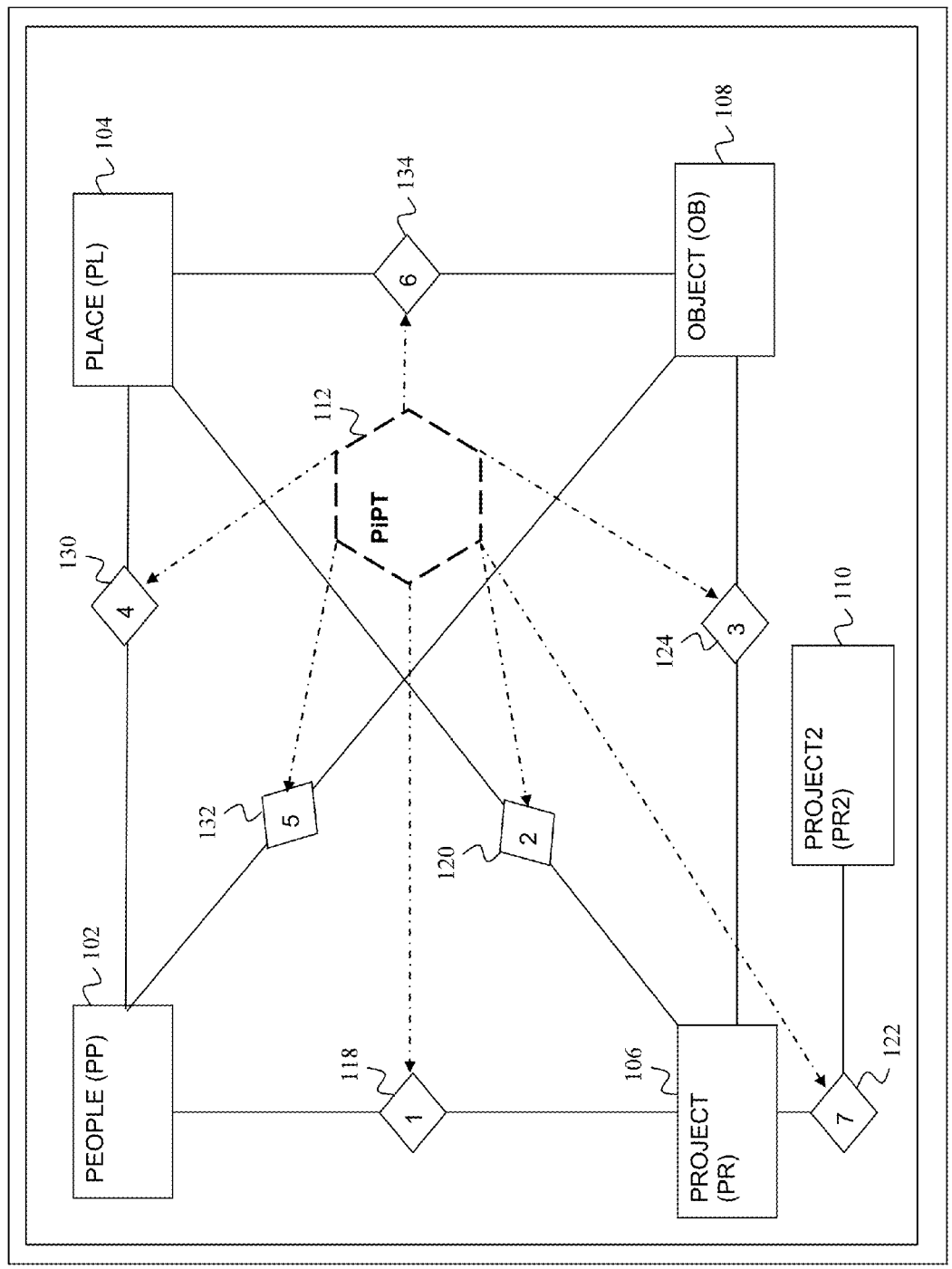
FIG. 3 is a Points in Phasetime Effort Instance Association Structure Drawing that defines the associative characteristics of the "Point in Phasetime Method and System Thereof" as it relates to an Effort Instance and Phasetime Data Virtual Matrix, according to the above preferred embodiment of the present invention.

The Project (PR) 106 requires Element 100 on which all other Elements 100 have Efforts 114. The People (PP) 102 of the Element 100 who has Effort 114, referred to as a Role 118 as shown in FIG. 3, on Project (PR) 106. The Places (PL) 104 of the Element 100 has Effort 114, referred to as Services 120 as shown in FIG. 3, on Project (PR) 106. The Object (OB) 108 of the Element 100 has Effort 114, referred to as a Utilization 124, on Project (PR) 106. The Project2 (PR2) 110 is another Project 106 Element 100 which has Effort 114, referred to as a Contribution 122 as shown in FIG. 3, on Project (PR) 106. The Point in Phasetime 112 of the virtual Element 100 defines the point within a phasetime at which an Element's 100 Effort 114 occurred on Project (PR) 106 as shown in FIG. 2.

In FIG. 1, the Effort 114 values represent an exertion (or use of energy) expended on the Project (PR) 106 by the Element 100 in the development of an end product. The Effort 114 values tie the Element 100 to the Project 106 based on the particular perspective of the Element 100 according to the following:

People (PP) 102 Effort 114 on Project (PR) 106=Role 118 Value

Places (PL) 104 Effort 114 on Project (PR) 106=Services 120 Value

Project2 (PR2) 110 Effort 114 on Project (PR) 106=Contribution 122 Value

Object (OB) 108 Effort 114 on Project (PR) 106=Utilization 124 Value

FIG. 2 illustrates the significance of Effort 114 values in the association of the Elements 100 according to the "Point in Phasetime Method and System Thereof" according to the preferred embodiment of the present invention and establishes the core building blocks of an Effort Instance and Phasetime Data Virtual Matrix 126 as shown in FIG. 4A.

Both FIG. 1 and FIG. 2 illustrate that the "Point in Phasetime Method and System Thereof" comprises the Effort Instances 116, wherein the Effort Instances 116 are constructed of the Elements 100 associated to one another via their the Effort 114 on the Project (PR) 106 at the Point In Phasetime (PiPT) 112.

FIG. 2 builds on this principle by defining that the Points of Phasetime 112 indicate "when" all of the Elements 100 exerted their the Efforts 114 on the Project (PR) 106, wherein each of the Elements 100 are related to one another through their association to the Project (PR) 106 during the shared the Point in Phasetime 112. The shared commonality of the Point in Phasetime 112 with the Elements 100 in their association to the Project (PR) 106 is the binding principle that allows for an Effort Instance and Phasetime Data Virtual Matrix 126.

FIG. 3 defines the associative characteristics of the "Point in Phasetime Method and System Thereof" of the preferred embodiment of the present invention as it relates to the Effort Instance and Phasetime Data Virtual Matrix 126.

FIG. 2 illustrates that the "Point in Phasetime Method and System Thereof" of the preferred embodiment of the present invention comprises the Effort Instances 116 which are constructed of the Elements 100 that are associated to one another via the Efforts 114 on the Project (PR) 106 thereof at the Point in Phasetime 112. FIG. 3 further establishes the relevancy of the Point in Phasetime 112, as a virtual fifth Element 100, being a necessary component in the association of all the Elements 100 to one another.

Figure 6:
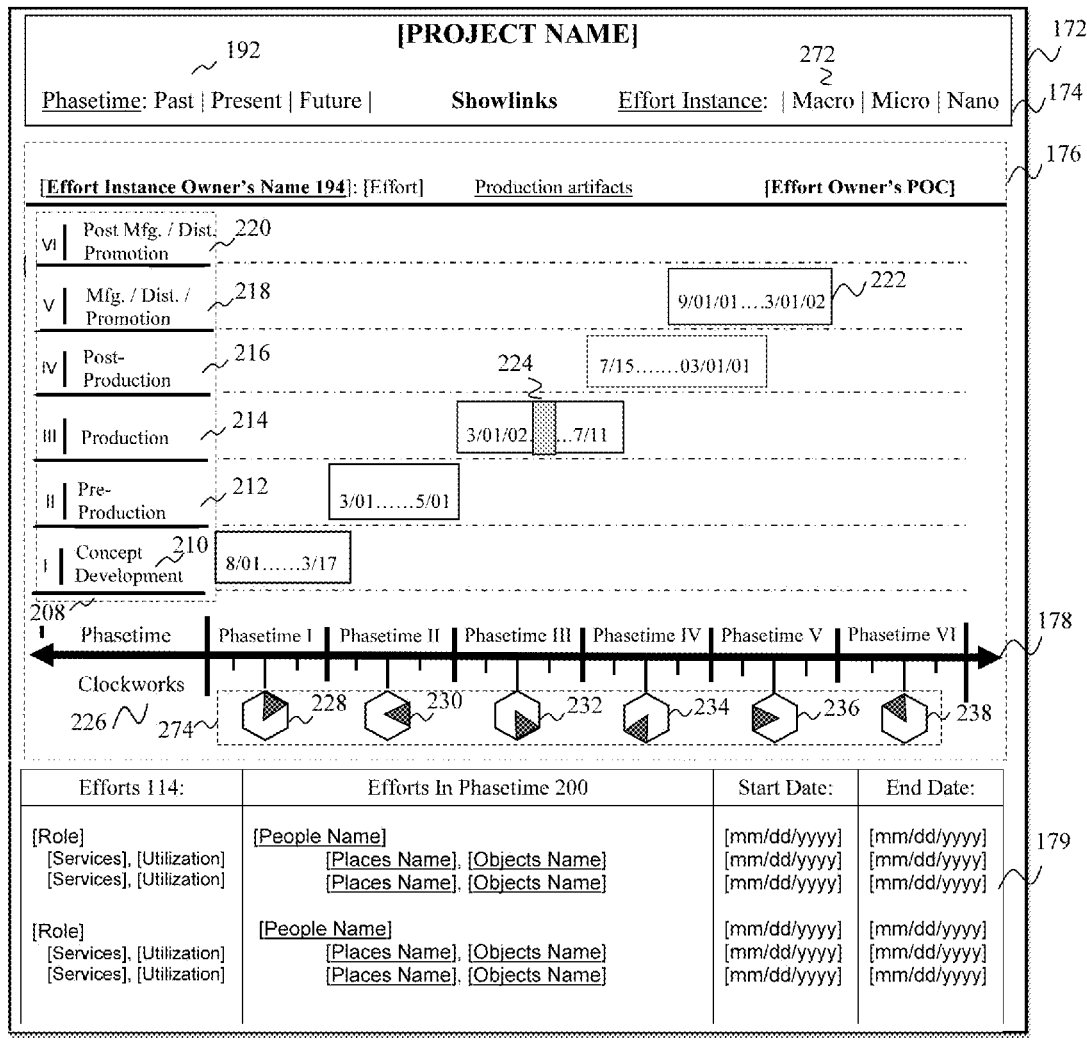
FIG. 6 is a Phasetime Matrix Drawing illustrating the reporting capabilities of the "Point in Phasetime Method and System Thereof" as related to the display of an Effort Instance Owner's Effort Instance Report, according to the above preferred embodiment of the present invention.

Specifically, the Effort Instance and Phasetime Data Virtual Matrix 126 dictates that the following associations can be made between the Elements 100 within the "Point in Phasetime Method and System Thereof" of the preferred embodiment of the present invention, wherein the Point in Phasetime 112 value represents the point in a Phases of Development 208 as shown in FIG. 6 at which the association occurs:

[1] the Role 118 is a People to Project Association Role 118=Associative value Role 118 that defines "what the People (PP) 102 did on the Project (PR) 106" at the Point In Phasetime (PiPT) 112.

[2] the Services 120 are Places to Project Association Services 120=Associative value Services 120 that defines "what the Places (PL) 104 did on the Project (PR) 106" at the Point in Phasetime (PiPT) 112.

[3] the Utilization 124 is an Object to Project Association Utilization 124=Associative value Utilization 124 that defines "what the Object (OB) 108 did on the Project (PR) 106" at the Point In Phasetime (PiPT) 112.

[4] a People to Places Association 130=Associative value that ties the People (PP) 102 to the Places (PL) 104 at the Point In Phasetime (PiPT) 112.

[5] a People to Objects Association 132=Associative value that ties the People (PP) 102 to the Objects (OB) 108 at the Point In Phasetime (PiPT) 112.

[6] a Places to Objects Association 134=Associative value that ties the Places (PL) 104 to the Objects (OB) 108 at the Point In Phasetime (PiPT) 112.

[7] a Project2 to Project Association=Associative value Contribution 122 that defines "what the Project2 (PR2) 110 did on the Project (PR) 106" at the Point in Phasetime (PiPT) 112.

FIG. 4A illustrates both the Effort 114 data collection and the Effort 114 data reporting capabilities of the "Point in Phasetime Method and System Thereof".

Figure 8:
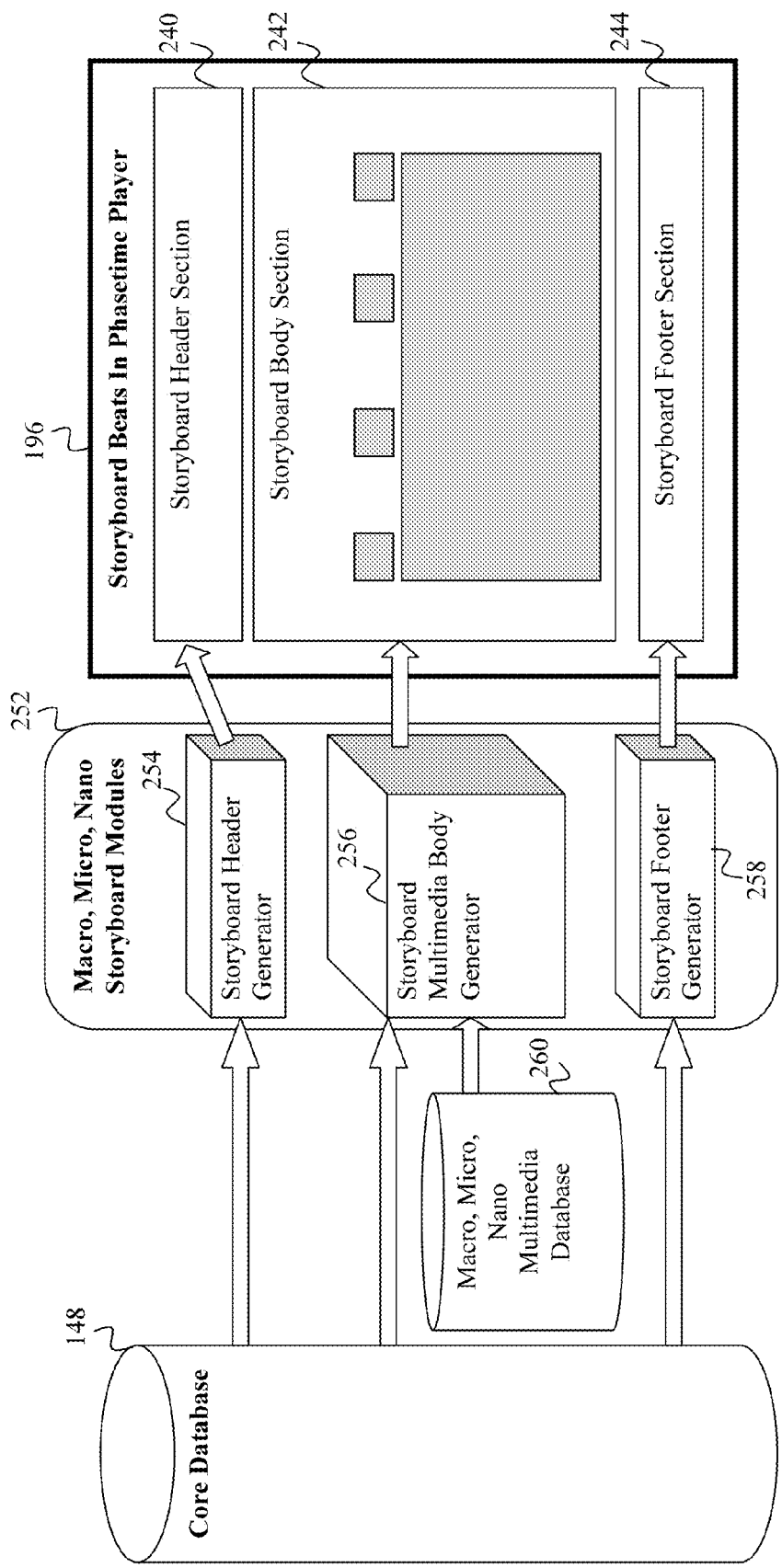
FIG. 8 is a Phasetime Multi-Event Storyboard Logic Data Flowchart drawing that delineates the System parameters used to generate Storyboard Beats in Phasetime data from the Point in Phasetime data in the Core Database, according to the above preferred embodiment of the present invention.
Figure 9:
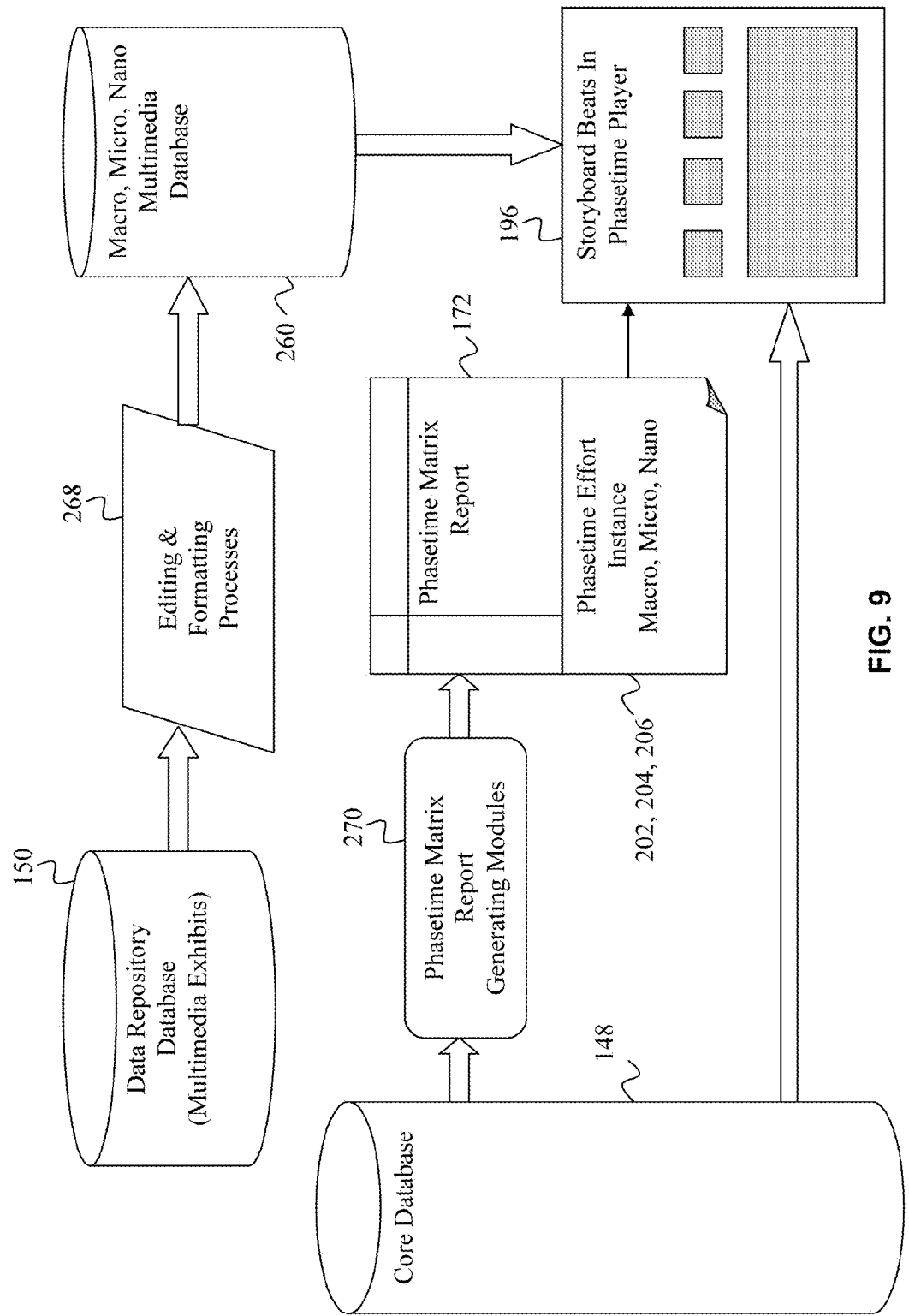
FIG. 9 is an Effort Instance Macro, Micro, and Nano Logic Data Flowchart that details the System databases and reporting modules used by the "Point in Phasetime Method and System Thereof" in the generation of the Phasetime Matrix Report and the Storyboard Beats in Phasetime, according to the above preferred embodiment of the present invention.

The Element 100 data, Effort Instance 116 data and Point in Phasetime 112 data are collected utilizing an Effort Instance and Phasetime Data Collection Interfaces 140 which includes Data collection forms, Data validation and verification interfaces and processes, and Data reporting interfaces and processes enabling migration of data from a Data Repository Database 150 as shown in FIG. 9 to a Core Database 148 as shown in FIG. 8.

As defined by FIGS. 1, 2, and 3, the "Point in Phasetime Method and System Thereof" of the preferred embodiment of the present invention comprises the Effort Instances 116 which are constructed of the Elements 100 that are associated to one another via their Efforts 114 on the Project (PR) 106 within the Point In Phasetime (PiPT) 112. According to FIG. 4, the Effort Instances 116 are stored in a Core Database 148 and processed by the Effort Instance and Phasetime Data Virtual Matrix 126.

The Point in Phasetime (PiPT) 112 values are particularly important in the "Point in Phasetime Method and System Thereof" of the preferred embodiment of the present invention as they delineate when events and associations, occur. They also have the ability to define:

A Past Project Efforts 152—Those Effort Instances 116 that define associations to and the Efforts 114 on the Project (PR) 106 that has been released as a Published Product 304.

A Present Project Efforts 154—Those Effort Instances 116 that define associations to and the Efforts 114 on the Project (PR) 106 that are currently in a Production 214 and have a contracted release date.

A Future Project Efforts 156—Those Effort Instances 116 that define associations to and the Efforts 114 on the Project (PR) 106 that have a contracted release date but are not yet in the Production 214.

The Effort Instance 116 and the Point in Phasetime 112 data are generated from the Core Database 148 by the Effort Instance and Phasetime Data Virtual Matrix 126 in response to data search queries executed from a Data Search Query Interfaces 160, wherein the following dynamic Effort Instance 116 reports are the result of data search queries:

A People Effort Instance Report 162—A report from People (PP) 102 perspective that details Effort Instance 116 data, Elements 100, Associations 130 132 134, Efforts 114, and Point in Phasetime 112.

A Places Effort Instance Report 164—A report from Places (PL) 104 perspective that details the Effort Instance 116 data, Elements 100, Associations 130 132 134, Efforts 114, and Point in Phasetime 112.

A Projects Effort Instance Report 166—A report from Projects (PR) 106 perspective that details Effort Instance 116 data, Elements 100, Associations 130 132 134, Efforts 114, and Point in Phasetime 112.

An Objects Effort Instance Report 168—A report from Objects (OB) 108 perspective that details Effort Instance 116 data, Elements 100, Associations 130 132 134, Efforts 114, and Point in Phasetime 112.

FIG. 4A details that Phasetime Matrix Reports 172 can be accessed from the queried Effort Instance Reports 162, 164, 166, 168. The Phasetime Matrix Reports 172 can display, but are not limited to, the following:

A Section 1: a Header 174
A Section 2: a Phasetime Matrix 176
An Arrow of a Phasetime X Axis 178
A Section 3: an Effort Instance PiPT Window 179

FIG. 4A details that the Effort Instance & Phasetime Data Virtual Matrix 126 comprises a multiple Effort Phasetime Data View (Virtual Tables) 157, a Relational Database Tables 141, and a Phasetime Data Rules 161.

Accordingly, FIG. 4B establishes that the Core Database 148 comprises the Core Relational Database Tables 141 which include, but not limited to, the following:

Element 100 tables including People (PP) 102 tables, Places (PL) 104 tables, Projects (PR) 106 tables, and Objects (OB) 108 tables,
Element 100 relational data tables, Element 100 association data tables,
Valid value tables (look-up tables).

FIG. 4B also details that the Core Database 148 comprises the Effort Phasetime Data Views (Virtual Tables) 157 which are defined as foundational data modules (views) that are used by the Effort Instance & Phasetime Data Virtual Matrix 126 to generate the Phasetime Matrix Reports 172 based on the Phasetime Data Rules 161. The Phasetime Matrix Reports 172 are output from the Core Database 148 by Phasetime Matrix Report Generating Modules 270.

FIG. 4B further establishes that the Phasetime Data Rules 161 include, but are not limited to the following:

Rules for the Efforts 114 and the Effort Instances 116
Rules for the Past Project Efforts 152
Rules for the Present Project Efforts 154
Rules for the Future Project Efforts 156

Figure 4C:
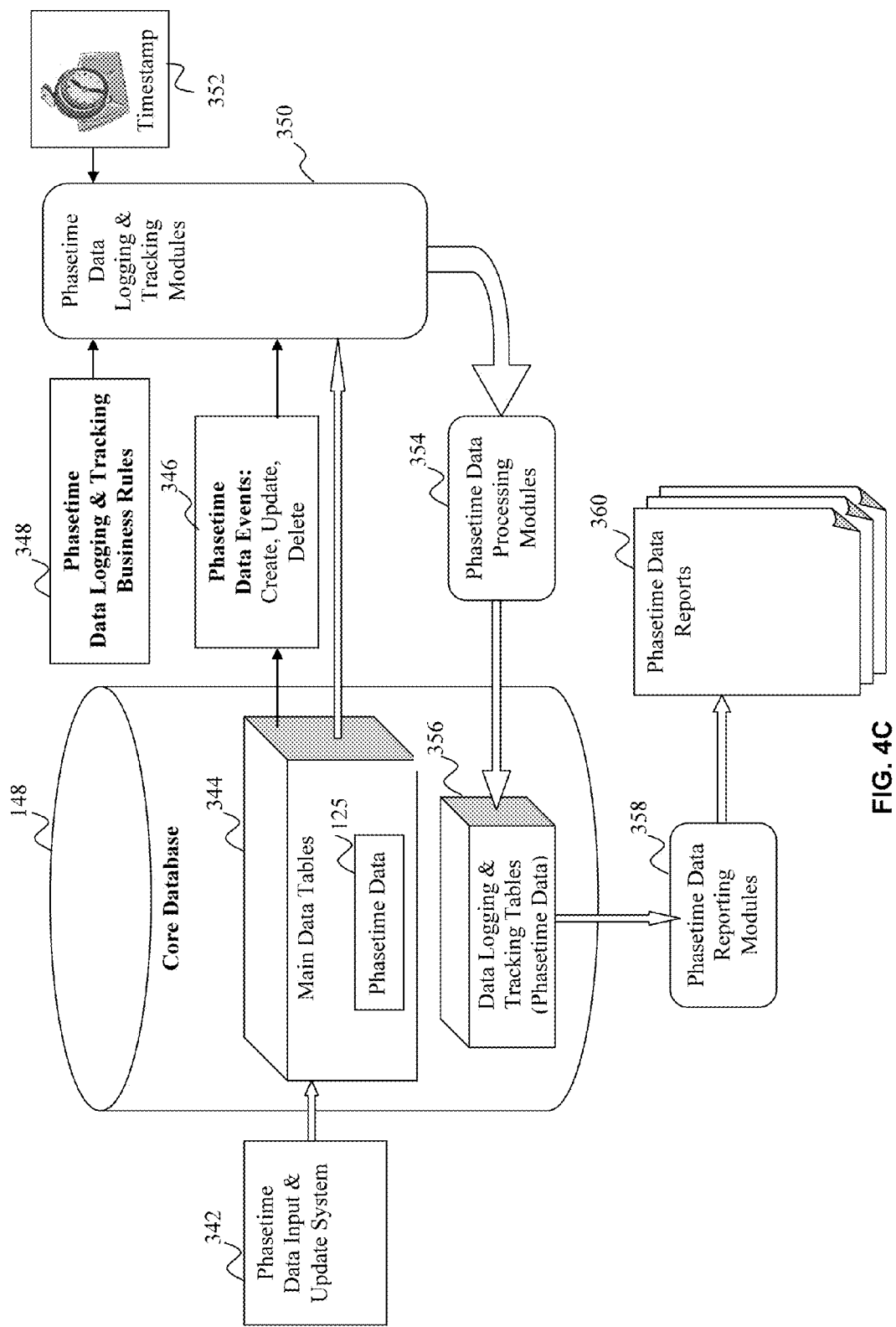
FIG. 4C is a Phasetime Data Logging & Tracking System drawing illustrating that the Point in Phasetime System is designed to log and track important Phasetime Data in the System's Databases, according to the above preferred embodiment of the present invention.

FIG. 4C illustrates the System processes used to log and track important the Phasetime Data 125 reported in Phasetime Data Reports 360.

According to FIG. 4C, a Phasetime Data Input & Update System process 342 is used to submit the Phasetime Data 125 to a Main Data Tables 344 within the Core Database 148.

As Phasetime Data Events: a Create, Update, and Delete process 346 occurs within the System, a Phasetime Data Logging & Tracking Modules 350 implement a Timestamp 352 encoded information according to a Phasetime Data Logging & Tracking Business Rules 348.

FIG. 4C also details that the Phasetime Data Processing Modules 354 populate the Data Logging & Tracking Tables (Phasetime Data) 356 with the Phasetime Data 125 that has been processed by the Phasetime Data Logging and Tracking Modules 354 with the Timestamp 352 encoded information.

The Phasetime Data Reports 360 are then reported by the Phasetime Data Reporting Modules 358.

Figure 5:
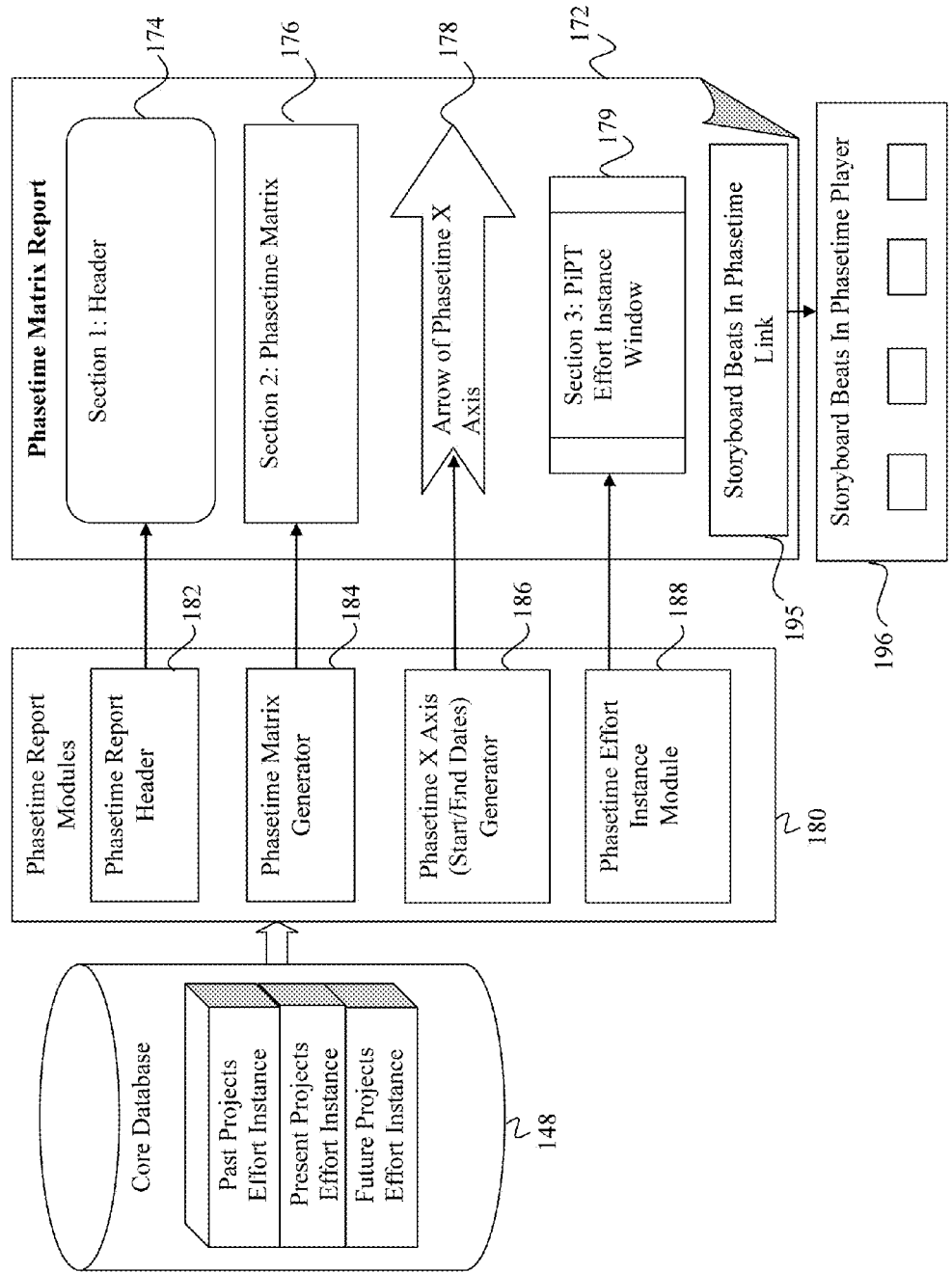
FIG. 5 is a Phasetime Matrix Report Flowchart Drawing that defines the Database Efforts Data, Phasetime Matrix Modules and Components used in "Point in Phasetime Method and System Thereof" as they relate to the structure and data found within the Phasetime Matrix Report, according to the above preferred embodiment of the present invention.

FIG. 5 defines the System database parameters used in the "Point in Phasetime Method and System Thereof" of the preferred embodiment of the present invention as they relate to the structure and data found within the Phasetime Matrix Report 172.

According to FIG. 4, the Core Database 148 stores the Past (Published), Present, and Future Project Efforts 152, 154, 156 whereby they are processed by the Effort Instance and Phasetime Data Virtual Matrix 126 in response to a query. FIG. 5 builds on the principle by defining a Phasetime Report Modules 180 used to generate the Point in Phasetime 112 data, wherein the modules are used to output the Point in Phasetime 112 data within the Phasetime Matrix Report 172.

The Phasetime Report Modules 180 can include, but not limited to, a Phasetime Report Header Module 182, a Phasetime Matrix Generator Module 184, a Phasetime X Axis (Start/End Dates) Generator Module 186, and a Phasetime Effort Instance Module 188.

Each of the above Phasetime Report Modules 180 is used to generate specific attributes within the Phasetime Matrix Reports 172:

The Phasetime Header Module 182—generates Section 1: the Header 174 within the Phasetime Matrix Report 172 that includes the Project's 106 name, a Past/Present/Future Indicator 192, and the Effort Instance 116 and a PiPT Effort Instance Indicator 272.

The Phasetime Matrix Generator Module 184—generates Section 2: the Phasetime Matrix 176 within the Phasetime Matrix Report 172 in the form of a two-dimensional graphical display with three-dimensional attribute timeline which also displays an Effort Instance Owner's 194 general information and the Effort 114 on the Project (PR) 106.

The Phasetime X Axis (Start/End Dates) Generator Module 186—generates the Arrow of Phasetime X Axis 178 within the Phasetime Matrix Report 172; wherein Arrow of Phasetime X Axis 178 is a linear phasetime indicator that details the scope, from start date to end date, of the Project (PR) 106 in which the Effort Instances 116 exist.

The Phasetime Effort Instance Module 188—generates Section 3: the Effort Instance PiPT Window 179 within the Phasetime Matrix Report 172, wherein Section 3: the Effort Instance PiPT Window 179 displays the Effort Instance Reports 162, 164, 166, 168 and links indicating which Elements 100 have the Efforts 114 on the Project (PR) 106 within Section 2: the Phasetime Matrix 176.

Figure 7:
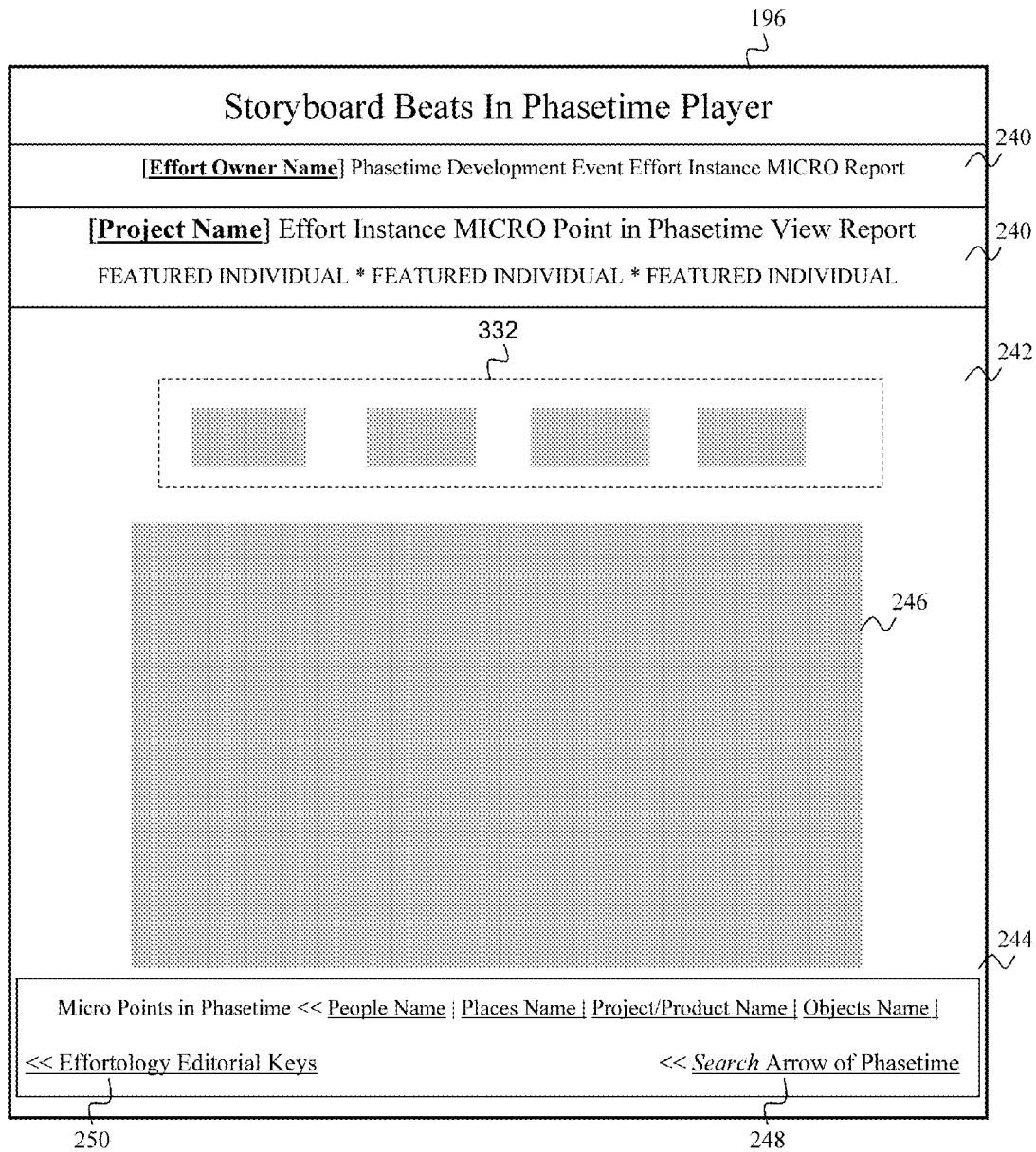
FIG. 7 is a Storyboard Beats in Phasetime Player drawing illustrating the Multimedia Content generating capabilities of the "Point in Phasetime Method and System Thereof" as related to the Storyboard Beats in Phasetime Player, according to the above preferred embodiment of the present invention.

FIG. 5 also details that the Phasetime Matrix Report 172 will display a Storyboard Beats in a Phasetime Link 195 to a Storyboard Beats in Phasetime 196, embodied as a Storyboard Beats in Phasetime Player 196, as shown in FIG. 7.

FIG. 6 illustrates the reporting capabilities of the "Point in Phasetime Method and System Thereof" of the preferred embodiment of the present invention as related to the display of the Effort Instance Owner's 194 Effort Instance Report 162, 164, 166, 168, as well as the Effort Instance Reports 162, 164, 166, 168 of the Elements 100 associated to the Effort Instance Owner 194 through the Effort Instance 116 thereof, all of which is reported within the Phasetime Matrix Report 172.

The Phasetime Matrix Report 172 comprises following sections:

Section 1: the Header 174
Section 2: the Phasetime Matrix 176
Arrow of the Phasetime X Axis 178
Section 3: the Effort Instance PiPT Window 179

According to FIG. 6, Section 1: the Header 174 displays the following:

The name of the Project (PR) 106 on which the Effort Instance Owner 194 has the Effort 114.

The Project Phasetime Past/Present/Future Indicator 192—denotes if the Project 106 was released in the past and is the Past Project Effort 152, is presently in development and is the Present Project Effort 154, or is a future release and is the Future Project Effort 156.

The PiPT Effort Instance Indicator 272—denotes a Macro Phasetime 202, a Micro Phasetime 204, or a Nano Phasetime 206 view of the Effort Instance Owner's 194 and the Effort Instance 116.

According to FIG. 6, Section 2: the Phasetime Matrix 176 is used to display:

The Effort Instance Owner's 194 name.

The Effort 114 of Effort Instance Owner 194 on the Project (PR) 106.

The Effort Instance Owner's 194 contact information.

A list of all of the Project (PR) 106 and Phases of Development 208 according to a linear timeline. The Phases of Development 208 include a Concept Development [Blueprint] 210, a Pre-Production 212, a Production 214, a Post-Production 216, a Manufacturing, Distribution, and Promotion 218, a Post Manufacturing, Distribution, and a Promotion 220.

A Phase Boxes 222 which indicate the start date and end date of the Phase of Development 208 along a linear timeline.

A shaded Effort Phase Box 224 which indicates the start and end dates on which the Effort Instance Owner's 194 Effort 114 occurred along a linear timeline.

The shaded section of Effort Phase Box 224 within the Project's 106 Phase of Development 208 is more or less a proportional representation of the Effort Instance Owner's 194 Effort's 114 start and end dates, whose proportions are more or less in relation to the duration of the appropriate Phasetime and its context to the earliest start date of a Phasetime Clockwork I 228 and its latest end date in a Phasetime Clockwork V 236, or if republished, in a Phasetime Clockwork VI 238.

The Phase Boxes 222, the Effort Phase Boxes 224, and the Arrow of Phasetime X Axis 178 are interactive. Clicking or putting a mouse over the Phase Boxes 222 or the Effort Boxes 224 controls the content in Section 3: the Effort Instance PiPT Window 179.

According to FIG. 6, the Arrow of Phasetime X Axis 178 is used to display:

The Phase Boxes 222 and the Effort Phase Boxes 224 in relationship to the corresponding the Phase of Development 208 and the Phasetime Clockworks 226 which indicates a Project Phasetime 300:

The Phasetime Clockwork I 228—the Concept Development 210
A Phasetime Clockwork II 230—the Pre-Production 212
A Phasetime Clockwork III 232—the Production 214
A Phasetime Clockwork IV 234—the Post-Production 216

A Phasetime Clockwork V 235—the Mfg./Dist./Promotion 218

The Phasetime Clockwork VI 236—the Post Mfg./Dist/Promotion 220

According to FIG. 6, Section 3: the Effort Instance PiPT Window 179 is used to display:

All the Elements 100 who have Effort Instance Reports 162, 164, 166, 168 as they relate to the specific Phase of Development 208 on the Project 106, wherein the list of Elements 100 are displayed within Section 3: the Effort Instance PiPT Window 179 when a user clicks on the Phase Box 222 or the Effort Box 224 within Section 2: the Phasetime Matrix 176, or by mousing over the Phasetime Clockworks 226, 230, 232, 234, 235, 236 within the Arrow of Phasetime X Axis 178.

The Effort 114 values related to the Elements 100 who have an Efforts in Phasetime 200.

The start and end dates on which those displayed the Efforts in Phasetime 200 occurred.

The Past, Present and Future Effort Instance Reports 162, 164, 166, 168 indicted in Section 1: the Header, and referenced in Arrow of Phasetime X Axis 178.

The Macro, Micro, and Nano Effort Instance Reports 162, 164, 166, 168 indicated in Section 1: the Header 174, referenced in the Arrow of Phasetime X Axis 178, and selected from Section 2: an Arrow of Phasetime Clockwork Icons 274.

The Past Project Effort 152 data which is selected by clicking or putting a mouse over the Arrow of Phasetime X Axis 178 arrow pointing to the screen's left.

The Future Project Effort 156 data which is selected by clicking or putting a mouse over the Arrow of Phasetime X Axis 178 arrow pointing to the screen's right, all of which may link to the Storyboard Beats In Phasetime Player 196.

FIG. 7 illustrates the reporting capabilities of the "Point in Phasetime Method and System Thereof" of the preferred embodiment of the present invention as related to the Storyboard Beats in Phasetime Player 196.

The Storyboard Beats in Phasetime Player 196 is accessed from the Phasetime Matrix Report 172. It contains the following design components and corresponding attributes:

A Storyboard Header Section 240—Displays the Project (PR) 106 info, the Effort Instance Owner's 194 Effort 114 and the info, and Macro Phasetime 202, the Micro Phasetime 204 or the Nano Phasetime 206 details.

A Storyboard Body Section 242—Displays a Macro, Micro, Nano Multimedia Content 246 which can include, but not limited to, music, video, picture, motion graphics, etc.

A Storyboard Footer Section 244—Displays additional Storyboard Beats in the Phasetime Player 196 information or links which can include, but not limited to, a Search Links 248 and an Effortology Editorial Keys 250 links.

FIG. 8 defines the System Core Database 148 parameters used by the "Point in Phasetime Method and System Thereof" of the preferred embodiment of the present invention to generate the Storyboard Beats in Phasetime Player 196 data.

According to FIG. 4, the Core Database 148 stores the Past, Present, and Future Effort 152, 154, 156 data which is processed by the Effort Instance and Phasetime Data Virtual Matrix 126. FIG. 8 builds on this principle by defining those Macro, Micro, and Nano Phasetime Modules used to generate the Storyboard Beats in Phasetime Player 196 content.

Accordingly, the Core Database 148 includes at least a Macro, Micro, and Nano Storyboard Modules 252 which include, but not limited to, a Storyboard Header Generator Module 254, a Storyboard Multimedia Body Generator Module 256, and a Storyboard Footer Generator Module 258.

FIG. 8 illustrates that a Macro, Micro, and Nano Multimedia Database 260 exists within the "Point In Phasetime Method and System Thereof" of the preferred embodiment of the present invention, wherein the Macro, Micro, and Nano Multimedia Database 260 outputs the Macro, Micro, Nano Multimedia Content 246 into the Storyboard Beats In Phasetime Player 196 via the Storyboard Multimedia Body Generator Module 256. The Macro, Micro, Nano Multimedia Content 246 can include, but not limited to, Video, Music, Motion Graphics, and Images.

The Macro, Micro, and Nano Storyboard Modules 252 are used to populate the data that appears within the Storyboard Beats in Phasetime Player 196. The following describes each module and the corresponding Storyboard data it reports:

The Storyboard Header Generator Module 254—Reports Project (PR) 106 info and Effort Instance Owner's 194 Effort 114 and info within the Storyboard Header Section 240 of the Storyboard Beats in Phasetime Player 196.

The Storyboard Multimedia Body Generator Module 256—Reports the Macro, Micro, and Nano Multimedia Content 246 within the Storyboard Body Section 242 of the Storyboard Beats In Phasetime Player 196.

The Storyboard Footer Generator Module 258—Reports the additional Storyboard Beats in Phasetime 196 information or links that can include, but not limited to, the Search Links 248 and the Effortology Editorial Key 250 links.

FIG. 9 is a very high line diagram that details all of the System database parameters and reporting modules used by the "Point in Phasetime Method and System Thereof" of the preferred embodiment of the present invention in the generation of the Phasetime Matrix Report 172 and the Storyboard Beats in Phasetime Player 196 data.

According to FIG. 9, the "Point in Phasetime Method and System Thereof" of the preferred embodiment of the present invention comprises, but not limited to, the Data Repository Database 150, the Core Database 148, and the Macro, Micro, Nano Multimedia Database 260.

Multimedia exhibits are transferred from the Data Repository Database 150 to the Macro, Micro, Nano Multimedia Database 260 via an Editing & Formatting Processes 268, wherein the Editing and Formatting Processes 268 will create formatted and organized the Macro, Micro, Nano Multimedia Content 246 for the Storyboard Beats In Phasetime Player 196.

The Effort Instance 116 and the Point In Phasetime 112 data are output from the Core Database 148 by the Phasetime Matrix Report Generating Module 270 and displayed within the Phasetime Matrix Reports 172 and the Effort Instance Reports 162, 164, 166, 168.

Finally, the diagram details that the Storyboard Beats In Phasetime Player 196 is accessed from the Phasetime Matrix Reports 172 and the Effort Instance Reports 162, 164, 166, 168, wherein the Micro, Macro, and Nano Phasetime 202, 204, 206 and the Storyboard Beats In Phasetime Player 196 data are dynamically extracted from both the Core Database 148 and the Macro, Micro, Nano Multimedia Database 260 by the Micro, Macro, and Nano Storyboard Modules 252.

Figure 10:
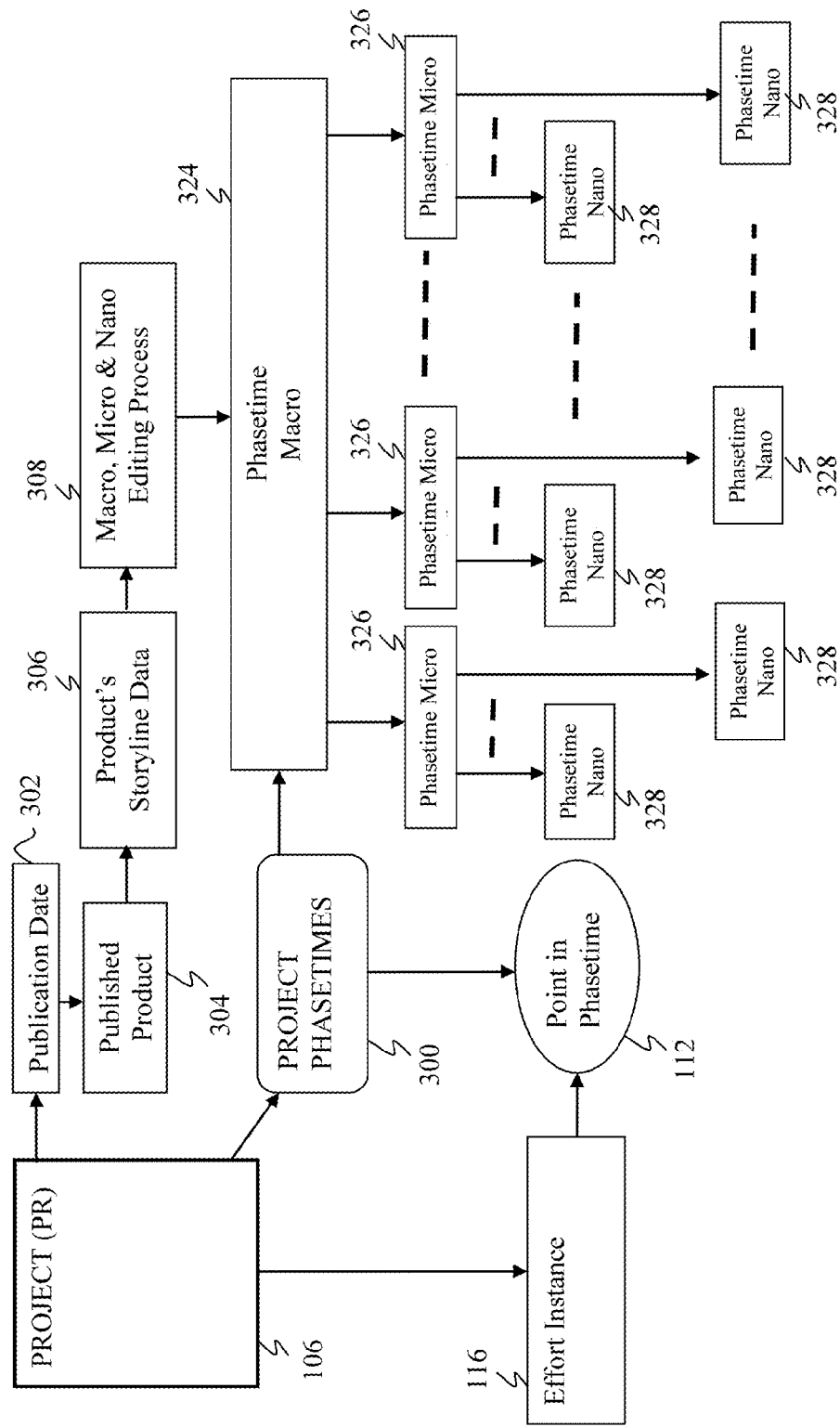
FIG. 10 is a detailed Phasetime Project/Published Product Macro, Micro, and Nano Logic Data Drawing illustrating how Phasetime Macro, Phasetime Micro, and Phasetime Nano Storyline Views are related hierarchically and generated by the System from Published Products, according to the above preferred embodiment of the present invention.

FIG. 10 details how a Phasetime Macro Storyline View 312, a Phasetime Micro Storyline View 316, and a Phasetime Nano Storyline View 320 are generated from a Published Products 304.

According to FIGS. 1-4, the Project (PR) 106 exists in which all the Elements 100 exert the Efforts 114 in the Effort Instance 116 thereof. This concept is expanded in FIG. 10 by detailing the additional Project (PR) 106 attributes used in the Effort Instances 116 as related to the Points in Phasetime 112 and the generation of Project Phasetime 300 data and reports.

The Projects (PR) 106 have the corresponding Project Phasetimes 300 which can be broken down into the six Phases of Development 208, wherein the Phases of Development 208 detail the Project's (PR) 106 development cycle. Specifically, the Phases of Development are designated segments of the Project's (PR) 106 development cycle according to its Product type:

1) the Concept Development [Blueprint] 210
2) the Pre-Production 212
3) the Production 214
4) the Post-Production 216
5) the Manufacturing/Distribution/Promotion 218
6) the Post Manufacturing/Distribution/Promotion 220

The Effort Instances 116 are related to the Project Phasetimes 300 by the Point in Phasetime 112 values which detail the "when" Element 100 exerted the Effort 114 thereof on the Project (PR) 106. In addition, the Projects (PR) 106 will become the Published Products 304 after they have officially been published or released to the public. Specifically, this occurs when the Project (PR) 106 is issued a Publication Date 302, the date on which Project (PR) 106 is published and becomes the Published Product 304 and a Phasetime Parturient Event 303.

FIG. 10 also details that a Product Storyline Data 306 is converted into a Phasetime Macro 324, a Phasetime Micro 326, and a Phasetime Nano 328 data jointly by a Storyline Editor 307 and an Effortologist 309 during a Macro, Micro, and Nano Editing Process 308 derived from the Project Phasetimes 300, wherein the Project Phasetimes 300 are furnished by the Project's (PR) 106 Effort Instance 116 and the corresponding Points In Phasetime 112.

The Macro, Micro, and Nano Editing Processes 308 are used to produce the Macro Phasetime 202, the Micro Phasetime 204, the Nano Phasetime 206, the Phasetime Data 125, and the Phasetime Macro, Micro, and Nano Storyline Views 312 316 320 which can include, but not limited to, the following:

The Phasetime Macro 324—A landscape view of the Effort Instance Owner's 194 Effort 114 on the Project (PR) 106 at the Point in Phasetime 112.

The Phasetime Micro 326—A portrait view of the Effort Instance Owner's 194 Efforts 114 on the Project (PR) 106 at the Point in Phasetime 112.

The Phasetime Nano 328—A close-up view of the Effort Instance Owner's 194 Effort 114 on the Project (PR) 106 at the Point in Phasetime 112.

Figure 11:
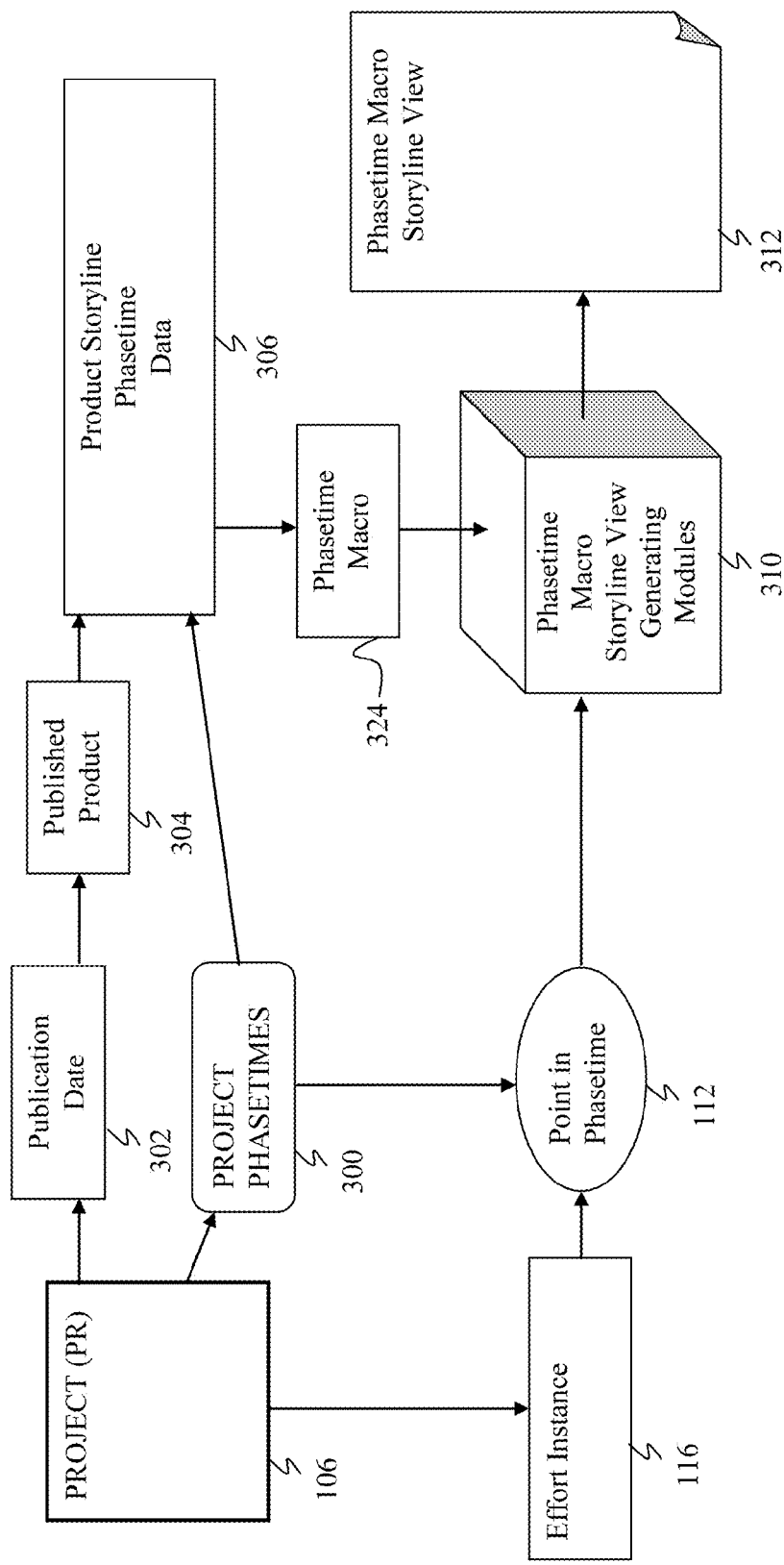
FIG. 11 is a Phasetime Project/Published Product Macro Storyline View Drawing that details how Phasetime Macro Storyline Views are generated by the System from Published Products, according to the above preferred embodiment of the present invention.

FIG. 11 illustrates how the Phasetime Macro Storyline Views 312 are generated from the Published Products 304.

According to FIGS. 10 and 11, the Project (PR) 106 exists on which all the Elements 100 exert the Efforts 114 thereof in the Effort Instance 116, whereby the additional Project (PR) 106 attributes used in the Effort Instances 116 are related to the Points in Phasetime 112 and the generation of the Project Phasetime 300 data and reports. Accordingly, the Projects (PR) 106 have the corresponding Project Phasetimes 300 which can be broken down into six of the Phases of Development 208, wherein the Phases of Development 208 detail the Project's (PR) 106 development cycle.

FIGS. 10 and 11 further delineate that the Effort Instances 116 are related to the Project Phasetimes 300 by the Point in Phasetime 112 values which detail the "when" Element 100 exerted the Effort 114 thereof on the Project (PR) 106. In addition, the Projects (PR) 106 will become the Published Products 304 after they have officially been published or released to the public. Specifically, this occurs when the Project (PR) 106 is issued the Publication Date 302, the date on which the Project (PR) 106 is published and becomes the Published Product 304.

FIG. 11 expands on this concept by detailing that the Product Storyline Data 306 is converted into the Phasetime Macro 324 data jointly by the Storyline Editor 307 and the Effortologist 309 during the Macro, Micro, and Nano Editing Process 308 derived from the Project Phasetimes 300. The Macro, Micro, and Nano Editing Process 308 is used to produce the Phasetime Macro 324 data which are displayed within the Phasetime Macro Storyline View 312 report, wherein a Phasetime Macro Storyline View Generating Module 310 is used to create the Phasetime Macro Storyline View 312 report.

The Phasetime Macro Storyline View 312 is a landscape view of the Published Product 304, wherein the objective of the landscape view is to provide a Storyline Product overview, whose Beats in Phasetime 332 associate the Effort Instance Owner's 194 Effort 114 to appropriate the Phasetime Macro 324 landscape view attributes, which comprise the hi-line Phasetime Micro 326 view data of the Effort Instance Owner's 194 a Phasetime Development Event Instance 334.

The Phasetime Development Event Instances 334 occur when the Effort Instance Owners 194, the People 102, the Places 104, the Projects 106, and the Objects 108, perform the conjoined Efforts 114 on the Project (PR) 106 in relation to the Point in Phasetime 112 within the Phase of Development 208 of the Published Product 304.

Figure 12:
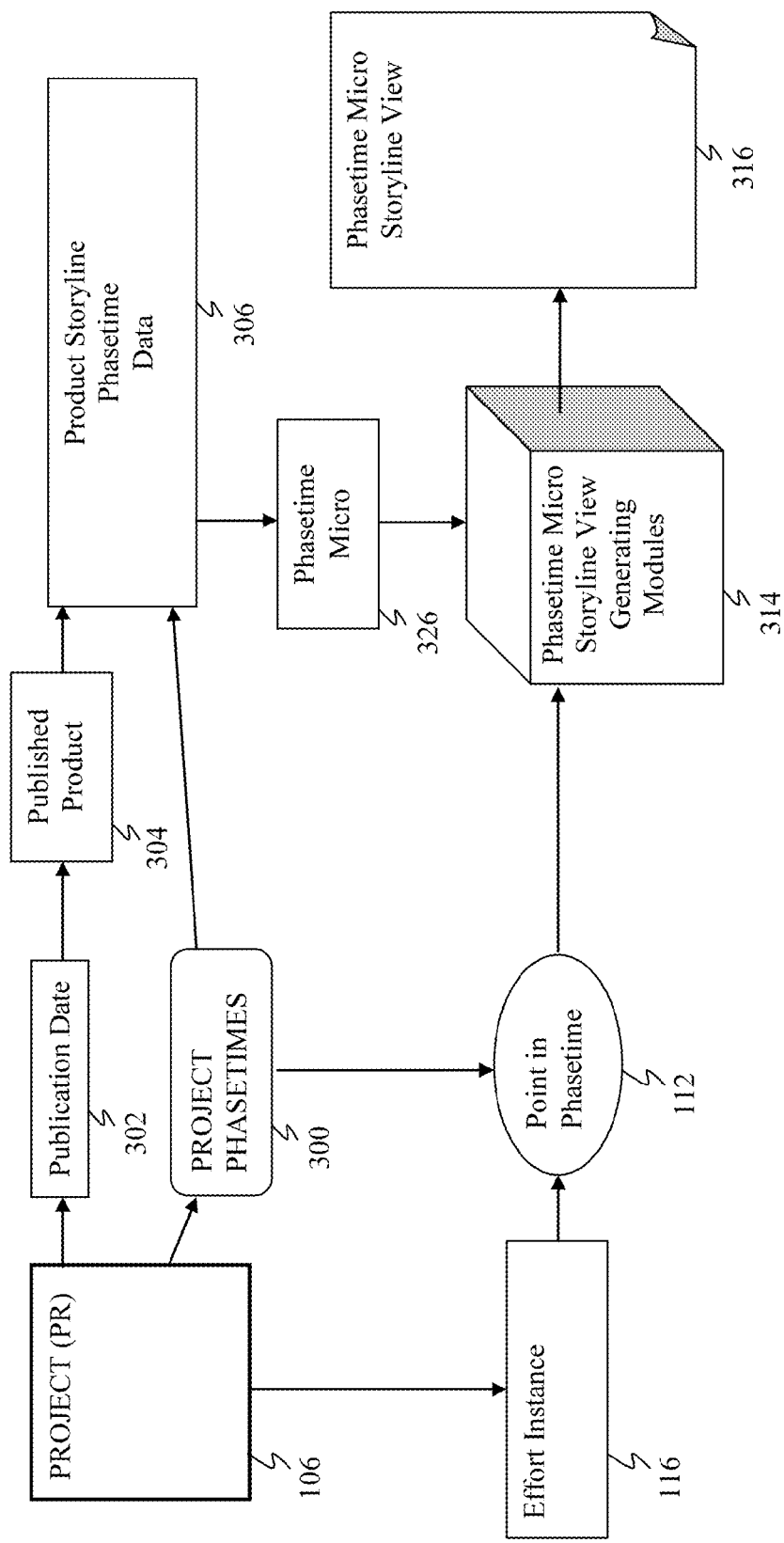
FIG. 12 is a Phasetime Project/Published Product Micro Storyline View drawing that details how Phasetime Micro Storyline Views are generated by the System from Published Products, according to the above preferred embodiment of the present invention.

FIG. 12 illustrates how the Phasetime Micro Storyline Views 316 are generated from the Published Products 304.

According to FIGS. 10, 11, and 12, the Project (PR) 106 exists on which all the Elements 100 exert the Efforts 114 thereof in the Effort Instance 116, whereby the additional Project (PR) 106 attributes used in the Effort Instances 116 are related to the Points in Phasetime 112 and the generation of the Project Phasetime 300 data and reports. Accordingly, the Projects (PR) 106 have the corresponding Project Phasetimes 300 which can be broken down into six Phases of Development 208, wherein the Phases of Development 208 detail the Project's (PR) 106 development cycle.

FIGS. 10, 11, and 12 further define that the Effort Instances 116 are related to the Project Phasetimes 300 by the Point in Phasetime 112 values which detail the "when" Element 100 exerted the Effort 114 thereof on the Project (PR) 106. In addition, the Projects (PR) 106 will become the Published Products 304 after they have officially been published or released to the public. This occurs when the Project (PR) 106 is issued the Publication Date 302, i.e. the date on which the Project 106 is published and becomes the Published Product 304.

FIG. 12 expands on this concept by detailing that the Product Storyline Data 306 is converted into the Phasetime Micro 326 data jointly by the Editor 307 and the Effortologist 309 during the Macro, Micro, and Nano Editing Process 308 derived from the Project Phasetimes 300. The Macro, Micro, and Nano Editing Process 308 is used to produce the Phasetime Micro 326 data which are displayed within the Phasetime Micro Storyline View 316 report, wherein a Phasetime Micro Storyline View Generating Module 314 is used to create the Phasetime Micro Storyline View 316 report.

The Phasetime Micro Storyline View 316 is a portrait view of the Published Product 304, wherein the objective of the portrait view is to provide a Storyline Product scene-sequence view, whose Beats in Phasetime 332 associate the Effort Instance Owner's 194 Effort 114 to the appropriate Phasetime Micro 326 portrait view attributes, which comprises the hi-line Phasetime Nano 328 view data of the Effort Instance Owner's 194 Phasetime Development Event Instance 334.

The Phasetime Development Event Instances 334 occur when the Effort Instance Owners 194, the People 102, the Places 104, the Projects 106, and the Objects 108, perform the conjoined Efforts 114 on the Project (PR) 106 in relation to the Point in Phasetime 112 within the Phase of Development 208 of the Published Product 304.

Figure 13:
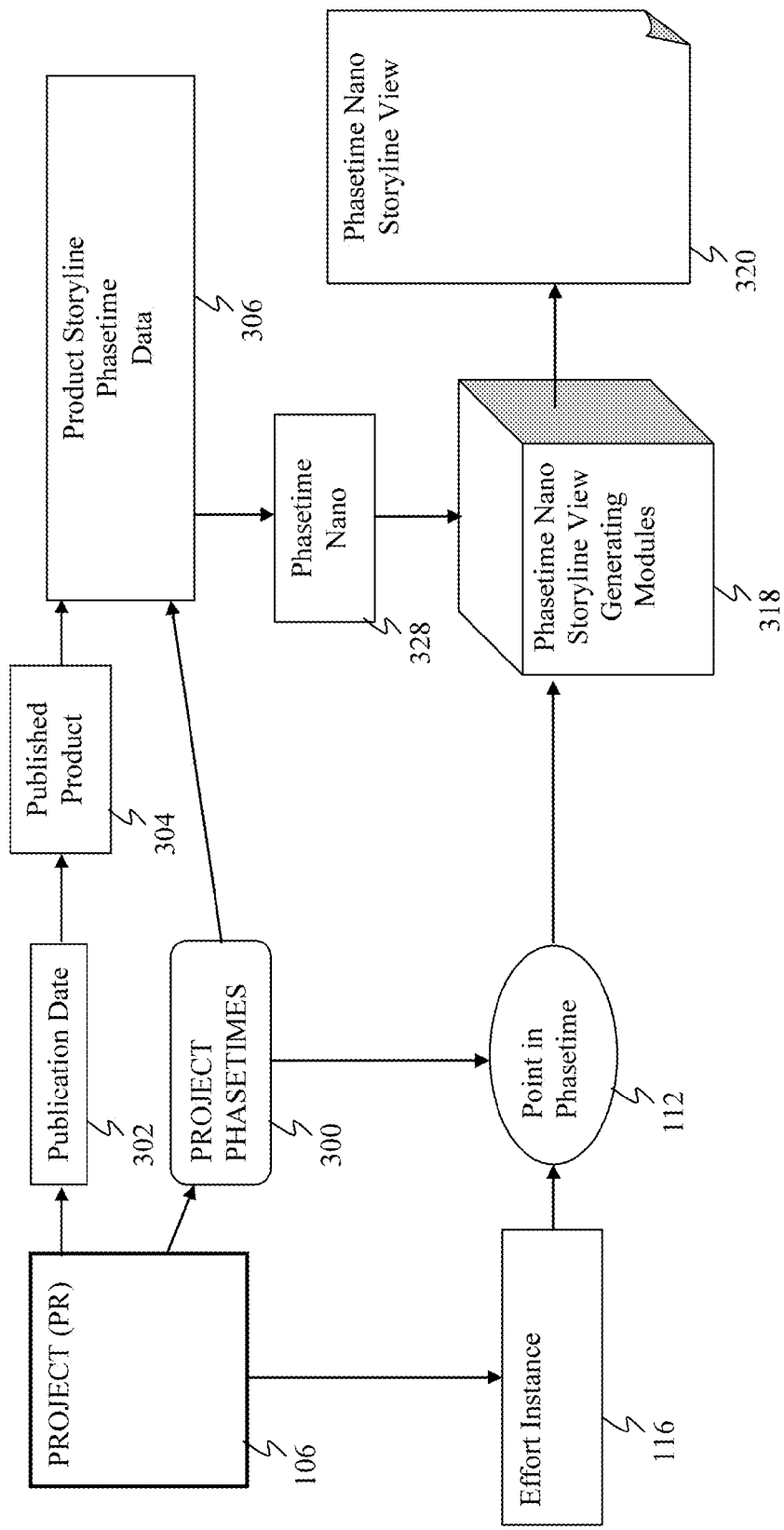
FIG. 13 is a Phasetime Project/Published Product Nano Storyline View drawing that details how Phasetime Nano Storyline Views are generated by the System from Published Products, according to the above preferred embodiment of the present invention.

FIG. 13 details how the Phasetime Nano Storyline Views 320 are generated from the Published Products 304.

According to FIGS. 10-13, the Project (PR) 106 exists in which all the Elements 100 exert the Efforts 114 thereof in the Effort Instance 116, whereby the additional Project (PR) 106 attributes used in the Effort Instances 116 are related to the Points in Phasetime 112 and the generation of the Project Phasetime 300 data and reports. The Projects (PR) 106 have the corresponding Project Phasetimes 300 which can be broken down into the six Phases of Development 208, wherein the Phases of Development 208 detail the Project's (PR) 106 development cycle.

FIGS. 10-13 further delineate that the Effort Instances 116 are related to the Project Phasetimes 300 by the Point in Phasetime 112 values which detail the "when" Element 100 exerted the Effort 114 thereof on the Project (PR) 106. In addition, the Projects (PR) 106 will become the Published Products 304 after they have officially been published or released to the public. This occurs when the Project (PR) is issued the Publication Date 302, the date on which the Project 106 is published and becomes the Published Product 304.

FIG. 13 expands on this concept by detailing that the Product Storyline Data 306 is converted into the Phasetime Nano 328 data jointly by the Editor 307 and the Effortologist 309 during the Macro, Micro, and Nano Editing Process 308 derived from the Project Phasetimes 300. The Macro, Micro, and Nano Editing Process 308 is used to produce the Phasetime Nano 328 data which are displayed within the Phasetime Nano Storyline View 320 report, wherein a Phasetime Nano Storyline View Generating Module 318 is used to create the Phasetime Nano Storyline View 320 report.

The Phasetime Nano Storyline View 320 is a close-up view of the Published Product 304, wherein the objective of the close-up view is to provide a Storyline 336 product scene blueprint view, whose Beats in Phasetime 332 associate the Effort Instance Owner's 194 Effort 114 to the appropriate Phasetime Micro 326 portrait view attributes, which comprise the hi-line Phasetime Nano 328 view data of the Effort Instance Owner's 194 Phasetime Development Event Instance 334.

The Phasetime Development Event Instances 334 occur when the Effort Instance Owners 194, the People 102, the Places 104, the Projects 106, and the Objects 108, perform the conjoined Efforts 114 on the Project (PR) 106 in relation to the Point in Phasetime 112 within the Phase of Development 208 of Published Product 304.

Figure 14:
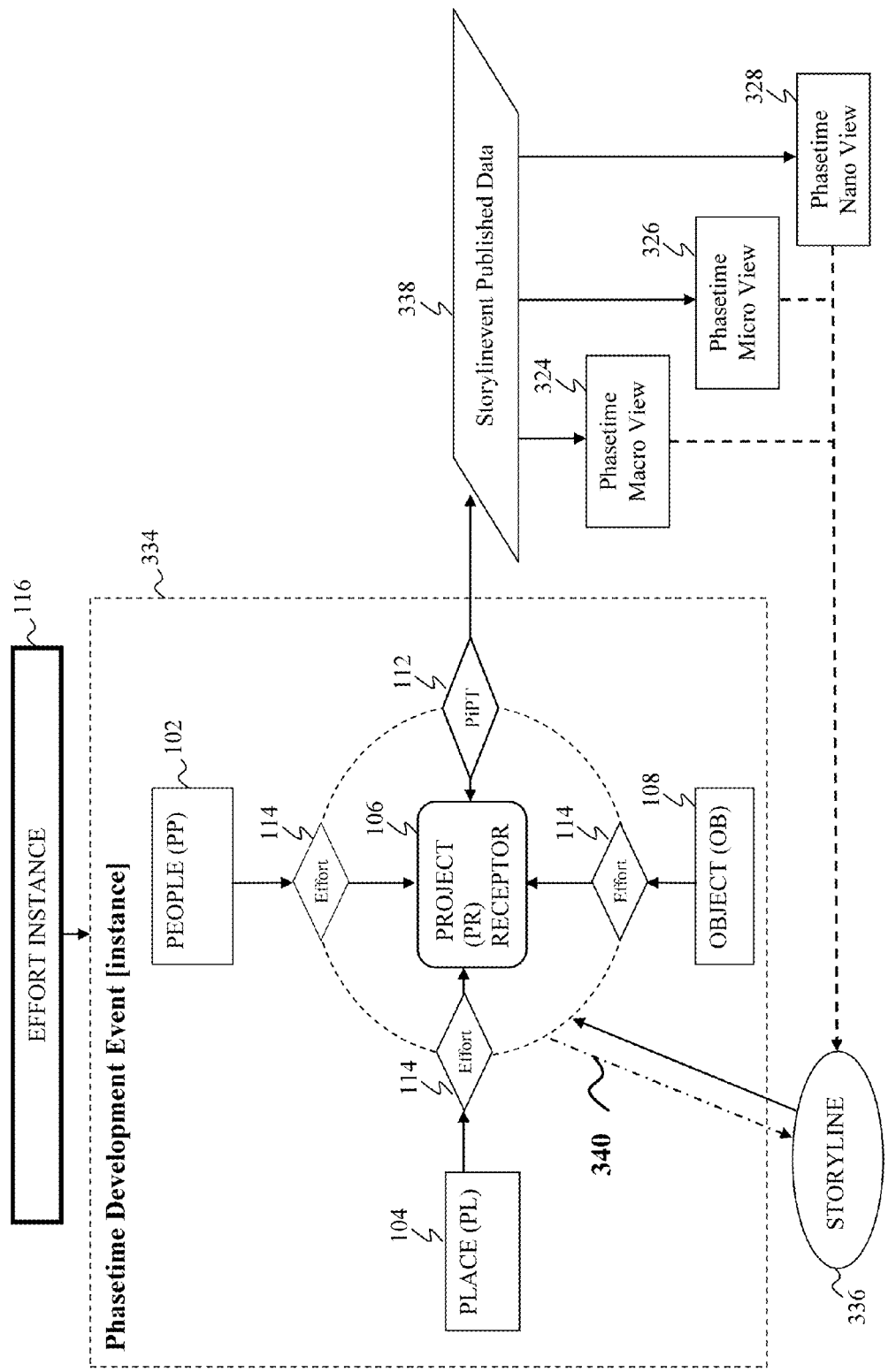
FIG. 14 is an Effort Instance PiPT Storylinevent drawing illustrating the Phasetime Development Event Instance and the interaction between the Storyline and the Element Efforts as they relate to the Storylinevent Published Data, according to the above preferred embodiment of the present invention.

According to FIGS. 1, 2, 3, 4A, 10, 11, 12, and 13, the "Point in Phasetime Method and System Thereof" of the preferred embodiment of the present invention comprises the Effort Instances 116 which are constructed of the Elements 100 that are associated to one another via the Efforts 114 thereof on the Project (PR) 106 within the Point In Phasetime (PiPT) 112. FIG. 14 expands on this concept by illustrating how the Effort Instances interact and affect the Point in Phasetime 112 the Storyline 336 as displayed within the Phasetime Macro, Micro, and Nano Storyline Views 312, 316, 320.

According to FIG. 14, the Storyline 336 is an attribute of the Effort 114 by any of the Elements 100 that details the creative decisions involved in the production of the Project (PR) 106 as defined by the Phasetime Development Event Instance 334. The Phasetime Development Event Instance 334 is defined as a development event that occurs when the Elements 100, the People (PP) 102, the Places (PL) 104, the Projects (PR) 106, and the Objects (OB) 108, perform the conjoined Efforts 114 on the Project (PR) 106 in relation to the Point in Phasetime 112 within the Phase of Development 208 of an industry product.

The Projects (PR) 106 will become the Published Products 304 after they have officially been published or released to the public. This occurs when the Project (PR) is issued the Publication Date 302, the date on which the Project 106 is published and becomes the Published Product 304.

In addition, a Storylinevent Published Data 338 are converted from the Point In Phasetime 112 of the Phasetime Development Event Instance 334 into the Phasetime Macro 324, the Phasetime Micro 326, and the Phasetime Nano 328 data jointly by the Storyline Editor 307 and the Effortologist 309 during the Macro, Micro, and Nano Editing Process 308 derived from the Project Phasetimes 300, wherein the Project Phasetimes 300 are furnished by the Project's (PR) 106 Effort Instance 116 and the corresponding Points In Phasetime 112.

FIG. 14 details dotted lines which tie the Phasetime Macro, Micro, and Nano Storyline Views 312, 316, 320 to the Product Storyline 336 within the Phasetime Development Event Instance 334. The solid line emanating from the Storyline 336 and concluding at the Efforts 114 reflects how the Storyline 336 affects the Element 100, the Efforts 114 and the Production 214. The dash-dotted line emanating from the Efforts 100 and concluding at the Storyline 336 indicates how the Element 100 and the Efforts 114 may in turn affect the Storyline 336 through a Storylinefforts and Storylinefx 340.

The ability for the Phasetime Development Event Instance 334 to affect the Storyline 336 is an attribute of the Effort 114 by the Element 100 which goes to the heart of Published Product's 304 story, whether the Element 100 is in front of or behind the camera, microphone, etc.

Figure 15:
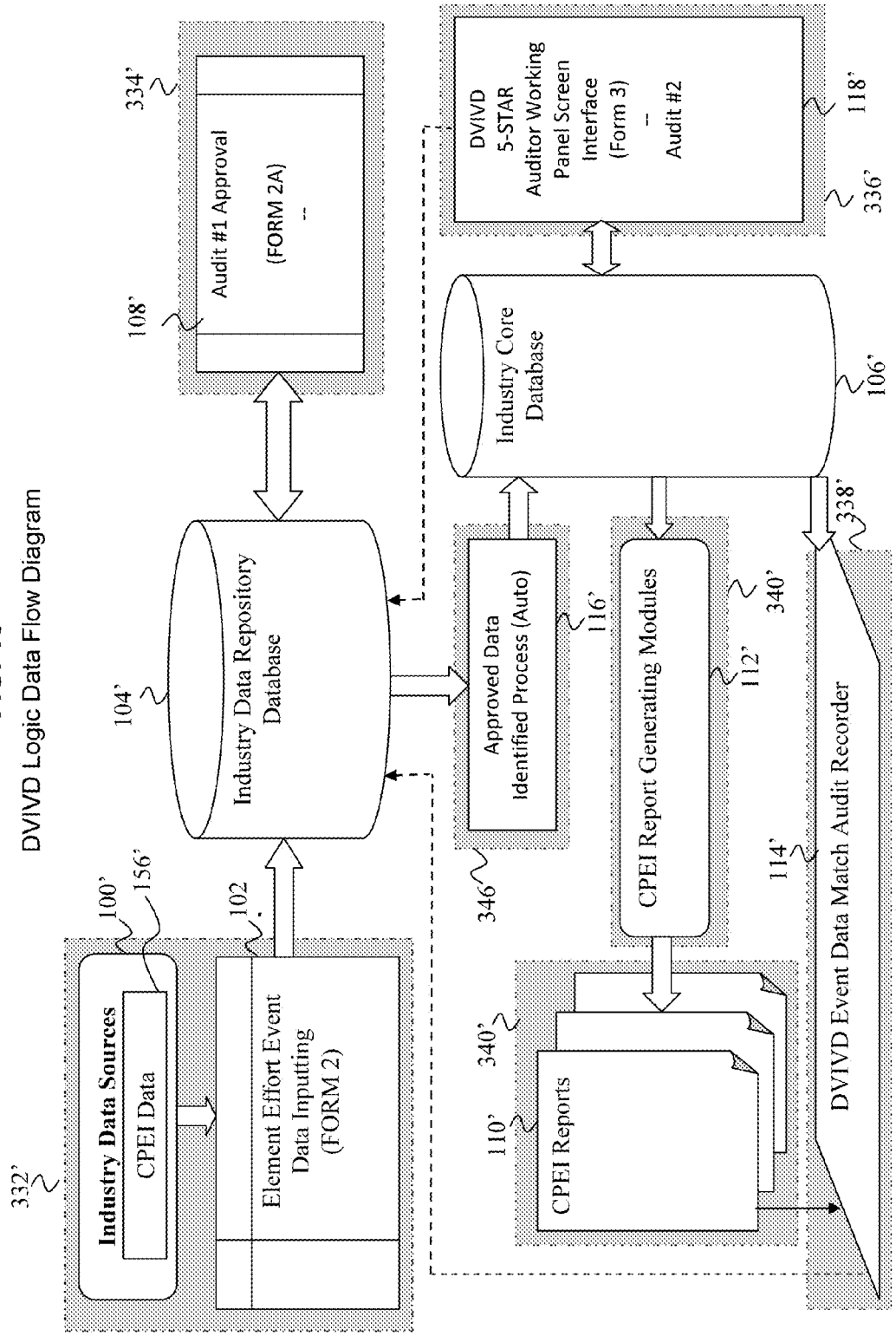
FIG. 15 illustrates systems and processes utilized by a DVIVD Match Audit System and 5 Star Event Data Recorder Method Thereof according to the above preferred embodiment of the present invention.

Referring to FIG. 15 of the drawings, systems and processes of the present invention utilized by a "DVIVD Match Audit System and 5 Star Event Data Recorder Method Thereof" is illustrated, wherein said System and Method include a Data Collection Process 332', a Data Auditing Processes 334', an Approved Data Identified Process (Auto) 116', a Data Audit Level Rating Processes 336', a Data Approval Processes 346', a Data Match Audit Testing Processes 338', and a Data Reporting Processes 340'.

The System and Method include the Data Collection Processes 332' in which a CPEI Data 156' is collected from an Industry Data Sources 100' and input into an Industry Data Repository Database 104' via an Element Effort Event Data Inputting (Form 2) 102'. The Industry Data Repository Database 104 is a database for storing the raw CPEI Data 156' in a CPEI Data Repository Tables 166', for storing a CPEI Exhibit 124' in CPEI Exhibit Data Repository Tables 168', and for storing general System data.

FIG. 15 establishes the Data Approval Processes 346' in which the CPEI Data 156' is migrated from the Industry Data Repository Database 104' to an Industry Core Database 106' semi-automatically based on the approval of an Audit Rules 342'. Both the Data Auditing Processes 334' and the Data Approval Processes 346' are designed to ensure data integrity within the System and Method by providing tools, processes, and rules for validating and verifying data within.

FIG. 15 also defines the Industry Core Database 106' as a relational database that stores the formatted CPEI Data 156' and general System data.

FIG. 15 also details the System and Method includes Data Audit Level Rating Processes 336' of the CPEI Data 156' based on Level Rules 130', 132', 134', 136', 138', 140' and Audit Processes 141', 142', 144', 146', 148' in FIG. 3 based on the result of the Data Auditing Processes 334'. Furthermore, changes to Data Audit Level Rating Processes 336' are maintained by a System Auditor (Effortologist) 348' via a DVIVD 5-Star Auditor Working Panel Screen Interface (Form #3) 118' as shown in FIG. 15.

Accordingly, FIG. 1 details the Data Reporting Processes 340', wherein the CPEI Data 156' is displayed within a CPEI Report 110' (Conjoined Project Effort Instance Report). This process is facilitated by a CPEI Report Generating Modules 112'.

Finally, FIG. 15 details that the Data Match Testing Processes 338 are facilitated by a DVIVD Event Data Match Audit Recorder 114', wherein the DVIVD Event Data Match Audit Recorder 114' is an interactive tool used by the System Auditor 348' in the facilitation of the Data Auditing Processes.

Figure 16:
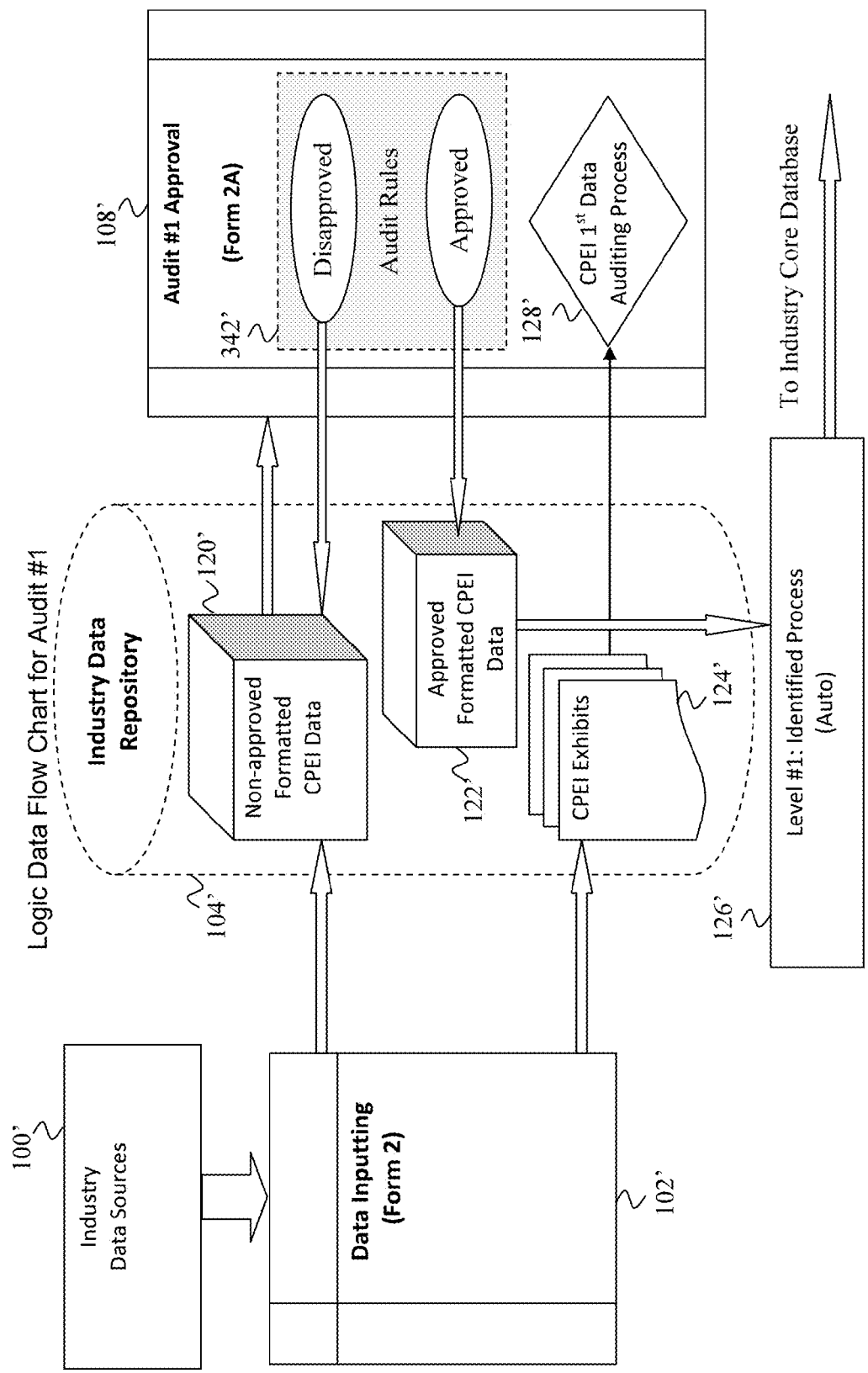
FIG. 16 illustrates the data collecting and data approval processes utilized by the DVIVD Match Audit System and 5 Start Data Recorder Method Thereof according to the above preferred embodiment of the present invention.

FIG. 16 illustrates the data collecting and data approval processes utilized by the "DVIVD Match Audit System and 5 Star Event Data Recorder Method Thereof" according to the preferred embodiment of the present invention.

The System includes the Data Collection Processes 332' in which the CPEI Data 156' and the Industry Data Sources 100' are input into the Industry Data Repository Database via Data Inputting Form 2.

The Industry Data Sources 100' which provide the CPEI Data 156' are now used by a CPEI 1$^{st}$ Data Auditing Process 128' to validate and verify the submitted the CPEI Data 156' so it can be moved along to a Level #1: Identified Process (Auto) 126'. The Industry Data Sources 100' may include, but not limited to, web sites, resume databases, online resumes, print media, third party databases, and private resources.

During the Data Collection Processes 332', the Element Effort Event Data Inputting (Form 2) 102' is used to format raw data into usable the CPEI Data 156' that will eventually be migrated into the Industry Core Database 106'. The Industry Data Source 100' will be preserved as a CPEI Exhibit 124' which is stored in the Industry Data Repository Database 104' to be used as a means for validating and verifying the CPEI Data 156'.

FIG. 16 further establishes the Data Approval Process 346' in which the CPEI Data 156' is either designated as an Approved Formatted CPEI Data 122' or a Non-Approved Formatted CPEI Data 120'. The CPEI Data 156' must be approved before it can be migrated from the Industry Data Repository Database 104' to the Industry Core Database 106'. The Data Approval Process 346' is a semi-automated process by which the System Auditor 348' reviews the CPEI Data 156' according to established Audit Rules 342'. The Data Approval Process 346' is facilitated by an Audit #1 Approval (Form 2A) 108'.

Figure 17:
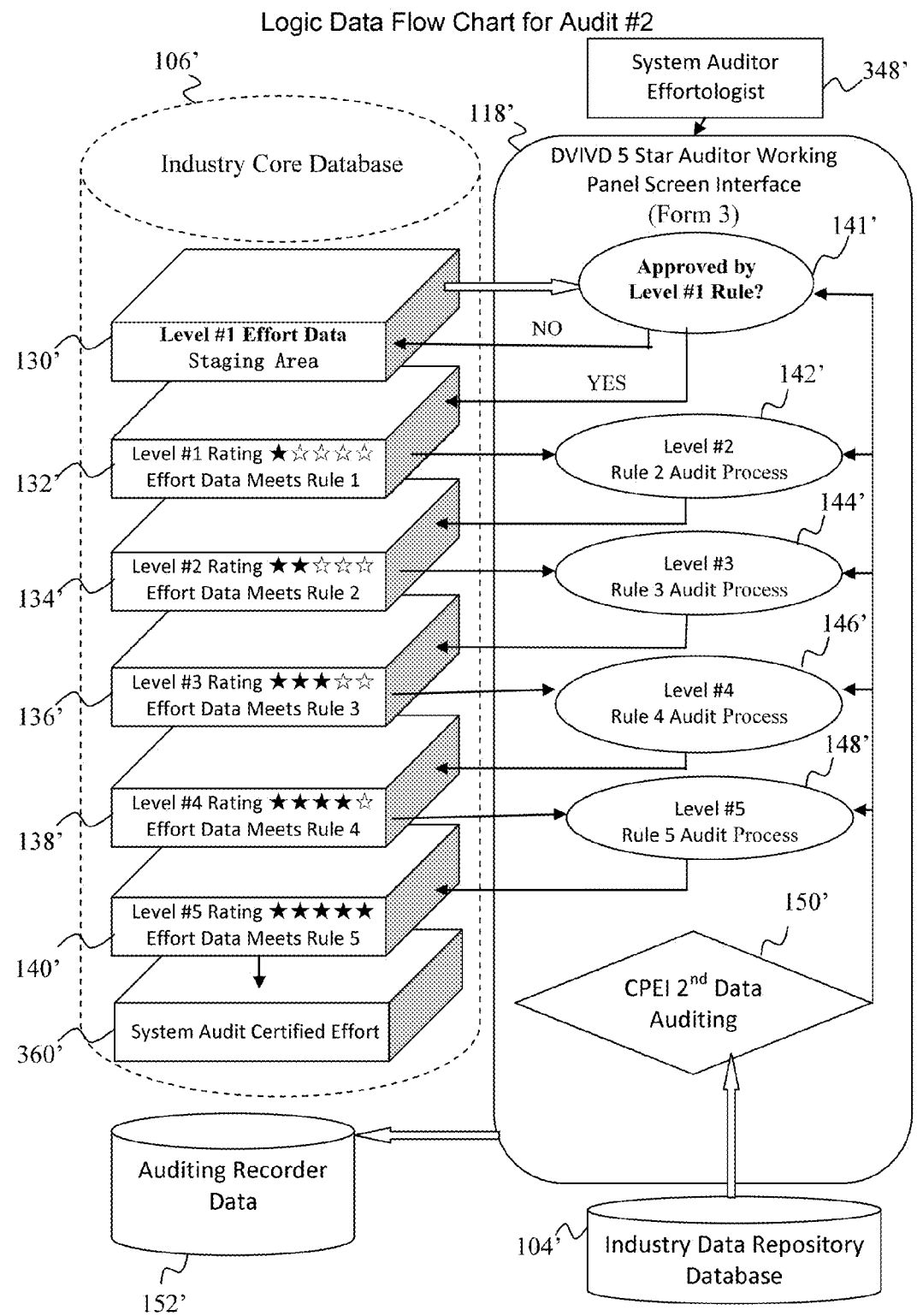
FIG. 17 is a Logic Data Flow Chart describing the CPEI Data Processing Steps in Audit #2 according to the above preferred embodiment of the present invention.

FIG. 17 illustrates various processes within the "DVIVD Match Audit System and 5 Star Event Data Recorder Method Thereof" of the preferred embodiment of the present invention relating to the management of the Data Audit Level Rating Processes 336' that occur via the DVIVD 5 Star Auditor Working Panel Screen Interface (Form 3) 118'.

According to FIG. 17, the DVIVD Match Audit System and 5 Star Event Data Recorder Method Thereof of the preferred embodiment of the present invention comprise the Data Audit Level Rating Processes 336' facilitated by System Auditors 348' via the DVIVD 5 Star Auditor Working Panel Screen Interface (Form 3) 118'. Data Audit Level Rating Processes 336 are used to:

Review the Audit Level Rating 132', 134', 136', 138', 140' of the CPEI Report 110', along with validation and verification, using the CPEI Exhibits 124' and Level Rules Audit Processes 141', 142', 144', 146', 148';

Review level change requests made by a CPEI Owners 352', owners of the CPEI Reports 110;

Review the new CPEI Exhibits 124 that support upgrading the Audit Level Ratings 132', 134', 136', 138', 140';

Approve or reject the Audit Level Ratings 132', 134', 136', 138', 140' according to the Level Rules Audit Processes 141', 142', 144', 146', 148'.

FIG. 17 defines that the Data Audit Level Rating Processes 336 include a system by which the CPEI Report 110' of the Audit Level Rating 132', 134', 136', 138', 140' is raised as more Elements 300' are fulfilled.

FIG. 17 details the System and Method Thereof assigns the Audit Level #1 Rating 132' to the CPEI Report 110' when the Audit Level #1 Rules 141' have been satisfied.

FIG. 17 details the System and Method Thereof assigns the Level #2 Rating 134' to the CPEI Report 110' when the Level #2 Rule 2 Audit Process 142' has been satisfied.

FIG. 17 details the System and Method Thereof assigns the Level #3 Rating 136' to the CPEI Report 110' when the Level #3 Rule 3 Audit Process 144' has been satisfied.

FIG. 17 details the System and Method Thereof assigns the Level #4 Rating 138' to the CPEI Report 110 when the Level #4 Rule 4 Audit Process 146' has been satisfied.

FIG. 17 further details that the System and Method Thereof assigns the highest Audit Level #5 Rating 140', a System Audit Certified Effort 360', to the CPEI Report 110' when the Level #5 Rule 5 Audit Process 148' has been satisfied.

Figure 18:
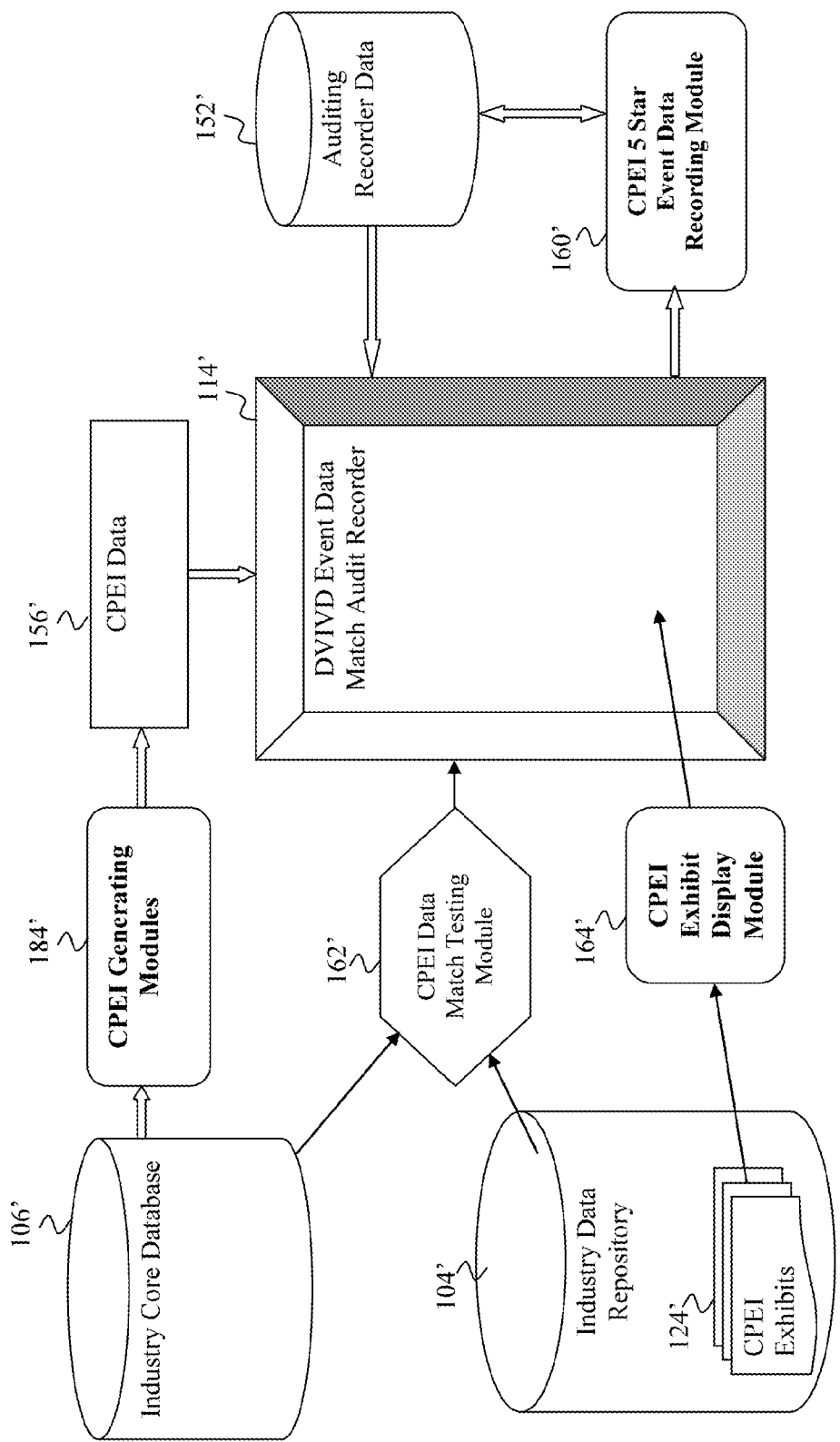
FIG. 18 displays all the databases and modules used by the DVIVD Event Data Match Audit Recorder according to the above preferred embodiment of the present invention.

FIG. 18 displays all of the databases and modules used in the DVIVD Event Data Match Audit Recorder 114' as they relate to the various Data Auditing Processes 334' that occur as part of the DVIVD Match Audit System and 5 Star Event Data Recorder Method Thereof of the preferred embodiment of the present invention.

According to FIG. 18, as the CPEI Data 156' moves throughout the Industry Databases, Industry Data Repository Database 104' and the Industry Core Database 106', it encounters a number of Data Auditing Processes 334', the sum of which provides the infrastructure for the DVIVD Event Data Match Audit Recorder 114', the Data Match Audit Processes 338' and the Data Reporting Processes 340'.

FIG. 18 details the Data Auditing Processes 334' provide a verification and validation process in which the CPEI Data 156' is logged when it firsts enters the System in the Industry Data Repository Database 104', logged when the CPU Data 156' is migrated to the Industry Core Database 106', logged when the CPE Audit Level Rating 132', 134', 136', 138', 140' changes occur, and logged when the CPEI Data 156' is dynamically reported from the Industry Core Database 106'.

FIG. 18 also details that the System includes, but not limited to, the following auditing modules:

A CPEI 5 Star Event Data Recording Module 160': A module which generates an Auditing Recorder Data 152'.

A CPEI Generating Modules 184': Modules that will generate and display the CPEI Data 156' visually.

A CPEI Data Match Testing Module 162': Modules that will compare data from the Industry Data Repository Database 104' against data reported from the Industry Core Database 106' and display match or mismatch results within the DVIVD Event Data Match Audit Recorder 114'.

A CPEI Exhibit Display Module 164': A module that displays those CPEI Exhibits 124 used to validate/verify CPEI Reports 110.

Figure 19:
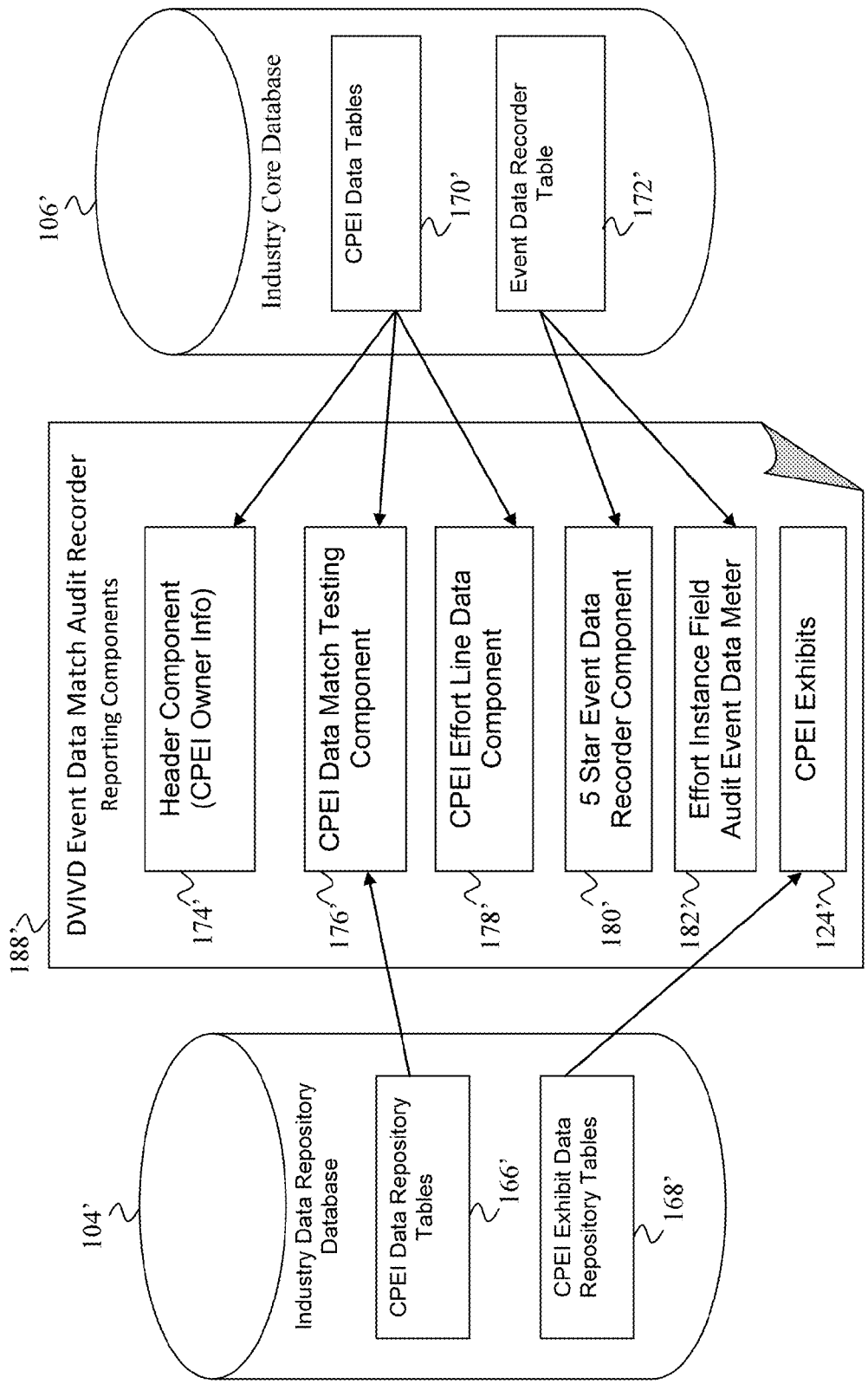
FIG. 19 displays the reporting components of the DVIVD Event Data Match Audit Recorder according to the above preferred embodiment of the present invention.
Figure 21A:
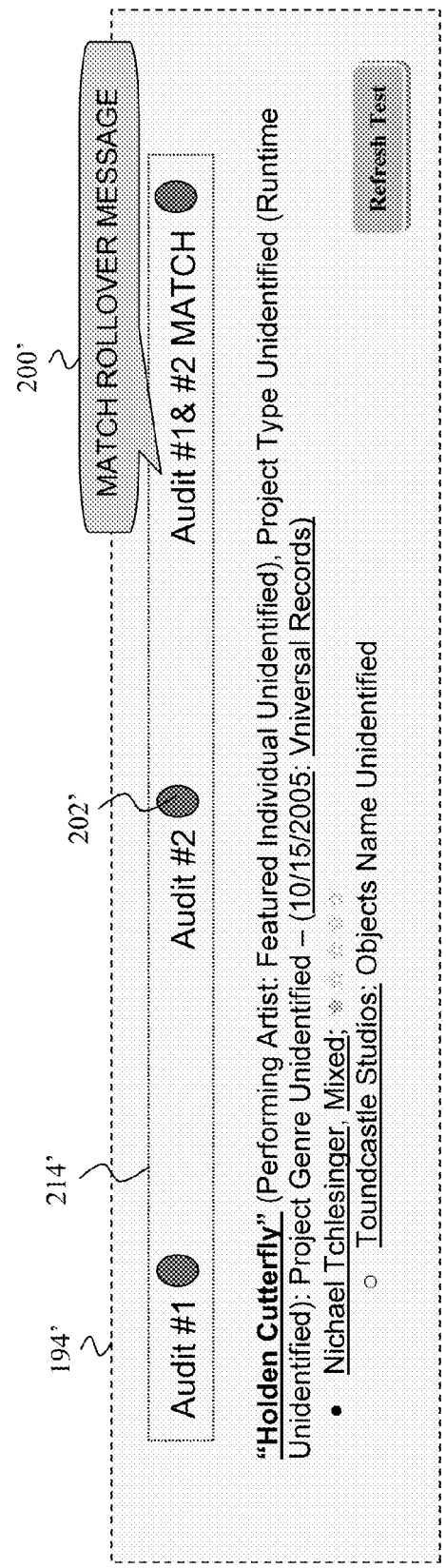
FIGS. 21A-21D display the CPEI Audit #1 and Audit #2 Data Match Testing Section of the DVIVD Event Data Match Audit Recorder according to the above preferred embodiment of the present invention.
Figure 21B:
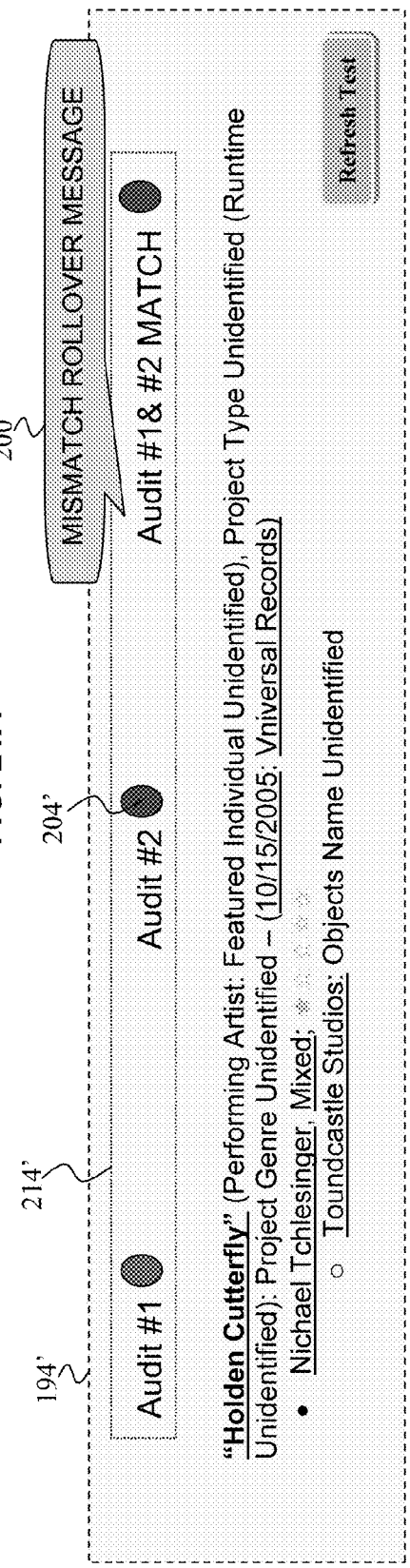
Figure 21C:
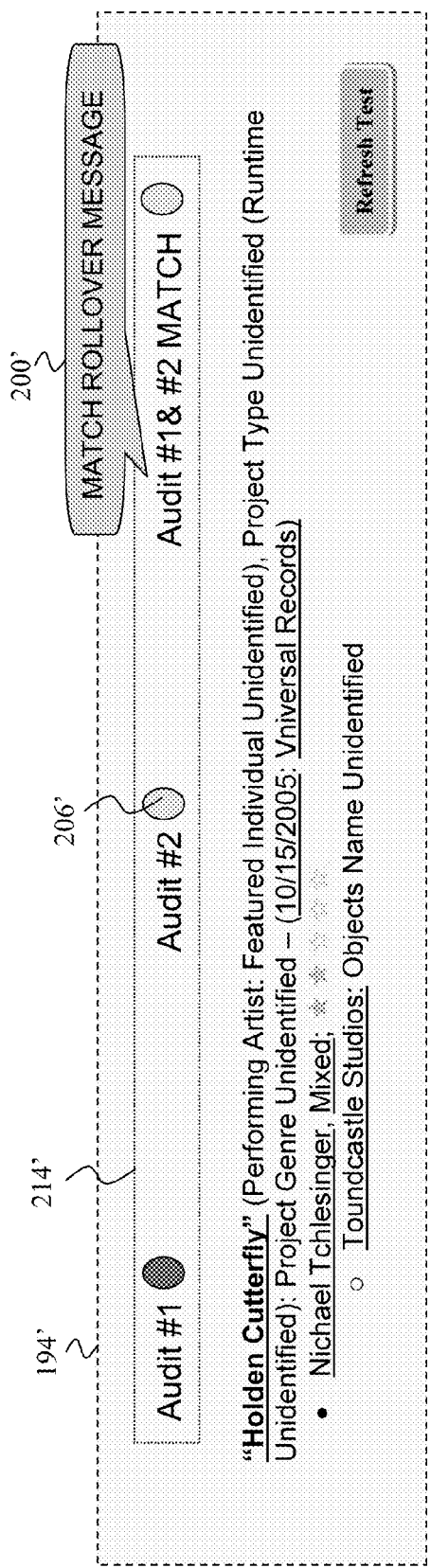
Figure 21D:
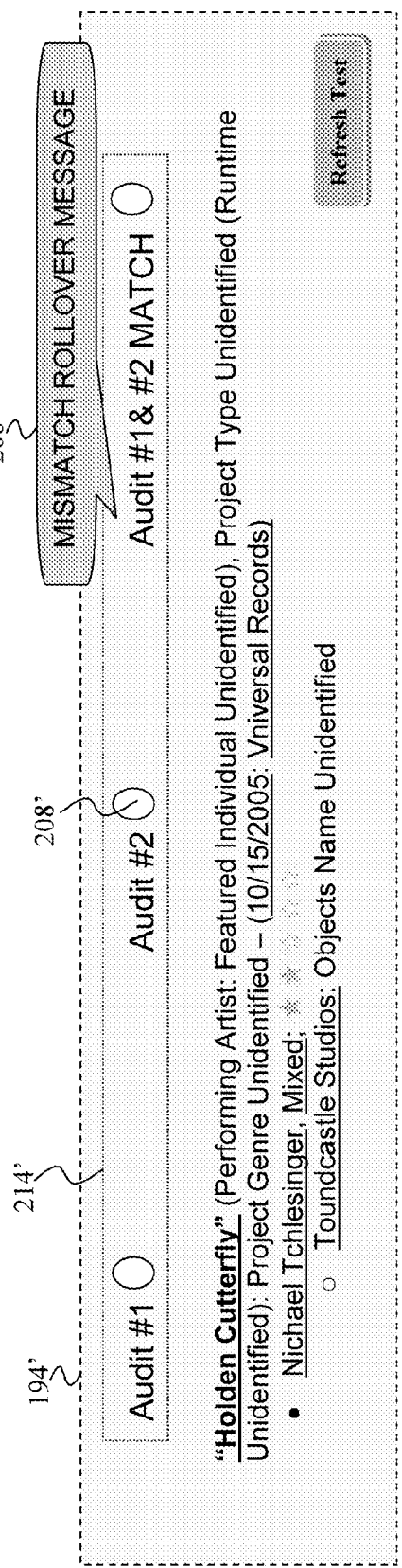

FIGS. 15 and 19 detail how the Industry Data Repository Database 104' is used to store the CPEI Data 156', which includes the CPEI Exhibits 124'. The CPEI Exhibits 124' can be accessed and displayed within the DVIVD Event Data Match Audit Recorder 114' as a means for validating the CPEI Data 156' and the CPEI Reports 110'.

FIG. 18 expands on this by detailing that the CPEI Data Match Testing Module 162' is the main component for executing the two main Data Auditing Processes 334' of the System and Method, which include but not limited to:

A CPEI $1^{st}$ Data Auditing Process 128': a semi-automated process by which the CPEI Data 156' is logged as it is entered into the Industry Data Repository Database 104'.

A CPEI $2^{nd}$ Data Auditing Process 150': a fully automated process by which the CPEI Data 156' is logged as reported from the Industry Core Database 106' so that it may be audited against the CPEI Data 156' as inputted into the Industry Data Repository Database 106'.

The results of the CPEI Data Match Testing Module 162' are displayed within the DVIVD Event Data Match Audit Recorder 114' within a CPEI Data Match Testing Component 176', as shown in FIG. 19.

FIG. 18 also details how the CPEI Data 156' is extracted from the Industry Core Database 106' via the CPEI Generating Module 184' and used in a number of dynamic reports. The CPEI Generating Modules 184' are used in the Data Auditing Processes 334' by generating and displaying the CPEI Data 156' within the DVIVD Event Data Match Audit Recorder 114'.

FIG. 19 displays a DVIVD Event Data Match Audit Recorder Reporting Components 188' as they relate to the DVIVD Match Audit System and 5 Star Event Data Recorder and Method Thereof according to the preferred embodiment of the present invention. The reporting components/modules include, but not limited to, the following:

A Header Component 174': A component of the DVIVD Event Data Match Audit Recorder 114' that displays the CPEI Owner 352' basic Information reported from a CPEI Data Tables 170' which reside in the Industry Core Database 106'.

A CPEI Data Match Testing Component 176': A component displaying the CPEI $1^{st}$ Data Auditing Process 128' and the CPEI $2^{nd}$ Data Auditing Process 150' testing results. The testing results display a match or mismatch between the CPEI Data 156' reported from the Industry Core Database 106' and the CPEI Data 156' inputted into the Industry Data Repository Database 104'.

A CPEI Effort Line Data Component 178': A component that visually displays CPEI Report 110 of the CPEI Owner 352. Said CPEI Report 110 is generated dynamically from the CPEI Data Tables 170 within the Industry Core Database 106.

A 5 Star Event Data Recorder Component 180': A component that displays the Audit Level Rating 132', 134', 136', 138', 140' details which includes 1) the Audit Level Rating 132', 134', 136', 138', 140' at which the CPEI Report 110' is currently rated, one to five Stars; and 2) the dates at which the Audit Level Rating 132', 134', 136', 138', 140' was achieved. The Audit Level Rating 132', 134', 136', 138', 140' data is dynamically reported from an Event Data Recorder Table 172' of the Industry Core Database 106'.

An Effort Instance Field Audit Event Data Meter 182': A component that displays the status of all the Elements 300' and the CPEI Data Fields 362' in the CPEI Report 110'. This status data is extracted from the Event Data Recorder Table 172' of the Industry Core Database 106'.

CPEI Exhibits 124: A component that displays all of the CPEI Exhibits 124' used to validate and verify the CPEI Report 110'. The CPEI Exhibits 124' are stored within the Industry Data Repository Database 104'.

FIG. 20 is a visual representation of the DVIVD Event Data Match Audit Recorder 114' according to the preferred embodiment of the DVIVD Match Audit System and 5 Star Event Data Recorder Method Thereof.

FIG. 20 displays the various reporting sections within the DVIVD Event Data Match Audit Recorder 114' which can include, but not limited to, a Header Section 190', a 5 Star Event Data Recorder Section 192', a CPEI Audit #1 and Audit #2 Data Match Testing Section 194', and an Element Owner and CPEI Data Field Audit Report Section 196'.

FIG. 20 displays the Header Section 190' is used to report the CPEI Owner 352' general data along with general CPEI information. This can include, but not limited to, the CPEI Owner's 352 name, the CPEI Owner 352 Core Database 106 ID#, and the CPEI Report 110 ID#.

The function of the 5 Star Event Data Recorder Section 192' is to report the Audit Level Rating 132', 134', 136', 138', 140' of the reported CPEI Report 110' and the date on which it was achieved. The Audit Level Rating 132', 134', 136', 138', 140' is depicted by a Star Icon 230', 232', 234', 236', 238' or a Check Mark Icon 240'. The date the Audit Level Rating 132', 134', 136', 138', 140' was achieved is depicted by displaying MM/DD/YYYY in a field next to the corresponding Star Icon 230', 232', 234', 236', 238' or Check Mark Icon 240'.

The 5 Star Event Data Recorder Section 192' in FIG. 20 displays an example of the DVIVD Event Data Match Audit Recorder 114' for a Primary CPEI 356' at the Audit Level #1 Rating 136'. However, the DVIVD Event Data Match Audit Recorder 114' is designed to facilitate the Primary CPEIs 356' as well as a Secondary Efforts 226', a Tertiary Efforts 228', an Auto Efforts 242', and an Auto Inference Associations 244' at a variety of Audit Level Ratings 132', 134', 136', 138', 140'. It should therefore be noted that both the Header Section 190' and 5 Star Event Data Recorder Section 192' will be reported differently based on CPEI type and the current Audit Level Rating 132', 134', 136', 138', 140'.

FIG. 21 displays the CPEI Audit #1 and Audit #2 Data Match Testing Section 194' of the DVIVD Event Data Match Audit Recorder 114' according to the preferred embodiment of the DVIVD Match Audit System and 5 Star Event Data Recorder Method Thereof.

According to FIG. 21, the CPEI Audit #1 and Audit #2 Data Match Testing Section 194' is used to display the Data Match Audit Testing Process 338' results that have occurred between the CPEI $1^{st}$ Data Auditing Process 128' and CPEI $2^{nd}$ Data Auditing Procedure 150'. This is indicated by an Audit Light Indicators 198' in FIG. 23 in a Data Match Testing Report 214' which details the results according to the following a. A Green Light Indicator 202' indicates that the CPEI Report 110' has passed the Data Match Audit Testing Process 338'.

b. A Red Light Indicator 204' indicates that the CPEI Report 110' has not passed the Data Match Audit Testing Process 338' and is reporting a mismatch.

c. A Yellow Light Indicator 206' indicates that the CPEI Data 156' has not been validated or verified by the CPEI Owner 352'.

d. A White Light Indicator 208' indicates that the Data Auditing Processes 334' have not been performed on the CPEI Report 110'.

According to FIG. 21, a Match/Mismatch Rollover Window 200' will appear when a viewer rolls over or mouses over the Audit Light Indicators 198' within the CPEI Audit #1 and Audit #2 Data Match Testing Section 194'. The Match/Mismatch Rollover Message Window 200' is used to detail a summary audit report as to the audit status of the CPEI 110'.

FIG. 21 displays two examples of the CPEI Audit #1 and Audit #2 Data Match Testing Section 194'. FIG. 27A is displaying a match, indicated by the Green Light Indicators 202', and FIG. 21B is displaying a mismatch, indicated by the Red Light Indicators 204'. The CPEI Audit #1 and Audit #2 Data Match Testing Section 194' will be reported differently based on the status of any given CPEI Report 110'.

Figure 22:
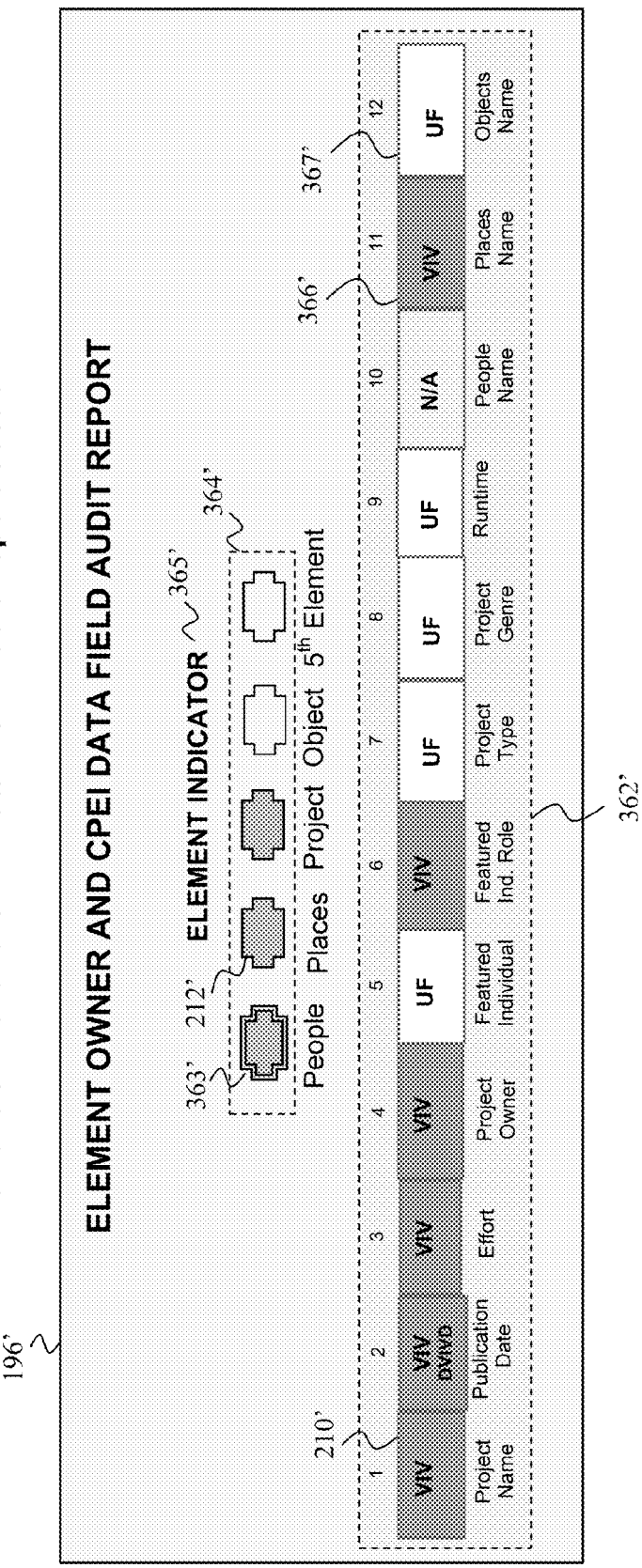
FIG. 22 displays the Element Owner and Formulaic Data Field Audit Report Section of the DVIVD Event Data Match Audit Recorder according to the above preferred embodiment of the present invention.

FIG. 22 displays the Element Owner and CPEI Data Field Audit Report Section 196' of the DVIVD Event Data Match Audit Recorder 114' according to the preferred embodiment of the DVIVD Match Audit System and 5 Star Event Data Recorder Method Thereof.

According to FIG. 22, the Element Owner and CPEI Data Field Audit Report Section 196' is used to display:

An Element Indicator 365' indicates to which Element 300' a reported Effort 354' belongs by displaying a double framed icon;

The Element Indicator 365' also indicates an Element Data Field 364' that has been fulfilled or not fulfilled;

The CPEI Data Fields 362' that appear within the Primary CPEI 356', the Secondary Efforts 226', the Tertiary Efforts 228', the Auto Efforts 242', and the Auto Inference Association 244';

Those CPEI Data Fields 362' that have been validated and verified;

Those CPEI Data Fields 362' that have not been validated and verified; and

Links to those CPEI Exhibits 124' used in the validation and verification of the CPEI Data Field 362'.

According to FIG. 22, CPEI Data Field Icons 210' for the CPEI Data Fields 362' currently fulfilled are highlighted. FIG. 22 details that an Element Icons 212' are highlighted when the corresponding Element 300' has System Auditor 348' approved association to a Project 306' which is the subject of the CPEI Report 110'.

FIG. 22 illustrates that the CPEI Data Field 362' displayed within the Element Owner Indicator and CPEI Data Field Audit Report Section 196' may contain a VIV Icon 366' indicating that the corresponding CPEI Data Field 362' has been validated and independently verified by an approved CPEI Exhibit 124'.

FIG. 22 illustrates the Primary CPEI 356' with Audit Level #3 Rating 136'. However, the DVIVD Event Data Match Audit Recorder 114' is designed to facilitate Primary CPEI 356' as well Secondary Efforts 226,' Tertiary Efforts 228', Auto Efforts 242', and Auto Inference Associations 244' at a variety of Audit Level Ratings 132', 134', 136', 138', 140'.

Figure 23:
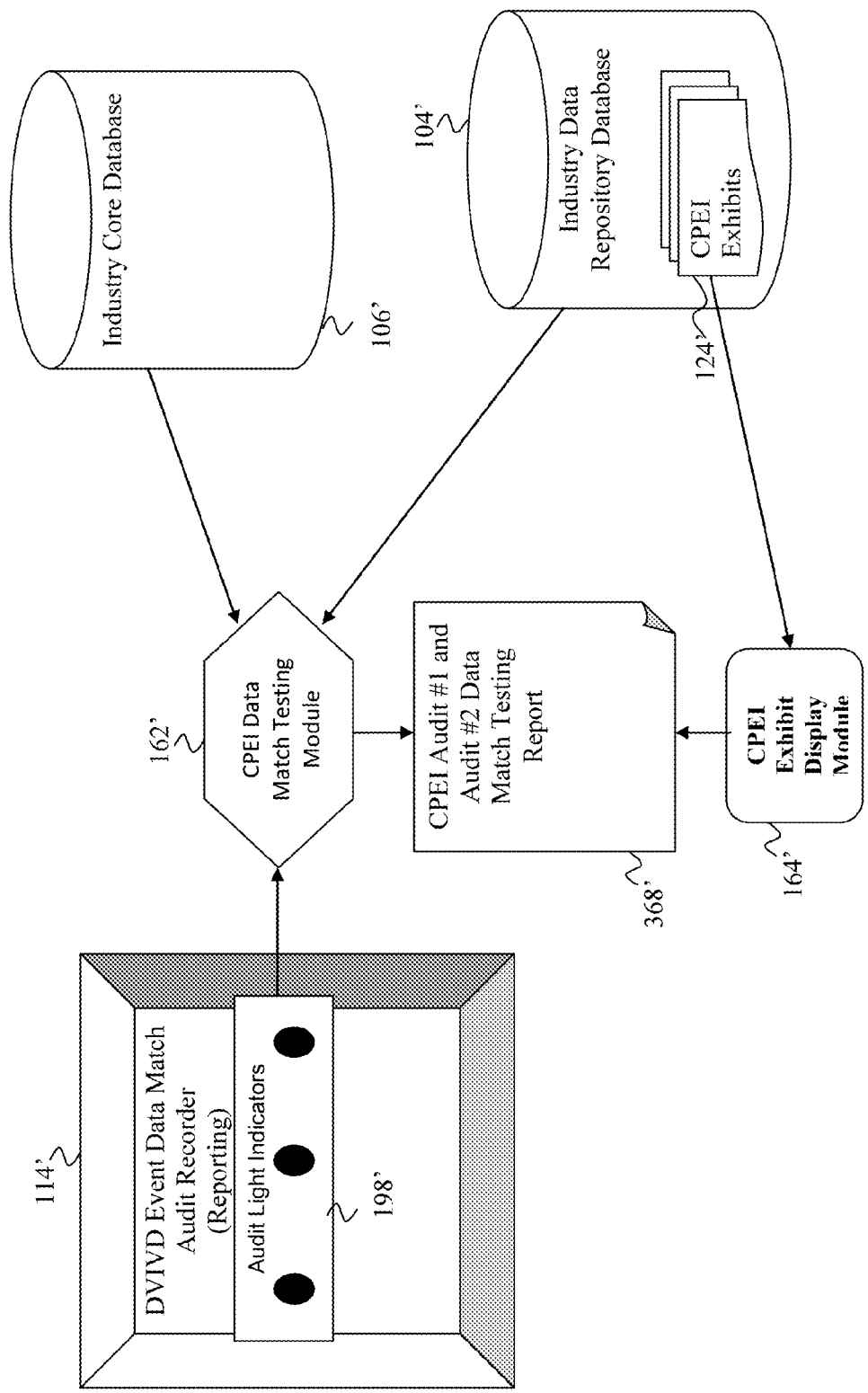
FIG. 23 displays the CPEI Data Match Testing Processes and Data Match Testing Reporting components of the DVIVD Event Data Match Audit Recorder according to the above preferred embodiment of the present invention.

FIG. 23 is a high line diagram that details the parameters and processes used to provide the Data Match Audit Testing Processes 338' of the DVIVD Event Data Match Audit Recorder 114' as related to the CPEI Audit #1 and Audit #2 Data Match Testing Section 194' use of the Audit Light Indicators 198'.

According to FIG. 23, the CPEI Data Match Testing Module 162' compares the CPEI Data 156' from both the Industry Data Repository Database 104' and the Industry Core Database 106'. This information is used by CPEI $1^{st}$ Data Auditing Process 128' and CPEI $2^{nd}$ Data Auditing Process 150', whereby the CPEI Data Match Testing Module 162' uses those CPEI Exhibits 124' stored within the Industry Data Repository Database 104' as a means for said comparison.

The CPEI Data Match Testing Module 162' is used to generate a CPEI Data Match Testing Report 368' that will include the CPEI Exhibits 124' for reference. The CPEI Data Match Testing Report 368' includes the Audit Light Indicators 198' within the CPEI Audit #1 and Audit #2 Data Match Testing Section 194' of the DVIVD Event Data Match Audit Recorder 114'. In addition, the specific details of said CPEI Data Match Testing Report 368' are displayed within a Match/Mismatch Message Rollover Window 200' that appears whenever a viewer rolls over the Match/Mismatch Light Indicators 198'.

Figure 24:
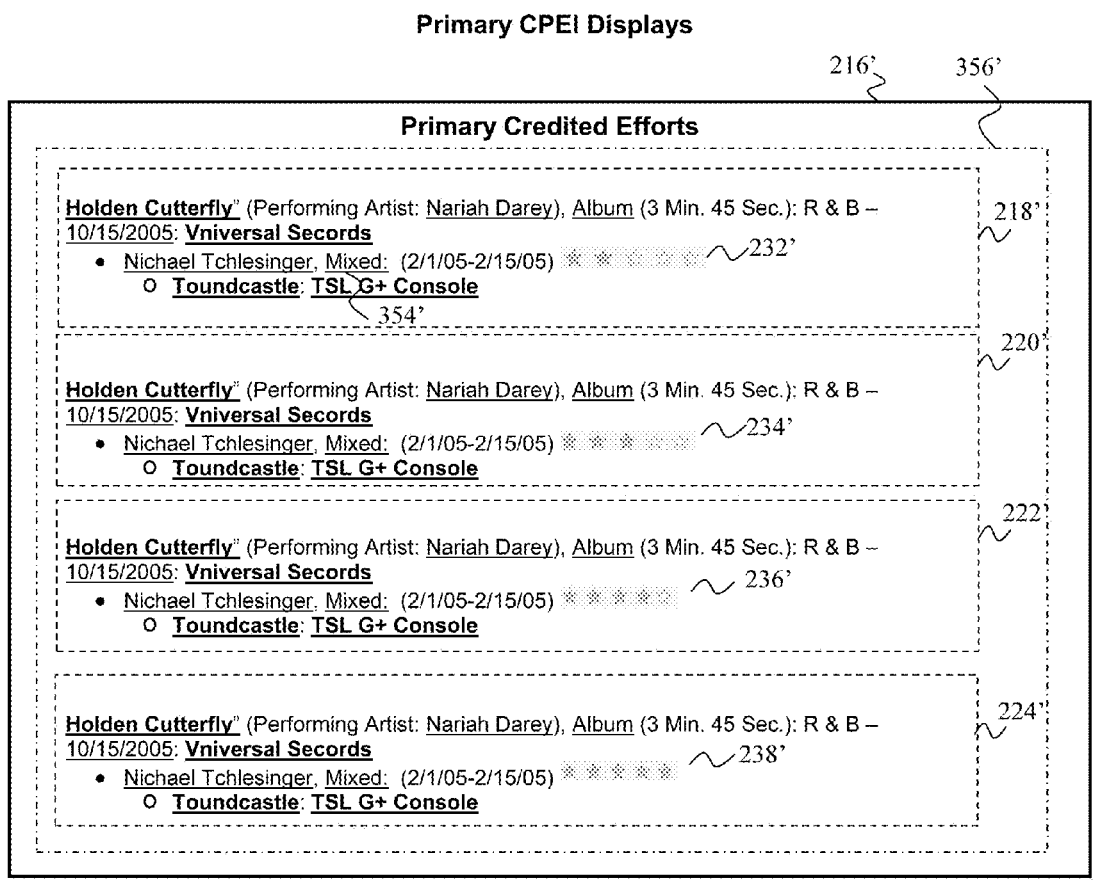
FIG. 24 illustrates an example of a report displaying a Primary Effort.

FIG. 24 illustrates an example of the Primary CPEI 356' displays with their corresponding Audit Level Rating 132', 134', 136', 138', 140'. FIG. 24 is an extension of FIG. 17, wherein FIG. 24 visually displays multiple Primary CPEIs 356' according to the following:

A Level #2 Primary CPEI 218': the Primary CPEIs 356' will be reported with the 2 Star Icon 232' when the Level #2 Rule 2 Audit Process 142' has been met and approved by the System Auditor 348' as defined within FIG. 17.

A Level #3 Primary CPEI 220': the Primary CPEIs 356' will be reported with the 3 Star Icon 234' when the Level #3 Rule 3 Audit Process 144' has been met and approved by the System Auditor 348' as defined within FIG. 17.

A Level #4 Primary CPEI 222': the Primary CPEIs 356' will be reported with the 4 Star Icon 236' when the Level #4 Rule 4 Audit Process 146' has been met and approved by the System Auditor 348' as defined within FIG. 17.

A Level #5 Primary CPEI 224': the Primary CPEIs 356' will be reported with the 5 Star Icon 238' when the Level #5 Rule 5 Audit Process 148' has been met and approved by the System Auditor 348' as defined within FIG. 17.

Figure 28:
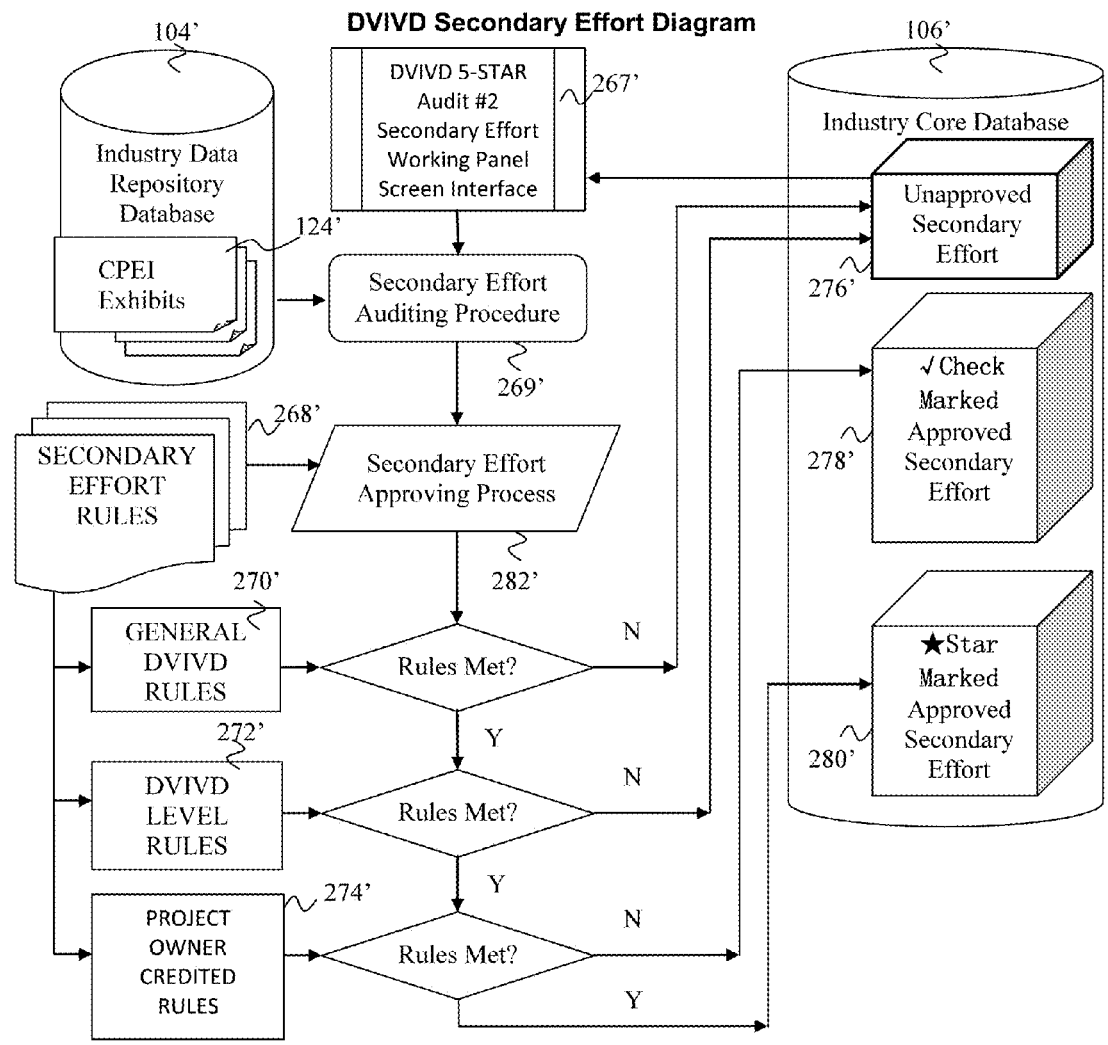
FIG. 28 describes the DVIVD Match Audit System and 5 Star Event Data Recorder Method Thereof with regard to the approval of Secondary Efforts according to the above preferred embodiment of the present invention.

FIG. 25 illustrates an example of a report displaying Secondary Effort 226' and Tertiary Effort 228' displays. FIG. 25 is an extension of FIGS. 28 and 29, wherein FIG. 25 visually displays the Secondary Effort 226' and Tertiary Effort 228' that are a result of the Data Auditing Processes 334' defined in FIGS. 28 and 29:

Secondary Effort 226' Display: Secondary Efforts 226' will be reported with the Check Mark Icon 240' when the Element 300' has an approved association to a Primary Element 370', wherein the association supported the Primary Element 370' in achieving their Primary CPEI 356', as shown in FIG. 28 and corresponding specifications.

Figure 29:
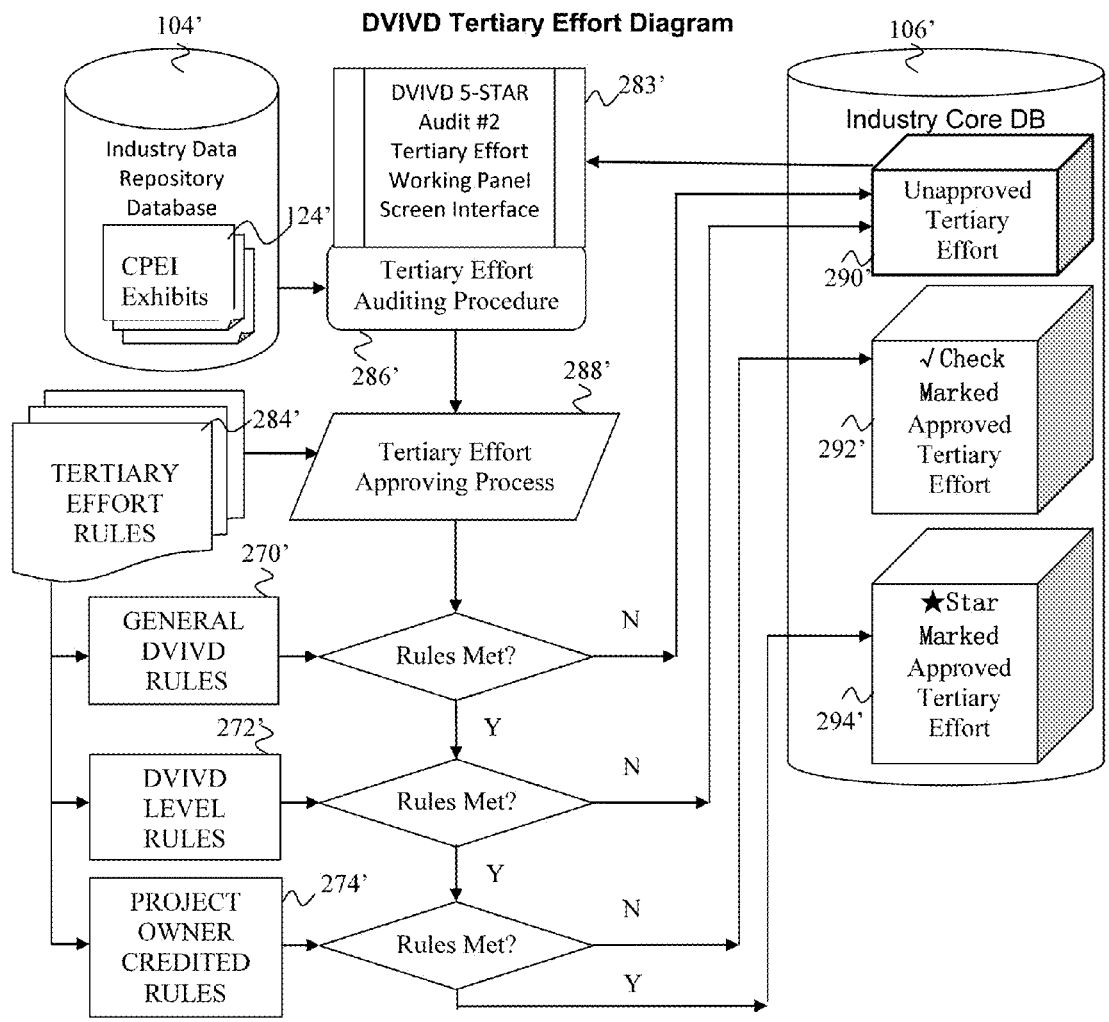
FIG. 29 describes the DVIVD Match Audit System and 5 Star Event Data Recorder Method Thereof with regard to the approval of Tertiary Efforts according to the above preferred embodiment of the present invention.

Tertiary Effort 228' Displays: Tertiary Efforts 228' will be reported with the Check Mark Icon 240' when the Element 300' has an approved association to a Secondary Element 372', wherein the association assisted the Secondary Element 372' in achieving their Secondary Effort 226', as shown in FIG. 29 and corresponding specifications.

Figure 26A:
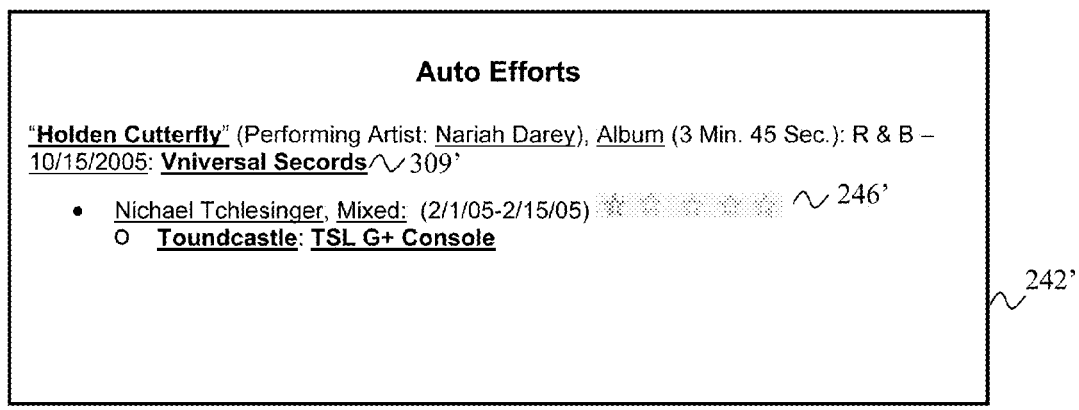
FIGS. 26A-26B illustrate an example of a report displaying an Auto Effort and an Auto Inference Association.
Figure 26B:
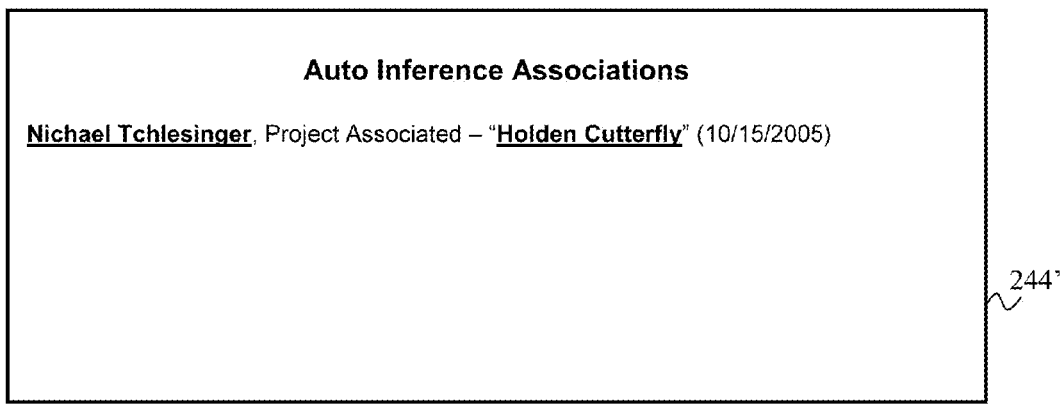
Figure 27:
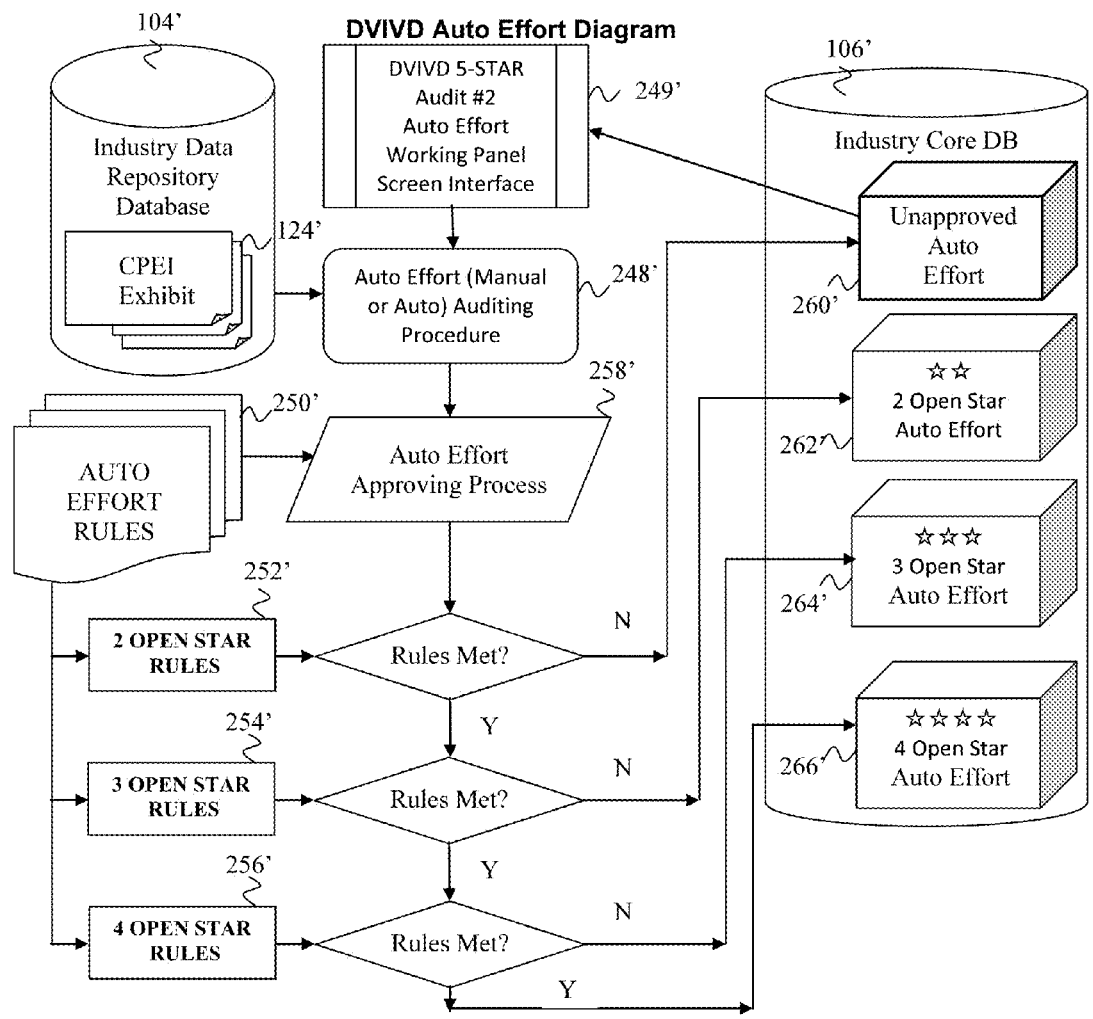
FIG. 27 describes the DVIVD Match Audit System and 5 Star Event Data Recorder Method Thereof with regard to the approval of Auto Efforts according to the above preferred embodiment of the present invention.

FIG. 26 illustrates an example of a report displaying Auto Effort 242' and Auto Inference Association 244' displays. FIG. 26 is an extension of FIGS. 27 and 30, wherein FIG. 25 visually displays the Auto Effort 242' and the Auto Inference Association 244' displays that are a result of the Data Auditing Processes 334' defined in FIGS. 27 and 30:

Auto Efforts 242' will be reported with an Open Star Icon 246', an outline of a star that is not filled in, according to an Auto Effort Rules 250' defined in FIG. 27.

Figure 30:
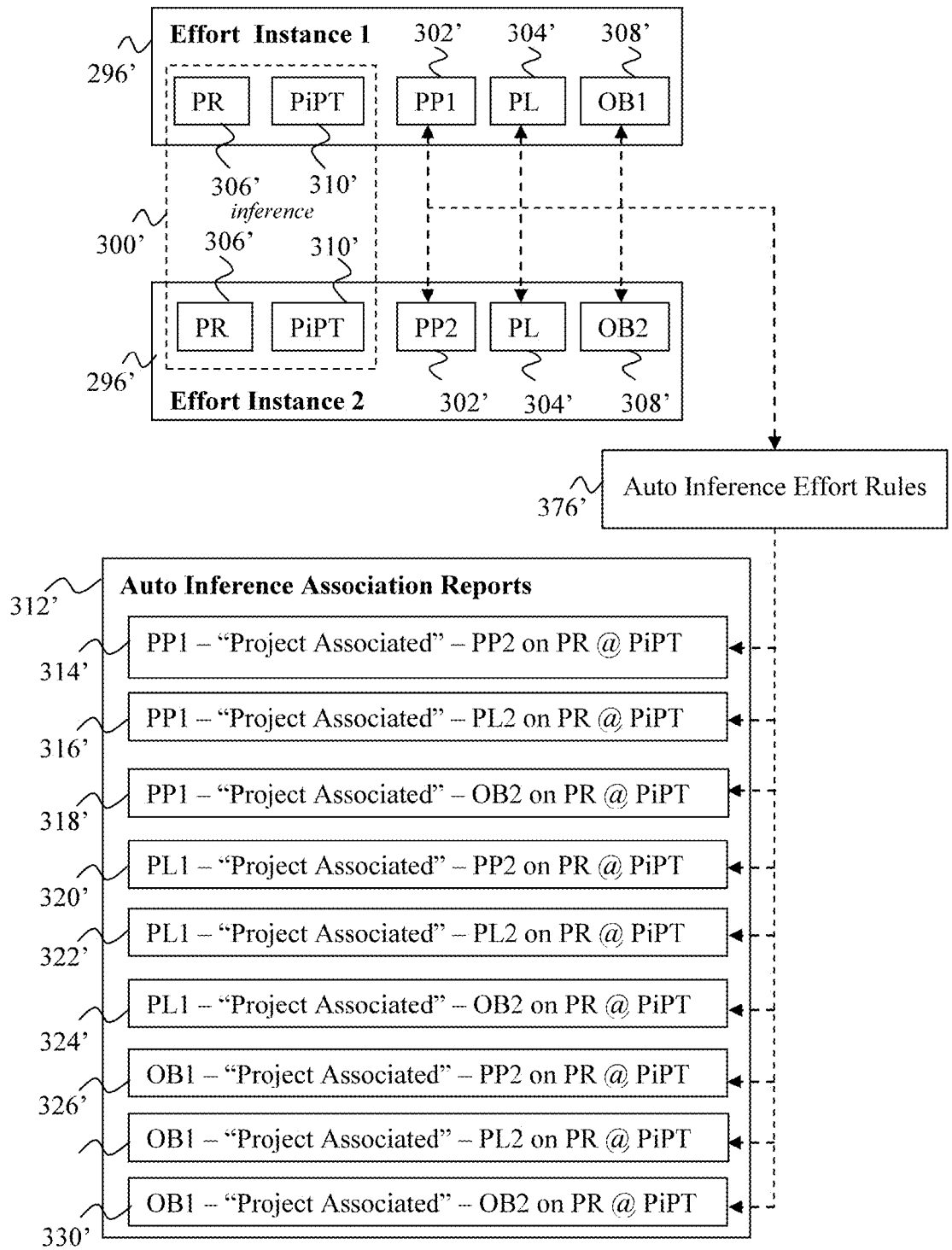
FIG. 30 describes the specific DVIVD Match Audit System and 5 Star Event Data Recorder Method for generating Auto Inference Associations according to the above preferred embodiment of the present invention.

Auto Inference Associations 244' will be reported according to an Auto Inference Effort Rules 376' defined in FIG. 30.

FIG. 27 illustrates the DVIVD Match Audit System and 5 Star Event Data Recorder Method Thereof with regard to the approval of Auto Efforts 242'.

FIG. 27 details how the System and Method validate and verify Auto Effort 242' data. The Auto Efforts 242' conform to the following Auto Effort Rules 250':

- Auto Efforts 242' are automatically generated by the System as a result of a Reciprocating Association 378' entered into the System by the Element 300' other than the owner. This includes the reporting of the Auto Efforts 242' when the Project 306' enters the Elements 300' who worked on the Project 306'.
- Auto Efforts 242' must pass through an Auto Effort, Manual or Auto, Auditing Procedure 248', even though the Auto Efforts 242' have not yet gone through the main Data Auditing Processes 334' that pertain to the Primary CPEIs 356'.
- Auto Efforts 242' are reported with Open Star Icons 246', the number of which are dependent on the number of the Elements 300' that are associated and displayed in the Auto Effort 242' according to the Level Rules Audit Processes 141', 142', 144', 146', 148'.
- Auto Efforts 242' may be generated by the System and Method Thereof via Reciprocating Associations 378'. For example, if a People 302' Element 300' inputs they used an Object 308' Element 300' on the Project 306', the Object 308'Element 300' will automatically receive the Auto Effort 242' reporting it was used by the People 302' on the Project 306'.
- Auto Efforts 242' can be reported with a minimum of two Elements 300' when the Project 306', which is a CPEI Domain Authority 309', submits an Element 300' had Effort 354' on the Project 306'.
- As more Element Data Fields 364' are fulfilled in the Auto Effort 242', the number of Open Star Icons 246' will increase. In other words, the Open Star Icons 246' will accumulate until all the Element Data Fields 364' are fulfilled.
- Auto Efforts 242' cannot become Primary CPEIs 356' until such time as the CPEI Owner 352' becomes a participant in the System and agrees to the Effort 354'. Upon agreement, the Auto Effort 242' will then be subject to the Data Auditing Process 334' pertaining to Primary CPEIs 356'.

FIG. 27 also details those validation and verification procedures for the Auto Efforts 242' as defined by the Auto Effort Rules 250'. Validation and verification procedures include the following:

- The System Auditor 348' can approve or reject the Auto Effort 242' via a DVIVD 5 Star Audit #2 Auto Effort Working Panel Screen Interface 249'. This procedure utilizes CPEI Exhibits 124' and established the Auto Effort Rules 250' as a means for approval. The CPEI Exhibits 124' are stored in the Industry Data Repository Database 104' and may be submitted by the owner of the Auto Effort 242' or the other Elements 300' involved in the Auto Effort 242'.
- If the Auto Effort Rules 250', and an Open Star Rules 252', 254', 256', have been met, the Auto Effort 242' will be stored in the Industry Core Database 106' as an Approved Auto Effort 259' with the corresponding Open Star Icons 246'. During this process, the Auto Effort 242' may be deemed the Primary CPEI 356' or simply remain in the Industry Core Database 106' as Approved Auto Effort 259'.
- If the Auto Effort Rules 250' have not been met, the Auto Effort 242' will be stored as an Unapproved Auto Effort 260' within the Industry Core Database 106' where it will remain inactive.

FIG. 28 details how the DVIVD Match Audit System and 5 Star Event Data Recorder Method Thereof validates and verifies Secondary Efforts 226'. The Secondary Efforts 226' are awarded to the Secondary Element 372' when the following a Secondary Effort Rules 268' have been met:

- The Secondary Effort 226' on Project 306' can be established in the System when the Element 300', also known as the Secondary Element 372', has an approved association to the Primary Element 370' on the Project 306', wherein the Secondary Element 372' supported the Primary Element 370' in achieving their Primary CPEI 356'.
- When approved by the Project 306' owner, the Secondary Effort 226' will display a Secondary Star Icon 241'; if not approved by the Project 306' owner, the Secondary Effort 226' will display Check Mark Icon 240'.
- The Secondary Efforts 226' will not be displayed if the Primary Element 370' disapproves.

FIG. 28 also details validation and verification audit procedures for the Secondary Efforts 226' as defined by the System and Method which include:

- The System Auditor 348' can approve or reject the Secondary Efforts 226' via a DVIVD 5 Star Audit 2 Secondary Effort Working Panel Screen Interface 267'. This is part of a Secondary Effort Auditing Process 282 which utilizes CPEI Exhibits 124' and established Secondary Efforts Rules 268' as a means for approval. The CPEI Exhibits 124' are stored in the Industry Data Repository Database 104' and may be submitted by the owner of the Secondary Effort 226' or the other Elements 300' involved in the Secondary Effort 226'.
- Secondary Effort Rules 268 include, but not limited to, a General DVIVD Rules 270', a DVIVD Audit Level Rules 272', and a Project Owner Credited Rules 274'.
- If the Secondary Effort 226' meets the requirements and rules defined by the General DVIVD Rules 270', the Secondary Effort 226' will move on to the DVIVD Audit Level Rules 272' process. However, if the General DVIVD Rules 270' are not met, the Secondary Effort 226' will be stored in the Industry Core Database 106' as an Unapproved Secondary Effort 276' where it will remain inactive.
- If the DVIVD Audit Level Rules 272' are met, the Secondary Effort 226' will move on to the Project Owner Credited Rules 274' process. However, if the DVIVD Audit Level Rules 272' are not met the Secondary Effort 226' will be stored in the Industry Core Database as Unapproved Secondary Effort 276' where it will remain inactive.
- If the Project Owner Credited Rules 274' are met, the Secondary Effort 226' will be stored in the Industry Core Database 106' as a Star Marked Approved Secondary Effort 280', wherein the Secondary Effort 226' will be displayed with the Secondary Star Icon 241'.
- If the Project Owner Effort Rules 274' have not been met, the Secondary Effort 226' will be stored in the Industry Core Database 106' as a Check Marked Approved Secondary Credit 278', wherein the Secondary Effort 226' is displayed with Check Mark Icon 240' which indicates that, while approved, it has yet to pass the Project Owner Credited Rules 274'.

FIG. 29 illustrates how the DVIVD Match Audit System and 5 Star Event Data Recorder Method Thereof validates and verifies Tertiary Efforts 228'. The Tertiary Efforts 228 are awarded when a Tertiary Effort Rules 284' have been met and approved:

Tertiary Efforts 228' can be established when the Element 300', also known as a Tertiary Element 374', has an approved association to the Secondary Element 372' with the Secondary Effort 226', wherein the approved association assisted the Secondary Element 372' in achieving the Secondary Effort 226'.

Tertiary Efforts 228' must be approved by the Secondary Element 372' which is the subject of the Secondary Effort 226' to which the Tertiary Effort 228' is associated. When approved by the Secondary Element 372', the Tertiary Effort 228' will display the Check Mark Icon 240'.

FIG. 29 also details the validation and verification procedures for the Tertiary Efforts 228' as defined by the System and Method Thereof. Validation and Verification procedures include the following:

The System Auditor 348' can approve or reject the Tertiary Efforts 228' via a DVIVD 5 Star Auditor Tertiary Working Panel Screen Interface 283'. This is part of a Tertiary Effort Auditing Procedure 286' which utilizes CPEI Exhibits 124' and established Tertiary Efforts Rules 284' as a means for approval. The CPEI Exhibits 124' are stored in the Industry Data Repository Database 104' and may be submitted by the owner of the Tertiary Effort 228' or the other Elements 300' involved in the Tertiary Effort 228'.

The Tertiary Effort Rules 284 include, but not limited to, General DVIVD Rules 270', DVIVD Audit Level Rules 272', and Project Owner Credited Rules 274'.

If the Tertiary Effort 228' meets the requirements and rules defined by the General DVIVD Rules 270', the Tertiary Effort 228' will move on to the DVIVD Audit Level Rules 272' process. However, if the General DVIVD Rules 270' are not met, the Tertiary Effort 228' will be stored in the Industry Core Database 106' as an Unapproved Tertiary Effort 290' where it will remain inactive.

If the DVIVD Audit Level Rules 272' are met, the Tertiary Effort 228' will move on to the Project Owner Credited Rules 274' process. However, if said DVIVD Audit Level Rules 272' are not met, the Tertiary Effort 228' will be stored in the Industry Core Database 106' as Unapproved Tertiary Effort 290' where it will remain inactive.

If the Project Owner Credited Rules 274' are met, the Tertiary Effort 228' will be stored as a Star Marked Approved Tertiary Effort 294' within the Industry Core Database 106, wherein the Tertiary Effort 228' will be reported with a Tertiary Star Icon 243' indicating its approval status.

If the Project Owner Credited Rules 274' have not been met, the Tertiary Effort 228' will be stored in the Industry Core Database 106' as a Check Marked Approved Tertiary Effort 292' which indicates that, while approved, it has yet to pass the Project Owner Credited Rules 274'.

FIG. 30 describes the specific DVIVD Match Audit System and 5 Star Event Data Recorder Method Thereof in regards to Auto Inference Associations 244'. Auto Inference Association Rules 376' include, but are not limited to, the following:

1. The Auto Inference Associations 244' are automatically generated by the System when two Elements 300' in the System enter an Effort Instances 296' having Efforts 354' on a common Project 306' at a common Point in Phasetime 310'. These associations are called an Inference 298'.

2. The Auto Inference Associations 244' are not stored in the tables in the Industry Core Database 106'; they are generated dynamically by the System based on the Auto Inference Association Rules 376'.

3. The Auto Inference Associations 244' are considered unverified associations.

4. Only the individual Elements 300', the Project 306', and the Point in Phasetime 310' can be ascribed to those data fields in the Auto Inference Association 244'.

5. The System will utilize an auto responder technology to contact the Elements 300' in the Auto Inference Association 244' to seek cooperation in verifying and validating the Inference 298' data.

6. If the Auto Inference Association 244' is confirmed by the Element 300' in the Auto Inference Association 244', the Element 300' can request that it be converted to the Primary CPEI 356' through the various Data Auditing Processes 334' which use the CPEI Exhibits 124' to verify and validate the data.

7. When the Auto Inference Associations 244' are verified through the Data Auditing Processes 334', the approved associations will be entered into the Industry Core Database 106'.

Referring to FIGS. 31-57, the dynamic method of the present invention is a dynamic live computer-based database formula method operated in an infrastructure search system which, when queried, conjoins project effort instance report data from formula input and stored data, into well formatted functional interaction designed rated CPEI displays that hyperlink element Primary, Secondary, Tertiary, Auto Efforts and Auto Inference Associations to CPEI associations, whether or not efforts are credited by a project owner and whether or not efforts are inputted by an element or generated from other inputted effort event data automatically.

Figure 31:
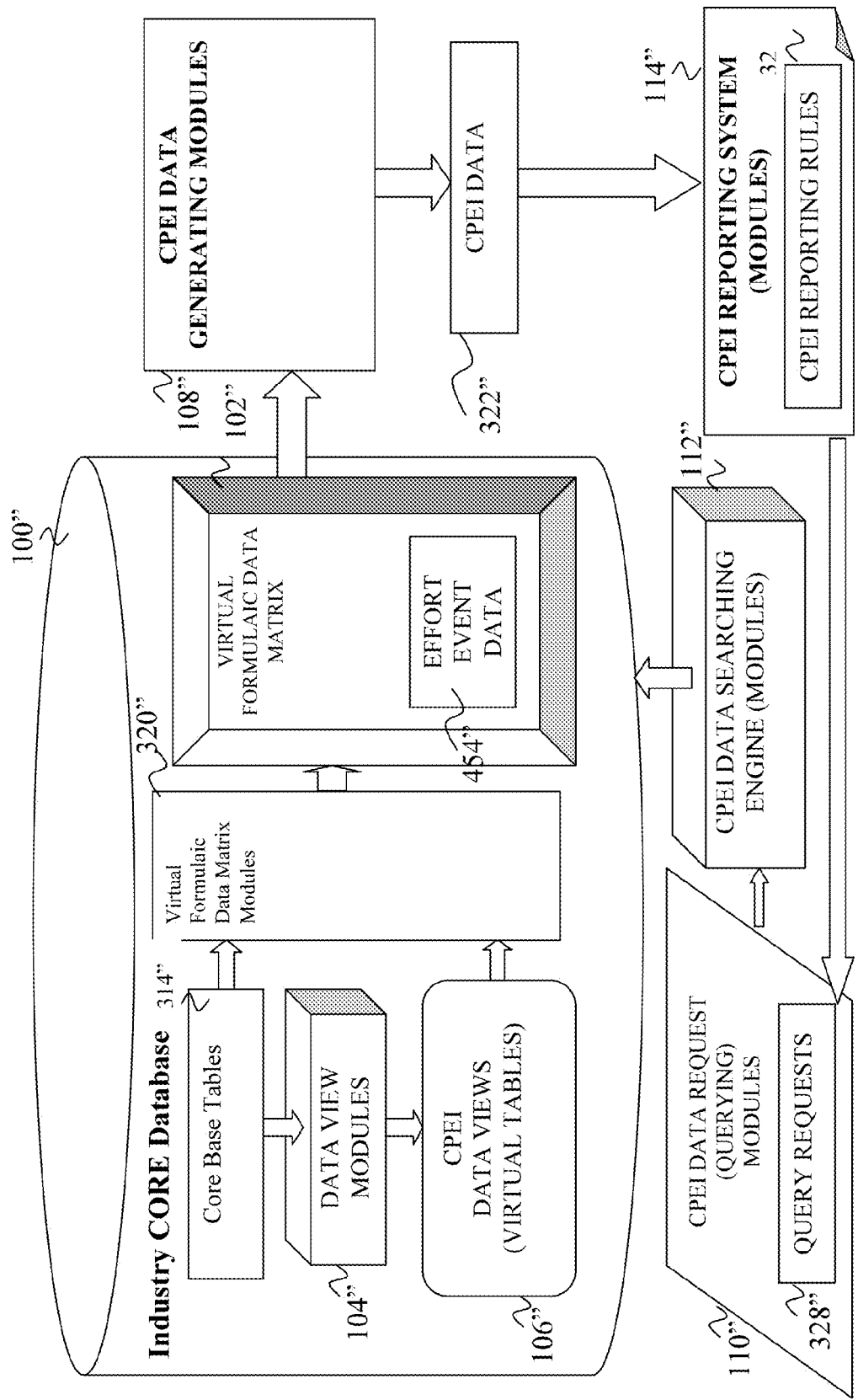
FIG. 31 is a Conjoined Project Effort Instance (CPEI) Data Logic Flow Chart according to the above preferred embodiment of the present invention.

FIG. 31 illustrates an overview of System Data Flow as it relates to the "Formulaic Conjoined Project Effort Instance Display Method and Search System Process Thereof" according to the preferred embodiment of the present invention. It comprises an Industry Core Database 100" including a Base Tables 314", a Data View Modules 104", a CPEI Data View (Virtual Tables) 106", and a Virtual Formulaic Data Matrix Modules 320".

A CPEI Data 322" is generated from a Virtual Formulaic Data Matrix 102" portion of the Industry Core Database 100" via a CPEI Data Generating Module 108" in response to a CPEI Data Request (Querying) Module 110" request in compliance with established a CPEI Reporting Rules 324", per a Formulae Formal Language Semantic Infrastructure, Formal Syntax, and CPEI Report Display Rules 550".

In addition, a Formulaic CPEI Report 188", 190", 192", 194", 196", 198", 200", 202", 204", 206", 208", 210", 246", 252", 258", 264", 270", 272", 274", or 276" is reported via a CPEI Reporting System (Modules) 114" in response to a Query Requests 328" which are generated via the CPEI Data Request (Querying) Modules 110". The CPEI Data Request (Querying) Module 110" requests are driven by a CPEI Data Searching Engine (Modules) 112".

Figure 32:
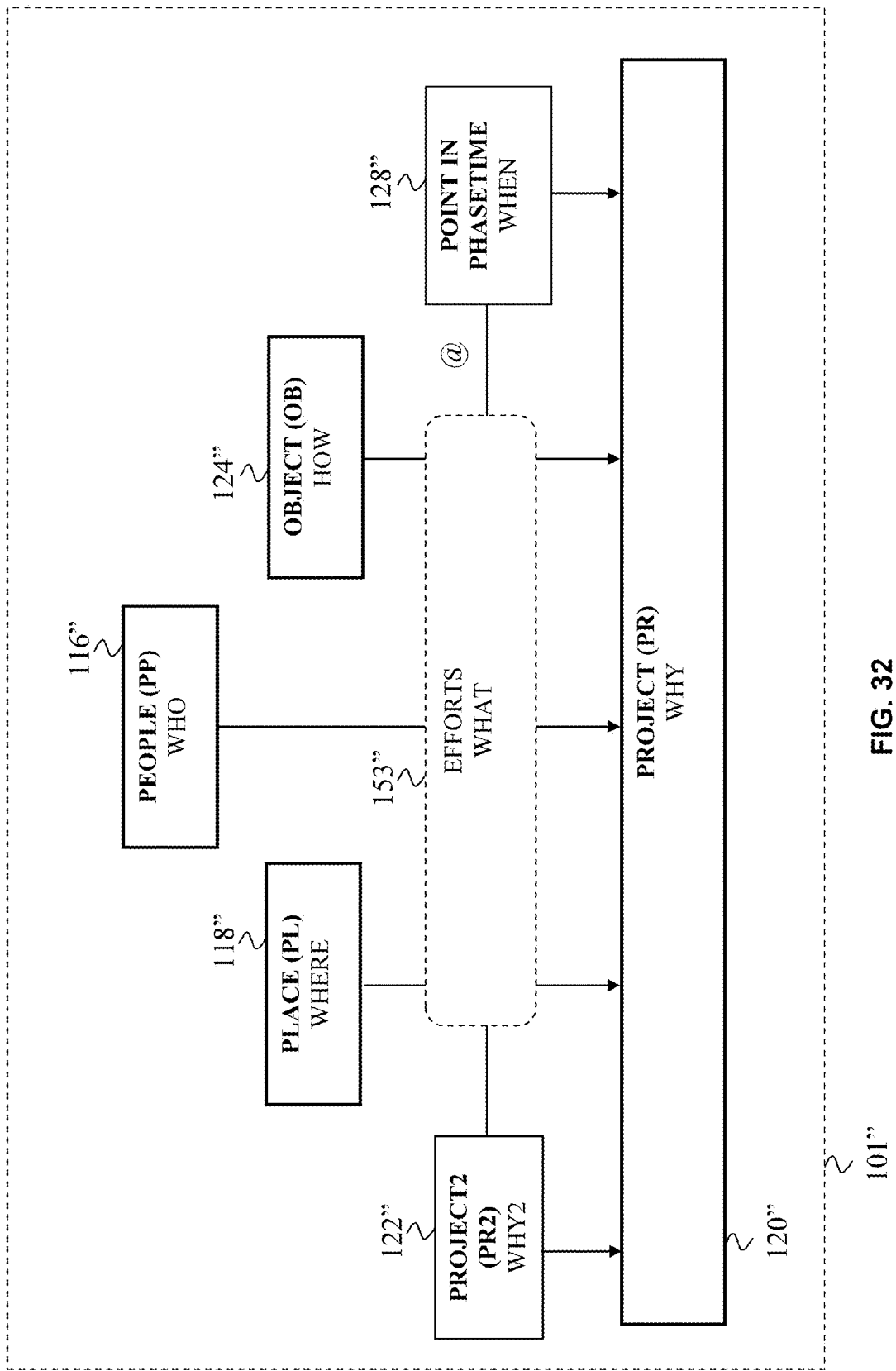
FIG. 32 is a Formulaic Element Diagram according to the above preferred embodiment of the present invention.

FIG. 32 illustrates the association capabilities of an Element 101" and an Effort Instance 186" as related to the "Formulaic Effort Instance Conjoined Project Effort Display Reporting Method and System Thereof" of the preferred embodiment of the present invention.

According to FIG. 32, the "Formulaic Effort Instance Conjoined Project Effort Display Reporting Method and System" comprises the Elements 101" and data that are entered into the System and Method as an Element Relational and Attribute Data 105" (170", 172", 174", 176", 178", 180", 182", 184") as well as a Point in Phasetime 128" values. Said Element 101" data is entered, stored, and reported according to a Who did What for Whom Formulae 103", as shown in FIGS. 37, 38, 39, 40.

The Elements 101" can include, but not limited to, a People (PP) 116", a Places (PL) 118", a Projects (PR) 120", an Objects (OB) 124", a Point in Phasetime (PiPT) 128".

The Element Relational and Attribute Data 105" (170", 172", 174", 176", 178", 180", 182", 184") includes profile or biographical information, such as physical characteristics, educational information, talent and skill data, awards data, contact info, project genres, publications dates, Point in Phasetime 128" start and end dates, and other attributes of the particular Element 101".

FIG. 32 also illustrates that associations between the Elements 101" are formed within the System using a Formula Associative Data Value 115". According to System rules, Elements 101" are associated to the Project (PR) 120" through the specific Formula Associative Data Value defined as the Element's 101" an Effort 153" on that Project 120". The Effort 153" illustrates an exertion (or use of energy) expended on the Project (PR) 120" by the Element 101" in the development of an end product. They include:

People (PP) 116" Effort 153" on Project (PR) 120"=A Role 154"

Places (PL) 118" Effort 153" on Project (PR) 120"=A Services 156"

A Project2 (PR2) 122" Effort 153" on Project (PR) 120"=A Project to Project2 PR-PR (Contribution) 158"

Object (OB) 124" Effort 153" on Project (PR) 120"=A Utilization 160"

Figure 33:
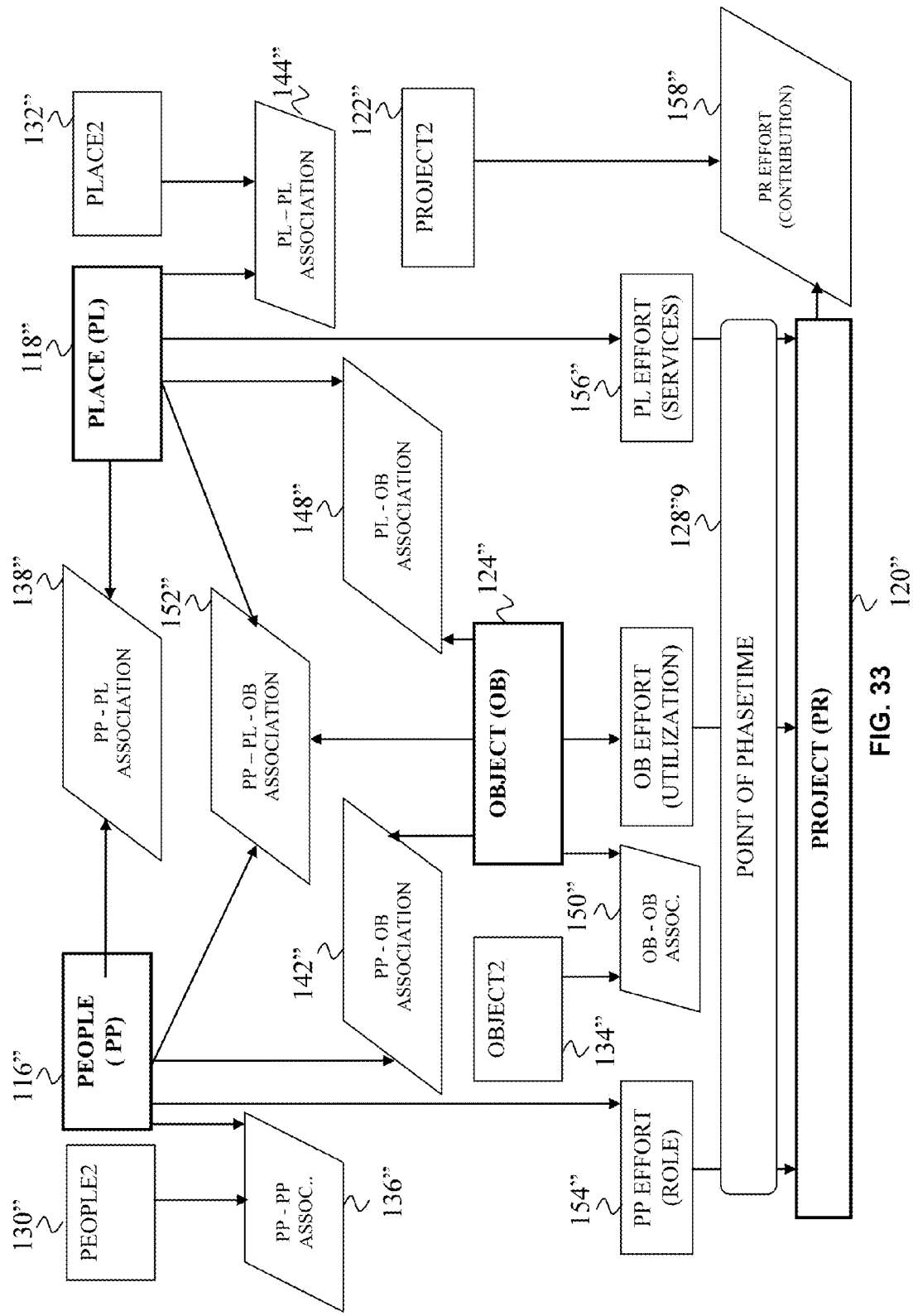
FIG. 33 is a Formulaic Matrix Diagram according to the above preferred embodiment of the present invention.

FIG. 33 illustrates the associative characteristics of the "Formulaic Effort Instance Conjoined Project Effort Display Reporting Method and System Thereof" as it relates to the Virtual Formulaic Data Matrix 102" used in the reporting of the Formulaic CPEI Report 188", 190", 192", 194", 196", 198", 200", 202", 204", 206", 208", 210", 246", 252", 258", 264", 270", 272", 274", 276".

FIG. 33 establishes that the System and Method that includes the Effort Instances 186" further comprises the Elements 101" associated to one another via the Efforts 153" thereof on the Project (PR) 120" at the Point in Phasetime (PiPT) 128". FIG. 33 further illustrates the function of the Point in Phasetime 128", as a virtual 5$^{th}$ Element 101", and as an essential component in the association of all the Elements 101" to one another.

FIG. 33 also illustrates that the following associations can be made between the Elements 101" wherein the Point in Phasetime 128" value is used to represent a period of time in which the association occurs:

People to Project Association (Role) 154"=The Formula Associative Data Value 115" defines "what People (PP) 116" did on the Project (PR) 120" at the given Point In Phasetime (PiPT) 128".

Places to Project Association (Service) 156"=The Formula Associative Data Value 115" defines "what Places (PL) 118" did on the Project (PR) 120" at the given Point in Phasetime (PiPT) 128".

Object to Project Association (Utilization) 160"=The Formula Associative Data Value 115" defines "what Object (OB) 124" did on the Project (PR) 120" at the given Point In Phasetime (PiPT) 128".

A People to Places Association (PP-PL ASSOC) 138"=The Formula Associative Data Value 115" ties People (PP) 116" to Places (PL) 118" at the given Point In Phasetime (PiPT) 128".

A People to Objects Association (PP-OB ASSSOC) 142"=The Formula Associative Data Value 115" ties People (PP) 116" to Objects (OB) 124" at the given Point In Phasetime (PiPT) 128".

A Places to Objects Association (PL-OB ASSOC) 148"=The Formula Associative Data Value 115" ties Places (PL) 118" to Objects (OB) 124" at the given Point In Phasetime (PiPT) 128".

Projects to Project2 Association (Contribution) 158"=The Formula Associative Data Value 115" defines "what a Project2 (PR2) 122" did on Project (PR) 120" at the given Point in Phasetime (PiPT) 128".

Figure 34:
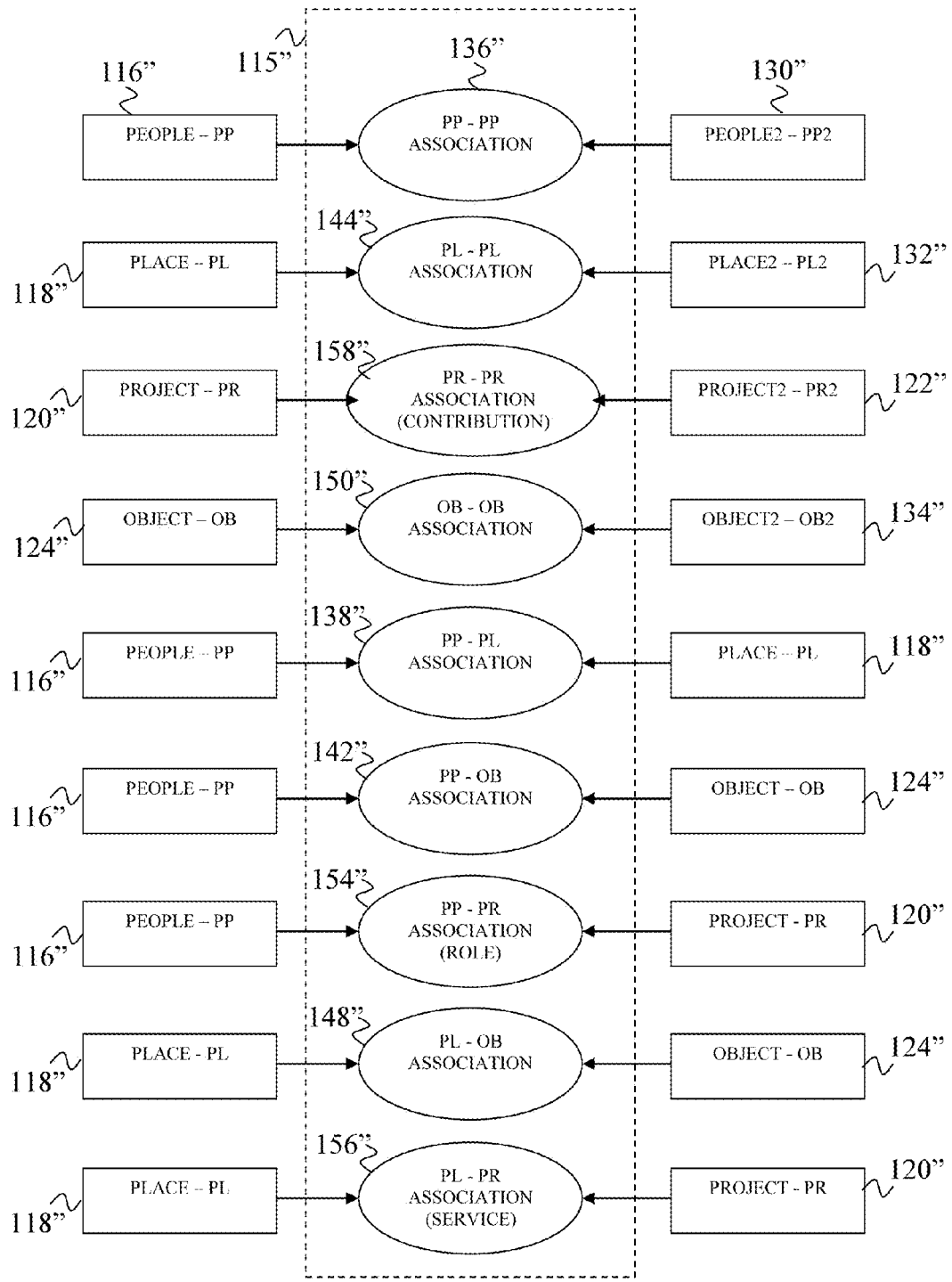
FIG. 34 is a Two Element Association Diagram according to the above preferred embodiment of the present invention.

FIG. 34 is a diagram illustrating the two Element Associations that are stored within the Virtual Formulaic Data Matrix 102" according to the "Formulaic Effort Instance Conjoined Project Effort Display Reporting Method and System Thereof" of the preferred embodiment of the present invention.

As illustrated in FIG. 34, the System and Method comprises two Element 101" association structure. Two Element 101" association structures are used by the System to create the more complex associations used in Effort Instances 186":

A People to People Association (PP-PP ASSOC) 136"—Occurs when two People 116" Elements 101" are input and stored as associated to one another. The association is stored within the corresponding Base Table 314".

A Places to Places Association (PL-PL ASSOC) 144"—Occurs when two Places 118" Elements 101" are input and stored as associated to one another. The association is stored within the corresponding Base Table 314".

Project to Project Association (Contribution) 158"—Occurs when two Project 120" Elements 101" are input and stored as associated to one another. The association is stored within the corresponding Base Table 314".

An Object to Object Association (OB-OB ASSOC) 150"—Occurs when two Object 124" Elements 101" are input and stored as associated to one another. The association is stored within the corresponding Base Table 314".

People to Places Association (PP-PL ASSOC) 138"—Occurs when the People 116" Element 101" and the Places 118" Element 101" are input and stored as associated to one another. The association is stored within the corresponding Base Table 314".

The People to Object Association (PP-OB ASSOC) 142"—Occurs when the People 116" Element and the Object 124" Element 101" are input and stored as associated to one another. The association is stored within the corresponding Base Table 314".

The People to Project Association (Role) 154"—Occurs when the People 116"Element 101" and the Project 120" Element 101" are input and stored as associated to one another. The association is stored within the corresponding Base Table 314".

The Places to Objects Association (PL-OB ASSOC) 148"—Occurs when the Places 118" Element 101" and the Object 124" Element 101" are input and stored as associated to one another. The association is stored within the corresponding Base Table 314".

The Places to Project Association (Services) 156"—Occurs when the Places 118"Element 101" and the Project 120" Element 101" are input and stored as associated to one another. The association is stored within the corresponding Base Table 314".

Figure 35:
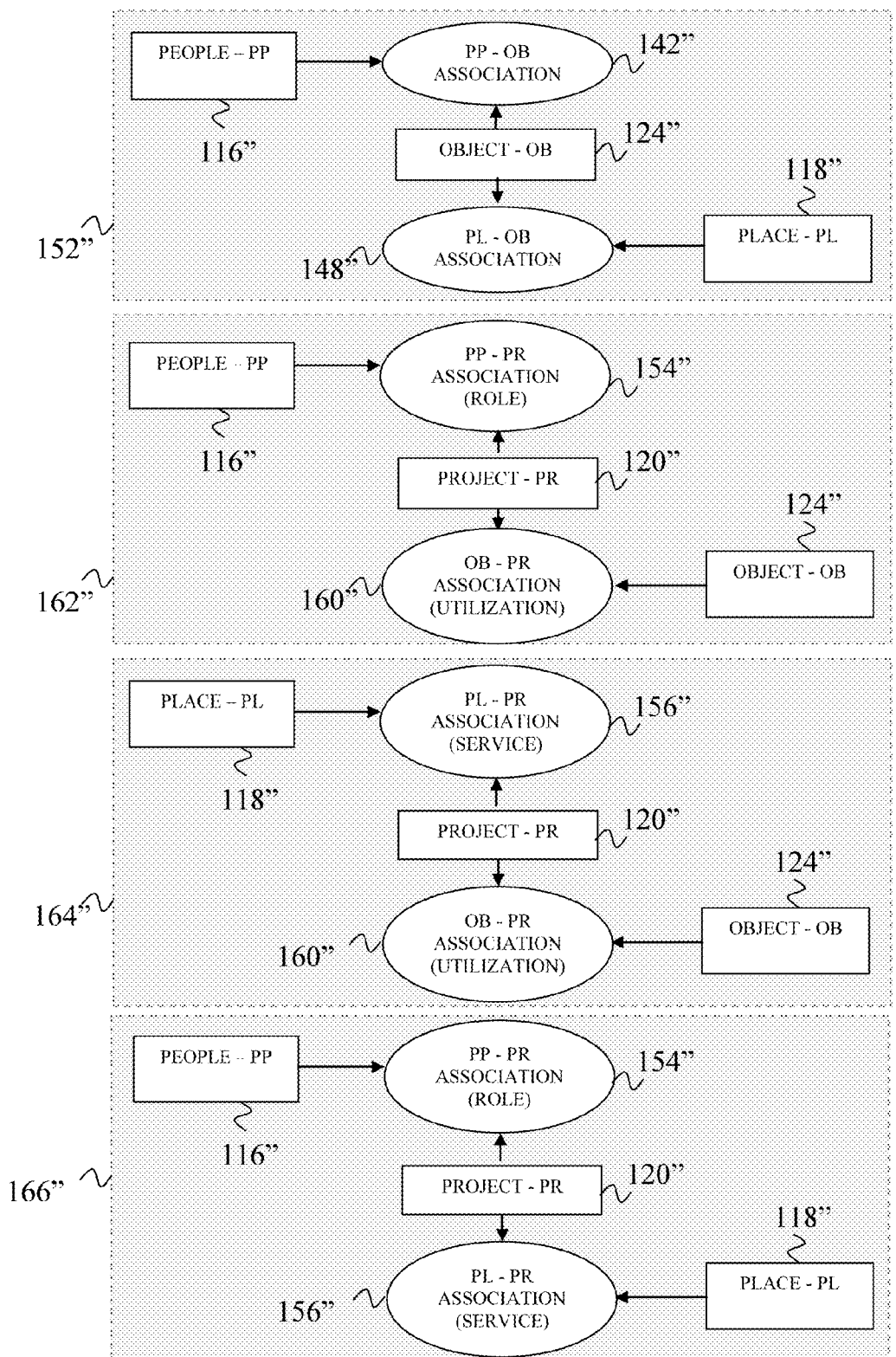
FIG. 35 is a Three Element Association Diagram according to the above preferred embodiment of the present invention.

FIG. 35 is a diagram illustrating all of three Element 101" association structure that is stored within the Virtual Formulaic Data Matrix 102" according to the "Formulaic Conjoined Project Effort Instance Display Method and Search System Process Thereof" of the preferred embodiment of the present invention.

According to FIG. 35, the System and Method comprises the following three Element 101" association structures that are combinations the two Element 101" association structures. The three Element 101" association structure is used by the System to create the more complex associations used in Effort Instances 186" within the Virtual Formulaic Data Matrix 102":

A People to Places to Object Association (PP-PL-OB ASSOC) 152"—Occurs when a PP-OB Association 142" and the PL-OB Association 148" are combined. The PP-PL-OB Association 152" includes shared Object 124" Element 101", wherein the Object 124" Element 101" was "used by" the People 116" Element 101" at the Places 118" Element 101".

A People to Project to Object Association (PP-PR-OB ASSOC) 162"—Occurs when the PP-PR Association (Role) 154" and the PR-OB Association (Utilization) 160" are combined. The PP-PR-OB Association 162 comprises the shared Project 120" Element 101", wherein the Object 124" Element 101" was "used by" the People 116" Element 101" on the Project 120" Element 101".

A Places to Project to Object Association (PL-PR-OB ASSOC) 164"—Occurs when the PL-PR Association (Services) 156" and the PR-OB Association (Utilization) 160" are combined. The PL-PR-OB Association 164 comprises the shared Project 120" Element 101", wherein said Object 124" Element 101" was used at the Places 118" Element 101" on the Project 120" Element 101".

A People to Project to Places Association (PP-PR-PL ASSOC) 166"—Occurs when a PP-PR Association (Role) 154" and the PL-PR Association (Services) 156" are combined. The PP-PR-PL Association 166" comprises the shared Project 120" Element 101", wherein said People 116" Element 101" performed the Effort 153" on the Project 120" Element 101" at the Places 118" Element 101".

FIG. 35 also illustrates that the three Element 101" association structure is comprised of Elements 101" tied together by Formulaic Associative Data Values 115" stored within the Virtual Formulaic Data Matrix 102".

Figure 36:
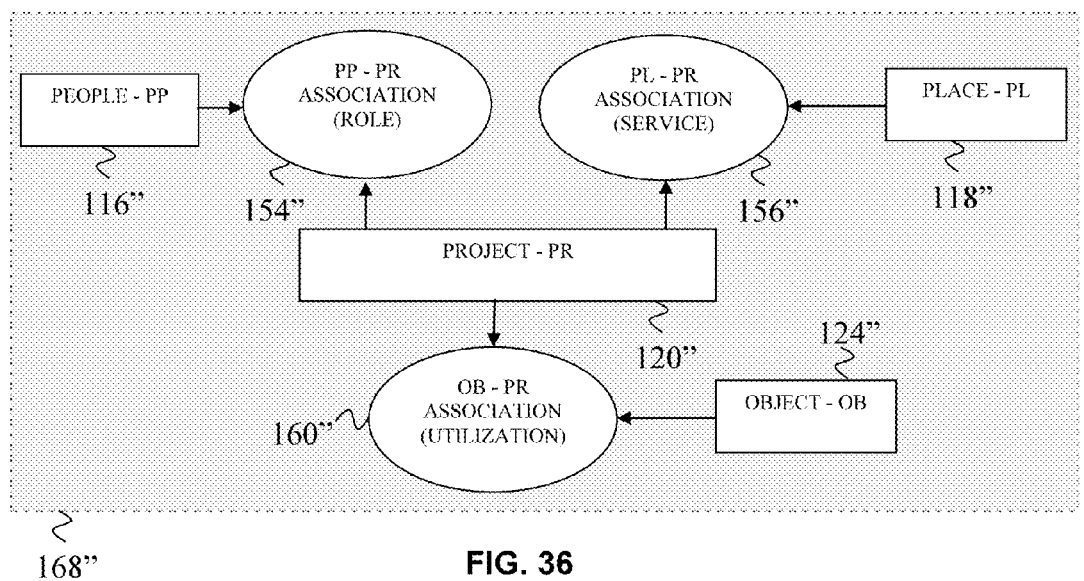
FIG. 36 is a Four Element Association Diagram according to the above preferred embodiment of the present invention.

FIG. 36 illustrates a four Element 101" association structure that is stored within the Virtual Formulaic Data Matrix 102" according to the "Formulaic Conjoined Project Effort Instance Display Method and Search System Process Thereof" of the preferred embodiment of the present invention.

According to FIG. 36, the System and Method comprises the following four Element 101" association structures that combine the three Element 101" association structure defined in FIG. 34. When tied with the Point in Phasetime (PiPT) 128" value, the four Element 101" association structures become Effort Instances 186" within the Virtual Formulaic Data Matrix 102":

A People to Places to Project to Objects Association (PP-PL-PR-OB ASSOC) 168"—Occurs when the PP-PR-OB Association 162", PP-PR-PL Association 166", PL-PR-OB Association 164", and a PP-PL-OB Association 152" are combined, wherein the new association is based on the shared Project 120" Element 101", and wherein the People 116" Element 101" used the Object 124" Element 101" at the Places 118" Element 101" on the Project 120" Element 101". All of the Elements 101" used in the four Element 101" association structures are tied together by Formula Associative Data Values 115" stored within the Virtual Formulaic Data Matrix 102".

Figure 37:
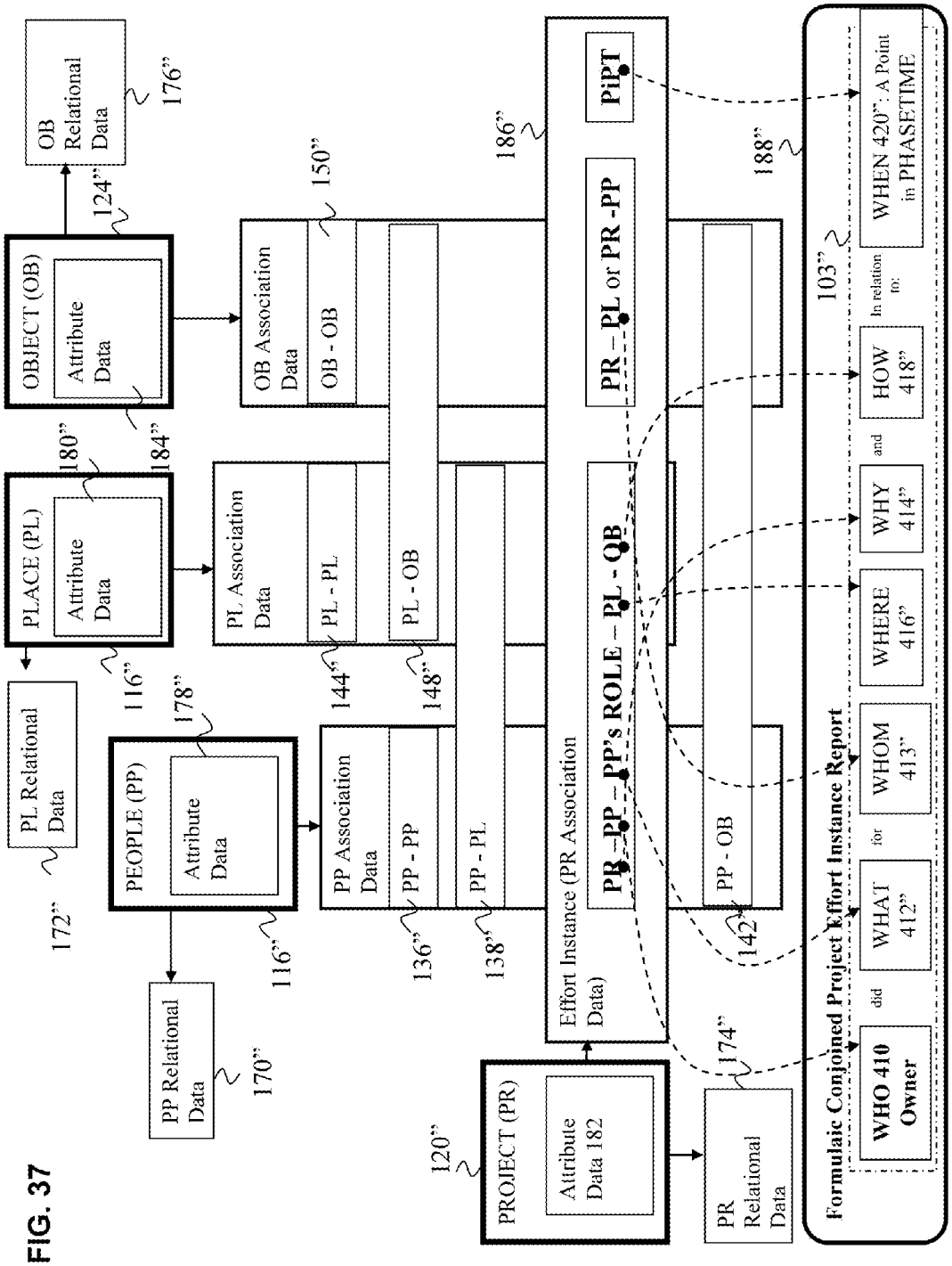
FIG. 37 is a Primary Formulaic CPEI Diagram for People according to the above preferred embodiment of the present invention.

FIG. 37 is a diagram illustrating how the Effort Instances 186" are created from the combination of four Element 101" association structures that are tied together by the Point in Phasetime (PiPT) 128", wherein the Effort Instances 186" are used to generate a Primary People CPEI 188" Report from established CPEI Reporting Rules 324", and wherein the Primary People CPEI 188" Reports contain Formulaic Primary Data Fields 330".

Specifically, FIG. 37 builds on FIGS. 4-6 by defining how People CPEI 188" Reports are generated from the Effort Instance 186" that comprise the following Element 101" associations tied together by the Point In Phasetime (PiPT) 128":

People Associations:
  People to People (PP-PP) 136"
  People to Places (PP-PL) 138"
  People to Objects (PP-OB) 142"
  People to Projects (Role) 154"
Places Associations
  Places to Places (PL-PL) 144"
  Places to Objects (PL-OB) 148"
  Places to Projects (Services) 156"
Objects Associations
  Objects to Objects (OB-OB) 150"
  Objects to Projects (Utilization) 160"

According to FIG. 37, the Effort Instance 186" can be generated from a People's Point of View 332" when the People 116" Element 101" (owner) has the Effort 153" on the Project 120" at the given Point in Phasetime (PiPT) 128". The Effort 153" is the People to Project Association PP-PR (Role) 154" which illustrates an exertion (or use of energy) expended on the Project 120" by the People 116" in the development of a product.

FIG. 37 also establishes Effort Instances 186" comprising associated datasets of interrelated Element 101" data which is associated together by Efforts 153" on the common Project 120" at the given Point in Phasetime (PiPT) 128".

According to FIG. 37, the Primary People CPEI 188" Report is derived and reported from said Effort Instance 186" within the Virtual Formulaic Data Matrix 102" according to established CPEI Reporting Rules 324" for People 116". The CPEI Reporting Rules 324" for People 116" establish Primary People CPEI 188" Reports will report:
  a WHO 410"—People 116" (owner)
  did a WHAT 412"—(Role) 154"
  for a WHOM 413"—Project 120" owner
  a WHERE 416"—Places 118"
  a WHY 414"—Project 120"
  and a HOW 418"—Objects 124"
  in relation to a WHEN 420"—Point in Phasetime (PiPT) 128"

It should be recognized that the Effort Instances 186" are reported dynamically from the System which builds the Primary People CPEI 188" Report one data field at a time. The data used to populate the CPEI is extracted from Element 101" associations and Element Relational and Attribute Data 105", which Element Relational and Attribute Data 105" may include a People Relational Data 170", a Places Relational Data 172", a Projects Relational Data 174", an Objects Relational Data 176", a People Attribute Data 178", a Places Attribute Data 180", a Projects Attribute Data 182", and an Object Attribute Data 184".

Figure 38:
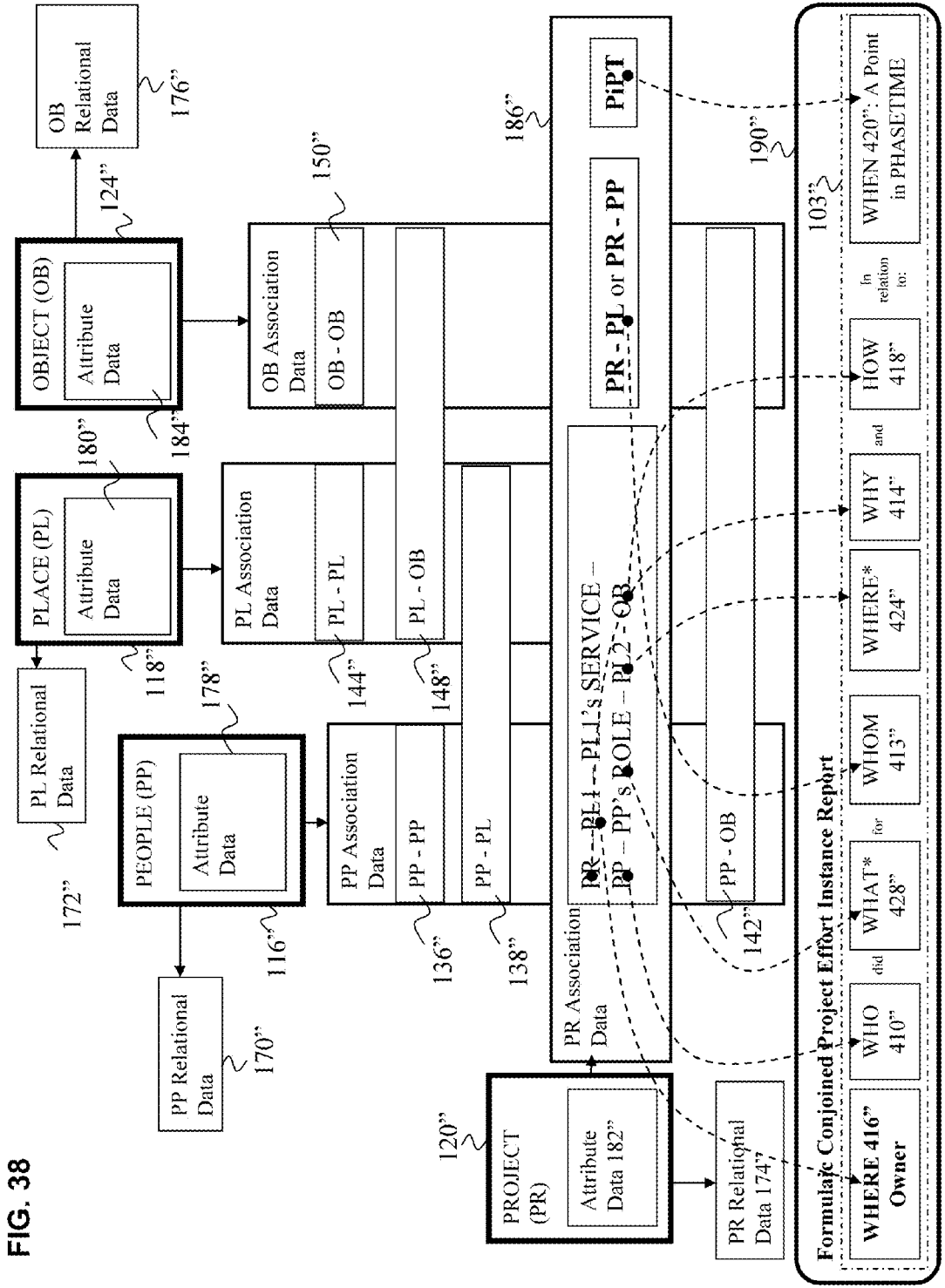
FIG. 38 is a Primary Formulaic CPEI Diagram for Places according to the above preferred embodiment of the present invention.

FIG. 38 is a diagram illustrating how Effort Instances 186" created four Element 101" association structures that are tied together by the Point in Phasetime (PiPT) 128", wherein the Effort Instances 186" are used to generate a Primary Places CPEI 190" Report from established CPEI Reporting Rules 324", and wherein the Primary Places CPEI 190" Reports contain "Formulaic Primary Data Fields 330".

Specifically, FIG. 38 builds on FIGS. 4-6 by defining how Primary Places CPEI 190" Displays are generated from Effort Instances 186" which are comprised of the following Element 101" associations tied together by the Point in Phasetime (PiPT) 128":

People Associations:
    People to People (PP-PP) 136"
    People to Places (PP-PL) 138"
    People to Objects (PP-OB) 142"
    People to Projects (Role) 154"
Places Associations
    Places to Places (PL-PL) 144"
    Places to Objects (PL-OB) 148"
    Places to Projects (Services) 156"
Objects Associations
    Objects to Objects (OB-OB) 150"
    Objects to Projects (Utilization) 160"

According to FIG. 38, the Effort Instance 186" can be generated from a Places Point of View 334" when the Places 118" Element 101" (owner) has the Effort 153" on the Project 120" at the given Point in Phasetime 128". The Effort 153" is the Services 156" which illustrates an exertion (or use of energy) expended on the Project 120" by the Places 118" in the development of a product.

FIG. 38 also establishes Effort Instances 186" comprising associated datasets of interrelated Element 101" data which is associated together by Efforts 153" on the common Project 120" at the given Point in Phasetime 128".

According to FIG. 38, a Place's Primary CPEI 190" Report is derived and reported from said Effort Instance 186" within the Virtual Formulaic Data Matrix 102" according to established CPEI Reporting Rules 324" for Places 118". The CPEI Reporting Rules 324" for Places 118" establish that Primary Places CPEI 190" Reports will report:

WHERE 416"—Places 118" (owner)
        did WHAT 412"—Place's 118" owner Effort 153" (Services) 156"
    WHO 410"—People 116"
    did a WHAT* 428"—People 116" Effort 153" (Role) 154"
    for WHOM 413"—Project 120 owner"
    a WHERE* 424"—A Places2 132"
    WHY 414"—Project 120"
    and HOW 418"—Objects 124"
    in relation to the WHEN 420"—Point in Phasetime (PiPT) 128"

It should be recognized that the Effort Instances 186" reported dynamically from the System which builds the Primary Places CPEI 190" Report one data field at a time. The data used to populate the CPEI is extracted from Element 101" associations and Element Relational and Attribute Data 105" (170", 172", 174", 176", 178", 180", 182", 184').

Figure 39:
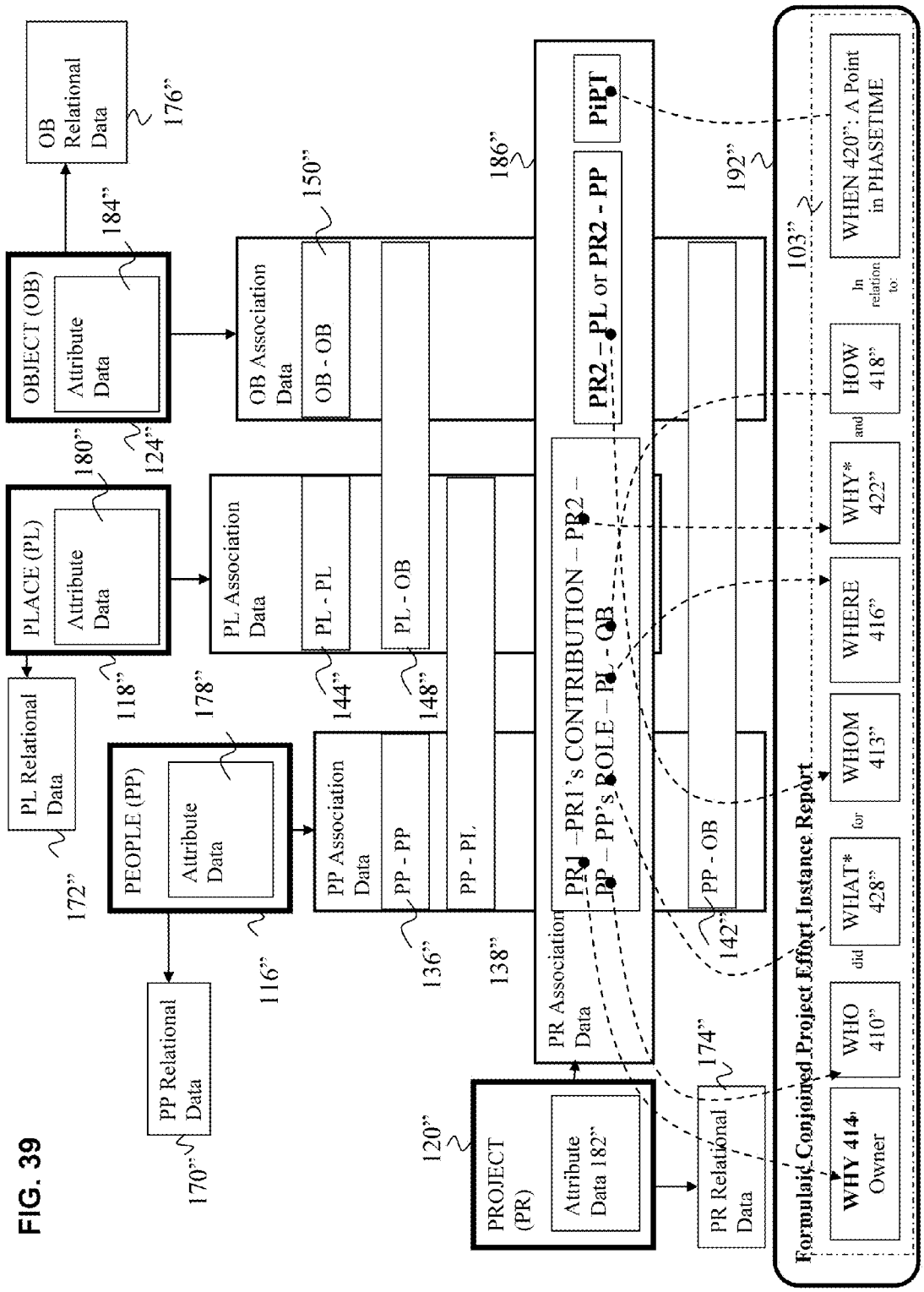
FIG. 39 is a Primary Formulaic CPEI Diagram for Projects according to the above preferred embodiment of the present invention.

FIG. 39 is a diagram illustrating how Effort Instances 186" created from four Element 101" association structures that are tied together by the Point in Phasetime (PiPT) 128", wherein the Effort Instances 186" are used to generate a Primary Project CPEI 192" Report from established CPEI Reporting Rules 324", and wherein the Primary Project CPEI 192" Reports contain "Formulaic Primary Data Fields 330".

Specifically, FIG. 39 builds on FIGS. 4-6 by defining how Primary Project CPEI 192" Reports are generated from the Effort Instances 186" which comprise the following Element 101" associations tied together by the Point in Phasetime (PiPT) 128":

People Associations:
    People to People (PP-PP) 136"
    People to Places (PP-PL) 138"
    People to Objects (PP-OB) 142"
    People to Projects (Role) 154"
Places Associations
    Places to Places (PL-PL) 144"
    Places to Objects (PL-OB) 148"
    Places to Projects (Services) 156"
Objects Associations
    Objects to Objects (OB-OB) 150"
    Objects to Projects (Utilization) 160"

According to FIG. 39, the Effort Instance 186" can be generated from a Projects Point of View 336" when the Project 120" Element 101" (owner) has the Effort 153" on another Project2 122" at the given Point in Phasetime (PiPT) 128". The Effort 153" is the Contribution 158" which illustrates an exertion (or use of energy) expended on the Project2 122" by the Project 120" (owner) in the development of a product.

FIG. 39 also establishes the Effort Instances 186" comprising associated datasets of interrelated Element 101" data which is associated together by Efforts 153" on the common Project 120" at the given Point in Phasetime (PiPT) 128".

According to FIG. 39, the Primary Project CPEI 192" Report is derived and reported from said Effort Instance 186" within the Virtual Formulaic Data Matrix 102" according to established CPEI Reporting Rules 324" for Projects 120". The CPEI Reporting Rules 324" for Projects 120" establish that Primary Places CPEI 190" Reports will report:

WHY 414"—Project 120" (owner)
        did WHAT 412"—Project 120" owner Effort 153" (Contribution) 158"
    WHO 410"—People 116"
    did WHAT* 428"—People 116" Effort 153" (Role) 154"
    for WHOM 413"—Project2 122" owner
    WHERE 416"—Places 118"
    a WHY* 422"—Project2 122"
    and HOW 418"—Objects 124"
    in relation to the WHEN 420"—Point in Phasetime (PiPT) 128"

It should be recognized that the Effort Instances 186" reported dynamically from the System which builds the Primary Project CPEI 192" Report one data field at a time. The data used to populate the CPEI is extracted from Element 101" associations and Element Relational and Attribute Data 105" (170", 172", 174", 176", 178", 180", 182", 184").

Figure 40:
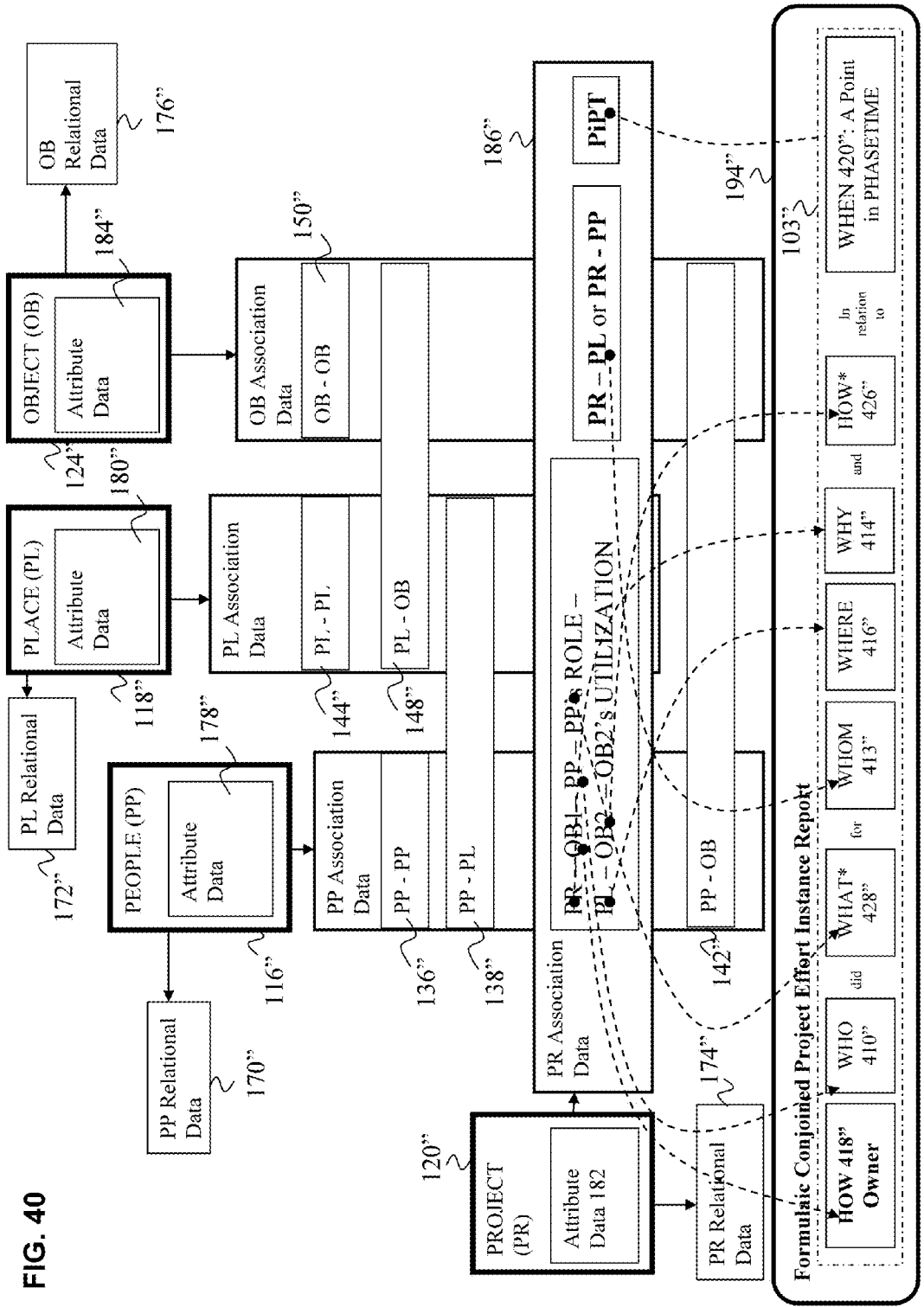
FIG. 40 is a Primary Formulaic CPEI Diagram for Objects according to the above preferred embodiment of the present invention.

FIG. 40 is a diagram illustrating how Effort Instances 186" created from four Element 101" association structures that are tied together by the Point in Phasetime (PiPT) 128", wherein said Effort Instances 186" are used to generate a Primary Object CPEI 194" Report from established CPEI Reporting Rules 324", and wherein said Primary Object CPEI 194" Reports contain "Formulaic Primary Data Fields 330".

Specifically, FIG. 40 builds on FIGS. 4-6 by defining how Primary Object CPEI 194" Reports are generated from Effort Instances 186" which comprise the following Element 101" associations tied together by the Point in Phasetime (PiPT) 128":

People Associations:
- People to People (PP-PP) 136"
- People to Places (PP-PL) 138"
- People to Objects (PP-OB) 142"
- People to Projects (Role) 154"

Places Associations
- Places to Places (PL-PL) 144"
- Places to Objects (PL-OB) 148"
- Places to Projects (Services) 156"

Objects Associations
- Objects to Objects (OB-OB) 150"
- Objects to Projects (Utilization) 160"

According to FIG. 40, the Effort Instance 186" can be generated from an Object Point of View 338" when the Object 124" Element 101" (owner) has the Effort 153" on the Project 120" at the given Point in Phasetime (PiPT) 128". The Effort 153" is the Utilization 160" which illustrates an exertion (or use of energy) expended on the Project 120" by the Object 124" in the development of a product.

FIG. 40 also establishes Effort Instances 186" comprising associated datasets of interrelated Element 101" data which is associated together by Efforts 153" on the common Project 120" at the given Point in Phasetime (PiPT) 128".

According to FIG. 40, a Primary Object CPEI 194" Report is derived and reported from said Effort Instance 186" within the Virtual Formulaic Data Matrix 102" according to established CPEI Reporting Rules 324" for Objects 124". The CPEI Reporting Rules 324" for Objects 124" establish that Primary Objects CPEI 194" Reports will report:
- HOW 418"—Object 124" (owner)
    - did WHAT 412"—Object 124" owner's Effort 153" (Utilization) 160"
- WHO 410"—People 116"
- did WHAT* 428"—People 116" Effort 153" (Role) 154"
- for WHOM—413"—Project 120" owner
- WHERE 416"—Places 118"
- WHY 414"—Project 120"
- and HOW* 426"—An Object2 134"
- in relation to the WHEN 420"—Point in Phasetime (PiPT) 128"

It should be recognized that the Effort Instances 186" reported dynamically from the System which builds the Primary Project CPEI 192" Report one data field at a time. The data used to populate the CPEI is extracted from Element 101" associations and Element Relational and Attribute Data 105" (170", 172", 174", 176", 178", 180", 182", 184").

Figure 41:
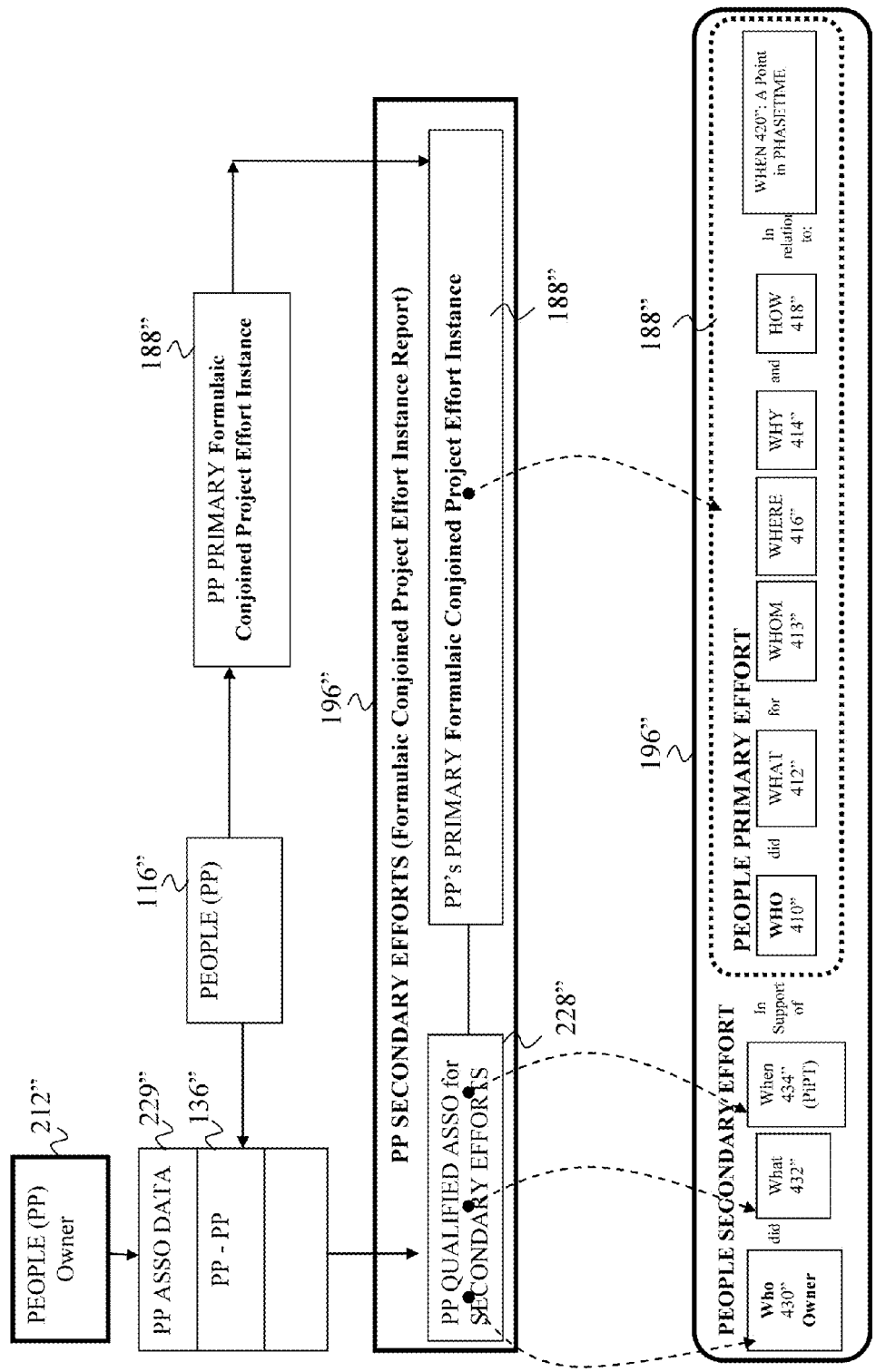
FIG. 41 is a Secondary Formulaic CPEI Diagram for People according to the above preferred embodiment of the present invention.

FIG. 41 is a diagram illustrating how a Secondary People CPEI 196" Report is generated through a People Qualified Association for Secondary Efforts 228" with the Primary People 116" Element 101" with the Primary People CPEI 188".

FIG. 41 builds on FIG. 37 by defining that a People Secondary Owner 212" is associated to the Primary People 116" by a People to People Association (PP-PP ASSOC) 136" which is stored in the Virtual Formulaic Data Matrix 102".

A People Secondary Owner 212" Element 101" may be awarded a Secondary People CPEI 196" when the People Secondary Owner 212" has the People Qualified Association for Secondary Efforts 228" to the Primary People 116", wherein the Primary People 116" has been awarded the Primary People CPEI 188", and wherein the People Secondary Owner's 212" People Qualified Association for Secondary Efforts 228" contributed to the Primary People 116" in achieving their Primary People CPEI 188".

FIG. 41 also establishes that the above People Qualified Association for Secondary Efforts 228" is considered a Secondary Efforts 229", wherein said Secondary Efforts 229" is the Formula Associative Data Value 115" that is stored in the Base Tables 314".

According to FIG. 41, the Secondary People CPEI 196" Report is derived and reported from an Association between the People Secondary Owner 212" Element 101" and the Primary People 116" Element 101", wherein the Effort Instance 186" that stores the Primary People CPEI 188" is updated with the People Qualified Association for Secondary Efforts 228" that ties the People Secondary Owner 212" to the Primary People 116".

FIG. 41 also establishes that Secondary People CPEI 196" Reports are reported from the Virtual Formulaic Data Matrix 102" according to CPEI Reporting Rules 324" for Secondary People CPEI 196" including:
- a Who 430" ($2^{nd}$)—People Secondary Owner 212"
- did a What 432" ($2^{nd}$)—People Qualified Association 228" (Secondary Effort 229")
- a When 434" ($2^{nd}$)—Point In Phasetime (PiPT) 128" for Secondary Effort 229" in Support of
- WHO 410"—Primary People 116" (owner of Primary People CPEI 188")
- did WHAT 412"—Effort 153" (Role) 154"
- for WHOM 413"—Primary Project 120" owner
- WHERE 416"—Primary Places 118"
- WHY 414"—Primary Project 120"
- and HOW 418"—Primary Objects 124"
- in relation to the WHEN 420"—Point in Phasetime (PiPT) 128"

FIG. 41 also acknowledges that the System and Method comprise rules for approving the People Qualified Associations for Secondary Efforts 228" used in Secondary People CPEIs 196":
- In order to create the Secondary People CPEI 196", the Primary People CPEI 188" MUST first exist.
- The Primary People 116" Element 101" will have to approve the People Qualified Association for Secondary Efforts 228" between it and the People Secondary Owner 212".
- The Secondary Effort 229" can be established when it receives the approval the People Qualified Association for Secondary Efforts 228" to the Primary People 116" Element 101".
- The owner of the Project 120" which is the subject of the Primary People CPEI 188" can disapprove the Secondary Effort 229".
- The People Secondary Owner 212" must provide some type of proof (such as a document or data) that affirms their People Qualified Association for Secondary Effort 228" to the Primary People 116" Element 101".

Figure 42:
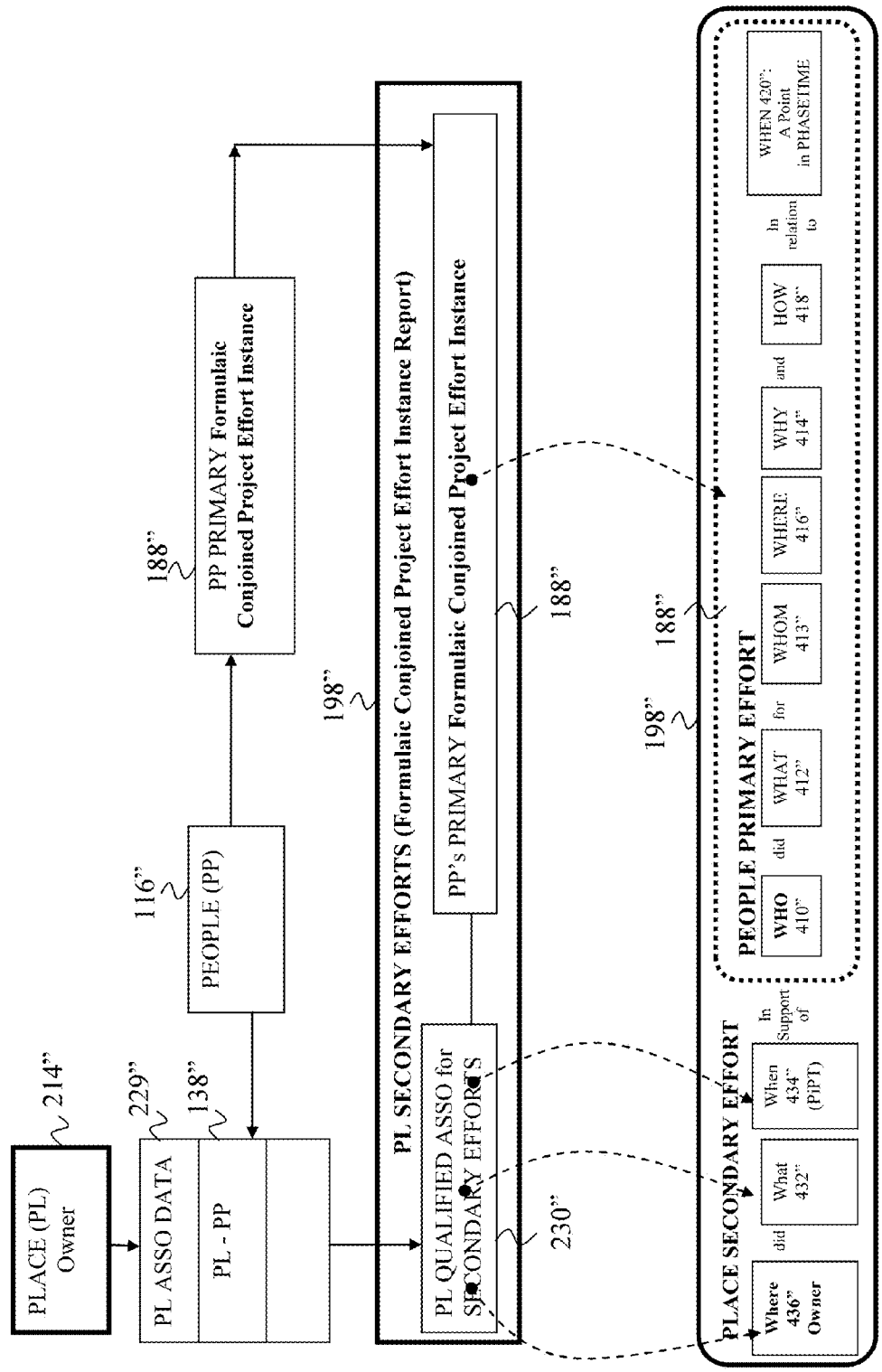
FIG. 42 is a Secondary Formulaic CPEI Diagram for Places according to the above preferred embodiment of the present invention.

FIG. 42 is a diagram illustrating how a Secondary Places CPEI 198" Report is generated through a Places Qualified Association for Secondary Efforts 230" with the Primary People 116" Element 101" with the Primary People CPEI 188".

FIG. 42 builds on FIG. 38 by defining that a Places Secondary Owner 214" Element 101" is associated to the Primary People 116" Element by the People to Places Association (PP-PL ASSOC) 138" which is stored in the Virtual Formulaic Data Matrix 102".

A Places Secondary Owner 214" Element 101" may be awarded a Secondary Places CPEI 198" when the Places Secondary Owner 214" has the Places Qualified Association to Secondary Effort 230" to the Primary People 116", wherein the Primary People 116" has been awarded the Primary People CPEI 188", and wherein the Places Secondary Owner's 214" Places Qualified Association for Secondary Efforts 230", contributed to the Primary People 116" in achieving their Primary People CPEI 188".

FIG. 42 also establishes that the above Places Qualified Association to Secondary Effort 230" is considered Secondary Efforts 229", wherein the Secondary Effort 229" is the Formula Associative Data Value 115" that is stored in the Base Tables 314".

According to FIG. 42, a Secondary Places CPEI 198" Report is derived and reported from an association between the Places Secondary Owner 214" Element 101" and the Primary People 116" Element 101", wherein the Effort Instance 186" that stores the Primary People CPEI 188" is updated with the Places Qualified Association for Secondary Effort 230" that ties the Places Secondary Owner 214" to the Primary People 116".

FIG. 42 also establishes that Secondary Places CPEI 198" Reports are reported from the Virtual Formulaic Data Matrix 102" according to CPEI Reporting Rules 324" for Secondary Places CPEI 198" including:
- a Where 436" ($2^{nd}$)—Places Secondary Owner 214"
- did What 432" ($2^{nd}$)—Places Qualified Association 230" (Secondary Effort 229")
- When 434" ($2^{nd}$)—Point In Phasetime (PiPT) 128" for the Secondary Effort 229" in Support of
- WHO 410"—Primary People 116" (owner of Primary People CPEI 188")
- did WHAT 412"—Effort 153" (Role) 154"
- for WHOM 413"—Primary Project 120" owner
- WHERE 416"—Primary Places 118"
- WHY 414"—Primary Project 120"
- and HOW 418"—Primary Objects 124"
- in relation to the WHEN 420"—Point in Phasetime (PiPT) 128"

FIG. 42 also acknowledges that the System and Method is comprised of rules for approving the Places Qualified Associations 230" used in Secondary Places CPEIs 198":
- In order to create a Secondary Places CPEI 198", the Primary People CPEI 188" MUST first exist.
- The Primary People 116" Element 101" will have to approve the Places Qualified Association for Secondary Effort 230" between it and the Places Secondary Owner 214".
- The Secondary Effort 229" can be established when it receives the approval for the Places Qualified Association for Secondary Effort 230" to the Primary People 116" Element 101".
- The owner of the Project 120" which is the subject of the Primary People CPEI 188" can disapprove the Secondary Effort 229".
- The Places Secondary Owner 214" must provide some type of proof (such as a document or data) that affirms their Places Qualified Association for Secondary Effort 230" to the Primary People 116 Element 101"

Figure 43:
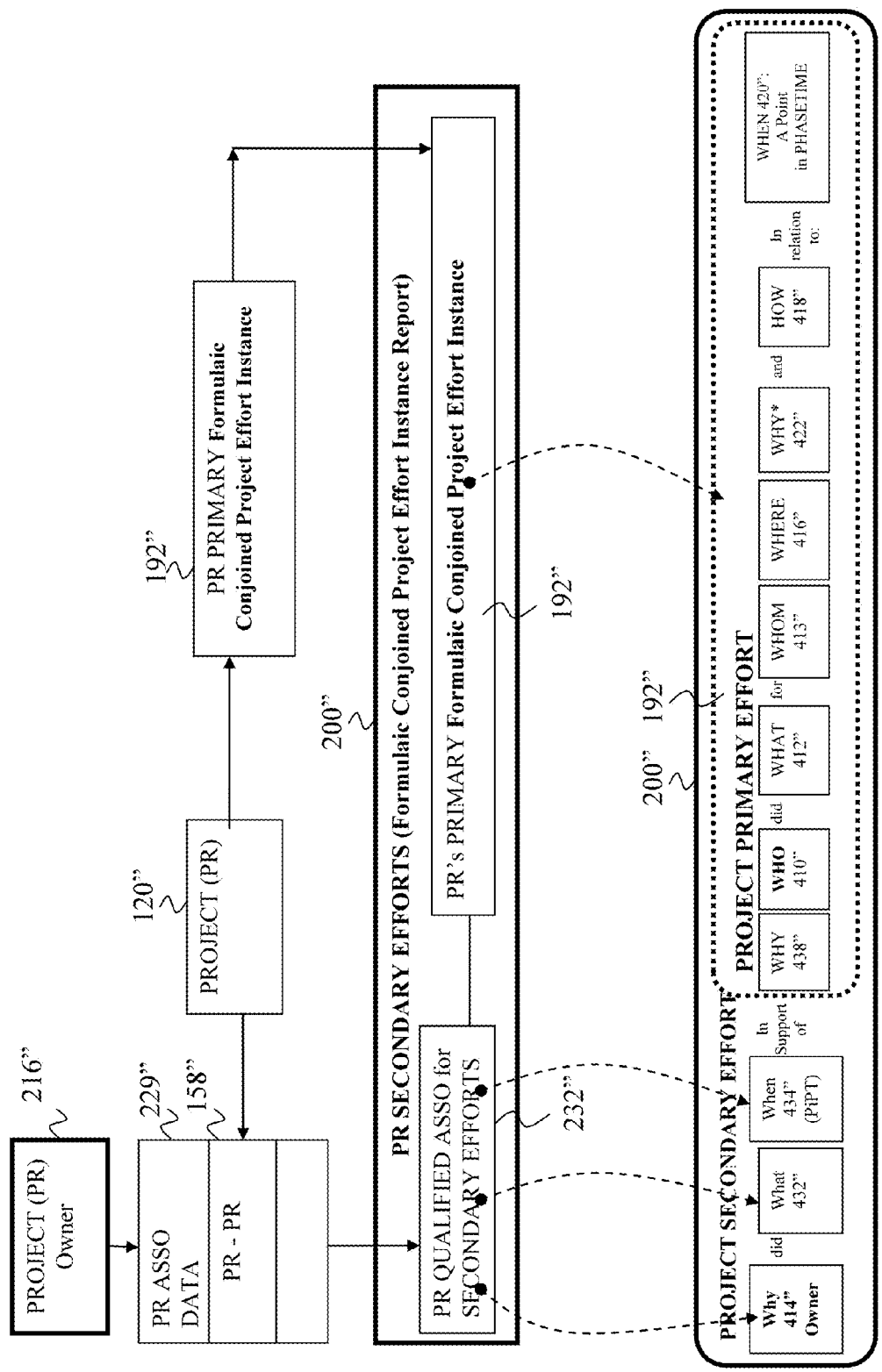
FIG. 43 is a Secondary Formulaic CPEI Diagram for Projects according to the above preferred embodiment of the present invention.

FIG. 43 is a diagram illustrating how a Secondary Project CPEI 200" Report is generated through a Project Qualified Associations for Secondary Effort 232" with the Primary Project 120" Element 101" with a Primary Project CPEI 192".

FIG. 43 builds on FIG. 39 by defining that a Project Secondary Owner 216" Element 101" is associated to a Primary Project 120" Element by a Project to Project Association (Contribution) 158" which is stored in the Virtual Formulaic Data Matrix 102".

A Project Secondary Owner 216" Element 101" may be awarded the Secondary Project CPEI 200" when the Project Secondary Owner 216" has the Project Qualified Association for Secondary Effort 232" to a Primary Project 120", wherein the Primary Project 120" has been awarded a Primary Project CPEI 192", and wherein the Project Secondary Owner's 216" Project Qualified Association for Secondary Effort 232" contributed to the Primary Project 120" in achieving their Primary Project CPEI 192".

FIG. 43 also establishes that the above Project Qualified Association for Secondary Effort 232" is considered Secondary Efforts 229", wherein the Secondary Effort 229" is the Formula Associative Data Value 115" that is stored in the Base Tables 314".

According to FIG. 43, the Secondary Project CPEI 200" Report is derived and reported from an association between the Project Secondary Owner 216" Element 101" and the Primary Project 120" Element 101", wherein the Effort Instance 186" that stores the Primary Project CPEI 192" is updated with the Project Qualified Association for Secondary Effort 232" that ties the Project Secondary Owner 216" to the Primary Project 120".

FIG. 43 also establishes that Secondary Project CPEI 200" Reports which are reported from the Virtual Formulaic Data Matrix 102" according to CPEI Reporting Rules 324" for Secondary Project CPEI 200" including:
- a Why 438" ($2^{nd}$)—Project Secondary Owner 216"
- did What 432" ($2^{nd}$)—Project Qualified Association 232" (Secondary Effort 229")
- When 434" ($2^{nd}$)—Point In Phasetime (PiPT) 128" for the Secondary Effort 229" in Support of
- WHO 410"—Primary People 116" (owner of Primary People CPEI 188")
- did WHAT 412"—Effort 153" (Role) 154"
- for WHOM 413"—Primary Project 120" owner
- WHERE 416"—Primary Places 118"
- WHY 414"—Primary Project 120"
- and HOW 418"—Primary Objects 124"
- in relation to the WHEN 420"—Point in Phasetime (PiPT) 128"

FIG. 43 also acknowledges that the System and Method is comprised of rules for approving the Project Qualified Associations for Secondary Efforts 232" used in Secondary Project CPEIs 200":
- In order to create a Secondary Projects CPEI 200", a Primary Project CPEI 192" must first exist.
- The Primary Project 120" Element 101" will have to approve the Project Qualified Association for Secondary Effort 232" between it and the Project Secondary Owner 216".
- The Secondary Effort 229" can be established when it receives the approval of the Project Qualified Association for Secondary Effort 232" to the Primary Project 120" Element 101".
- The owner of the Primary Project 120" which is the subject of the Primary Project CPEI 192" can disapprove the Secondary Effort 229".
- The Project Secondary Owner 216" must provide some type of proof (such as a document or data) that affirms their Project Qualified Association for Secondary Effort 232" to the Primary Project 120" Element 101".

Figure 44:
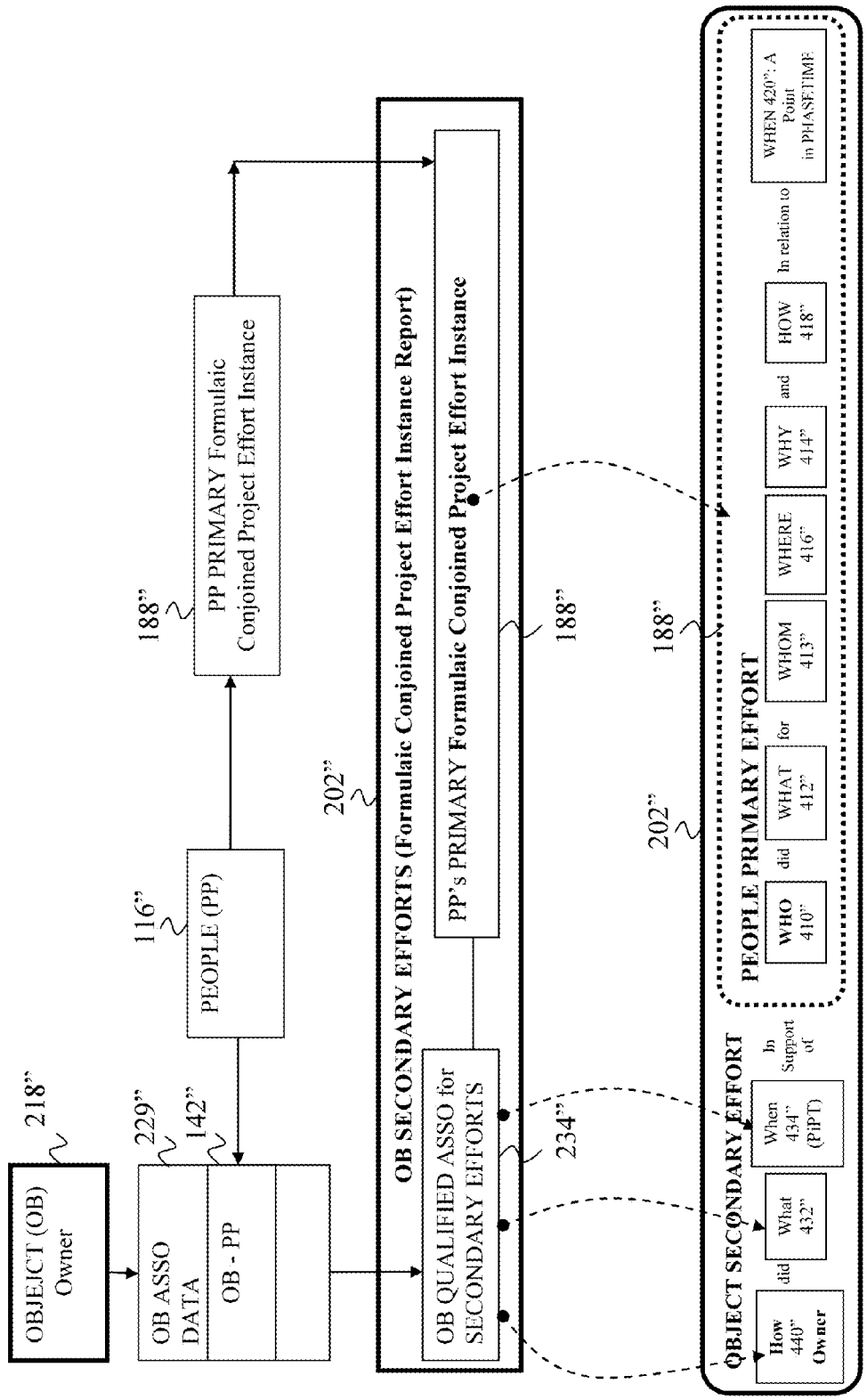
FIG. 44 is a Secondary Formulaic CPEI Diagram for Objects according to the above preferred embodiment of the present invention.

FIG. 44 is a diagram illustrating how a Secondary Object CPEI 202" Report is generated through an Object Qualified Associations for Secondary Effort 234" with the Primary People 116" Element 101" with the Primary People CPEI 188".

FIG. 44 builds on FIG. 40 by defining an Object Secondary Owner 218" Element 101" is associated to the Primary People 116" Element by a People to Object Association (PP-OB ASSOC) 142" which is stored in the Virtual Formulaic Data Matrix 102".

The Object Secondary Owner 218" Element 101" may be awarded the Secondary Object CPEI 202" when the Object Secondary Owner 218" has the Object Qualified Association for Secondary Effort 234" to the Primary People 116", wherein the Primary People 116" has been awarded the Primary People CPEI 188", and wherein the Object Secondary Owner's 218" Object Qualified Association for Secondary Effort 234" contributed to the Primary People 116" in achieving their Primary People CPEI 188".

FIG. 44 also establishes that the above Object Qualified Association for Secondary Effort 234" is considered Secondary Efforts 229", wherein said Secondary Effort 229" is the Formula Associative Data Value 115" that is stored in the Base Tables 314".

According to FIG. 44, the Secondary Object CPEI 202" Report is derived and reported from an association between the Object Secondary Owner 218" Element 101" and the Primary People 116" Element 101", wherein the Effort Instance 186" that stores the Primary People CPEI 188" is updated with the Object Qualified Association for Secondary Effort 234" that ties the Object Secondary Owner 218" to the Primary People 116".

FIG. 44 also establishes that Secondary Object CPEI 202" Reports are reported from the Virtual Formulaic Data Matrix 102" according to CPEI Reporting Rules 324" for Secondary Objects CPEI 202" including:

a HOW 440" ($2^{nd}$)—Object Secondary Owner 218"
did What 432" ($2^{nd}$)—Object Qualified Association 234" (Secondary Effort 229")
When 434" ($2^{nd}$)—Point In Phasetime (PiPT) 128" for the Secondary Effort 229" in Support of
WHO 410"—Primary People 116" (owner of Primary People CPEI 188")
did WHAT 412"—Effort 153" (Role) 154"
for WHOM 413"—Primary Project 120" owner
WHERE 416"—Primary Places 118"
WHY 414"—Primary Project 120"
and HOW 418"—Primary Objects 124"
in relation to the WHEN 420"—Point in Phasetime (PiPT) 128"

FIG. 44 also acknowledges that the System and Method is comprised of rules for approving the Object Qualified Associations for Secondary Efforts 234" used in Secondary Object CPEIs 202":

In order to create the Secondary Object CPEI 202", the Primary People CPEI 188" must first exist.
The Primary People 116" Element 101" will have to approve the Object Qualified Association for Secondary Effort 234" between it and the Object Secondary Owner 218".
The Secondary Effort 229" can be established when it receives the approval of the Object Qualified Association for Secondary Effort 234" to the Primary People 116" Element 101".
The owner of the Project 120" which is the subject of the Primary People CPEI 188" can disapprove the Secondary Effort 229".
The Object Secondary Owner 218" must provide some type of proof (such as a document or data) that affirms their Object Qualified Association for Secondary Effort 234" to the Primary People 116" Element 101".

Figure 45:
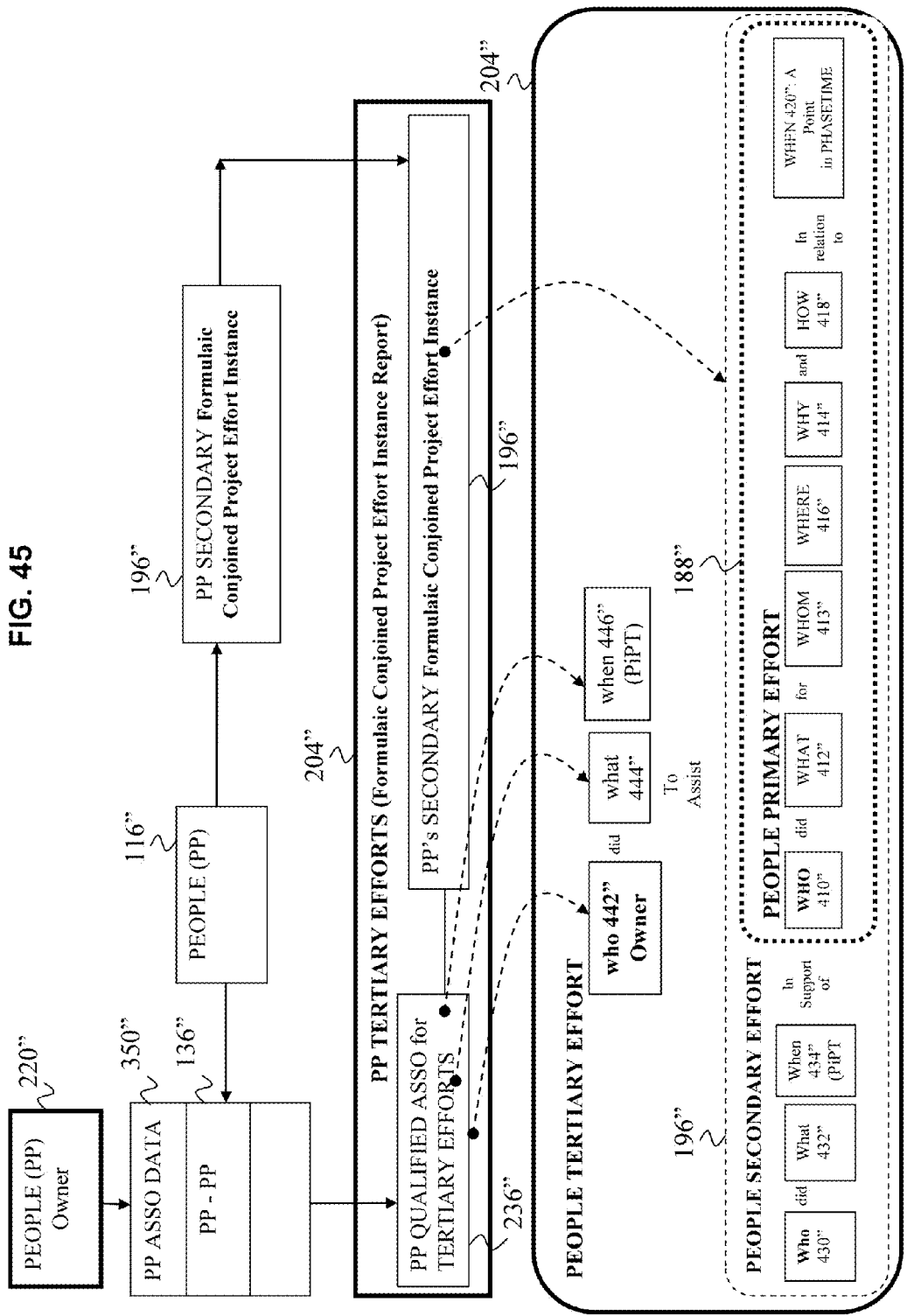
FIG. 45 is a Tertiary Formulaic CPEI Diagram for People according to the above preferred embodiment of the present invention.

FIG. 45 is a diagram illustrating how a Tertiary People CPEI 204" Report is derived and reported for a People Tertiary Owner 220" Element 101" through a People Qualified Association for Tertiary Effort 236" with the People Secondary Owner 212" Element 101", wherein said People Secondary Owner 212" has the Secondary People CPEI 196" derived through the Places Qualified Associations for Secondary Efforts 230" with the Primary People 116" Element 101".

FIG. 45 builds on FIGS. 37 and 41 by defining that People Tertiary Owner 220" Elements 101" are associated to People Secondary Owners 212" Elements 101" by People to People Associations (PP-PP ASSOC) 136" which are stored in the Virtual Formulaic Data Matrix 102".

The People Tertiary Owner 220" Element 101" may be awarded the Tertiary People CPEI 204" when said People Tertiary Owner 220" Element 101" has the People Qualified Association for Tertiary Effort 236" with the People Secondary Owner 212" Element 101", wherein the People Secondary Owner 212" Element 101" has been awarded the Secondary People CPEI 196", and wherein the People Tertiary Owner 220" People Qualified Association for Tertiary Effort 236" has contributed to the People Secondary Owner 212" in achieving their Secondary People CPEI 196".

FIG. 45 also establishes that the People Qualified Association for Tertiary Effort 236" between the People Tertiary Owner 220" Element 101" and the People Secondary Owner 212" Element 101" are considered a Tertiary Efforts 350", wherein said Tertiary Effort 350" is the Formula Associative Data Value 115" that is stored within the Base Tables 314".

According to FIG. 45, the Tertiary People CPEI 204" Report is derived and reported from an association between the People Tertiary Owner 220" and the People Secondary Owner 212", wherein the Effort Instance 186" that stores the Primary People CPEI 188" is updated with the People Qualified Association for Tertiary Effort 236" that ties the People Tertiary Owner 220" to the People Secondary Owner 212".

The Effort Instances 186" therefore contain the People Tertiary Owner's 220" People Qualified Association for Tertiary Effort 236" to the People Secondary Owner 212", the People Secondary Owner's 212" People Qualified Association for Secondary Efforts 228" to the Primary People 116", and the multiple Element 101" associations that are used to generate the Primary People CPEI 188".

The Tertiary People CPEI 204" Report is reported from the Virtual Formulaic Data Matrix 102" according to CPEI Reporting Rules 324" for Tertiary People CPEI 204" including:

a who 442" ($3^{rd}$)—People Tertiary Owner 220"
did what 444" ($3^{rd}$)—People Qualified Association 236" (Tertiary Effort 350")
a when 446" ($3^{rd}$)—Point in Phasetime (PiPT) 128" for Tertiary Effort 350" to assist
Who 430" ($2^{nd}$)—People Secondary Owner 212" (owner of Secondary People CPEI 196")
did What 432" ($2^{nd}$)—People Qualified Association 228" (People 116 Secondary Effort 229")
When 434" ($2^{nd}$)—Point In Phasetime (PiPT) 128" for Secondary Effort 229" in Support of
WHO 410"—Primary People 116" (owner of Primary People CPEI 188")
did WHAT 412"—Effort 153" (Role) 154"
for WHOM 413"—Primary Project 120" owner
WHERE 416"—Primary Places 118"
WHY 414"—Primary Project 120"
and HOW 418"—Primary Objects 124"
in relation to the WHEN 420"—Point in Phasetime (PiPT) 128"

FIG. 45 also acknowledges that the System and Method comprise the following rules for approving the People Qualified Associations for Tertiary Effort 236" used in generating Tertiary People CPEIs 204":

In order to create the Tertiary Effort 350", the Secondary Effort 229" must first exist.

The People Secondary Owner 212" Element 101" will have to approve the Tertiary Effort 350".

A Tertiary People CPEI 204" can be established when the People Tertiary Owner 220" Element 101" receives the approval of his People Qualified Association for Tertiary Effort 236" to the People Secondary Owner 212" who has the approved Secondary People CPEI 196".

The owner of the Project 120" which is the subject of the Primary People CPEI 188" can disapprove the Tertiary Effort 350".

The People Secondary Owner 212" will have to approve the People Qualified Association for Tertiary Effort 236" between it and the People Tertiary Owner 220".

The People Tertiary Owner 220" must provide some type of proof (such as a document or data) that affirms their association to the People Secondary Owner 212".

Figure 46:
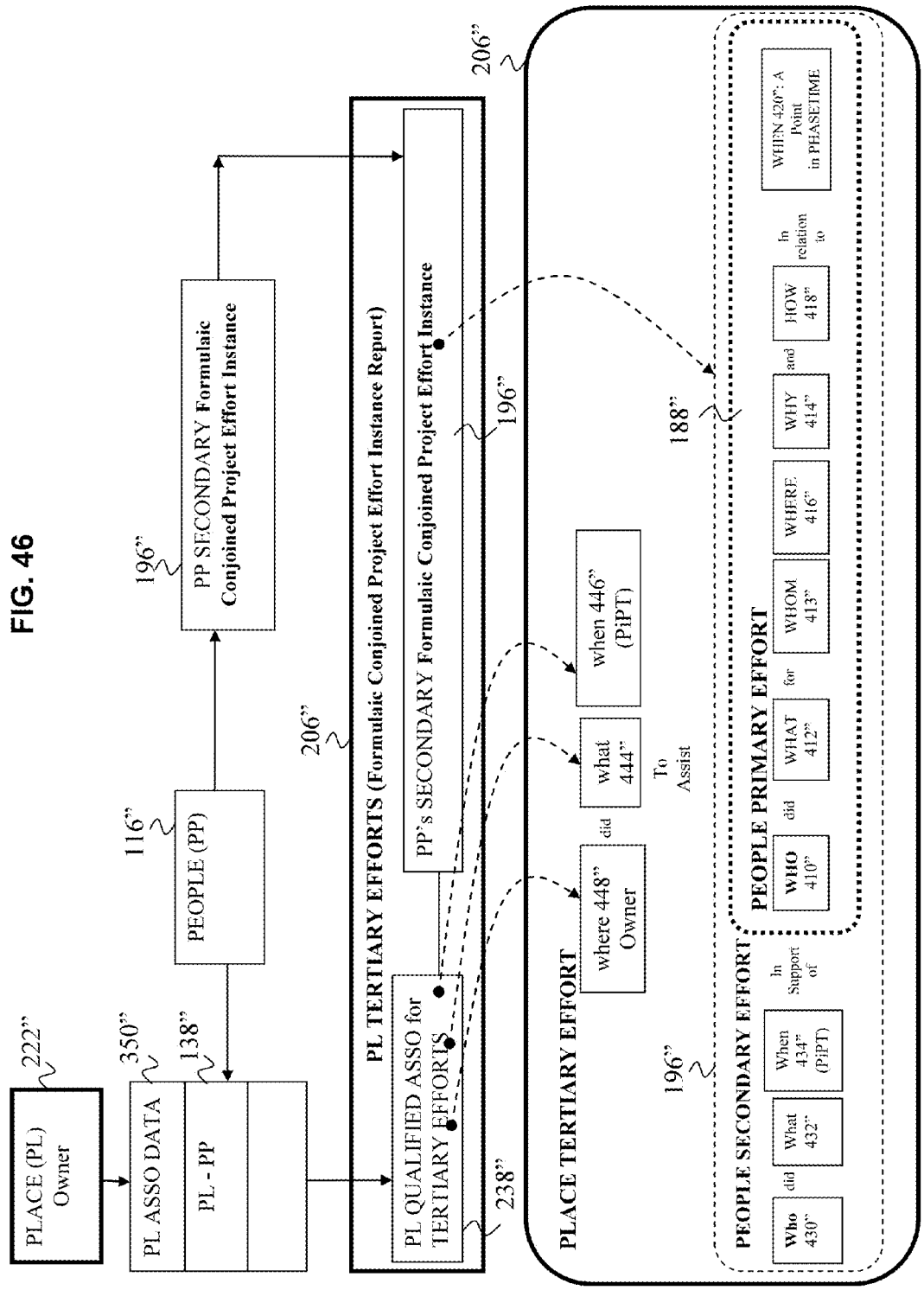
FIG. 46 is a Tertiary Formulaic CPEI Diagram for Places according to the above preferred embodiment of the present invention.

FIG. 46 is a diagram illustrating how a Tertiary Places CPEI 206" Report is derived and reported for a Places Tertiary Owner 222" Element 101" through a Places Qualified Association for Tertiary Efforts 238" with a People Secondary Owner 212" Element 101", wherein the People Secondary Owner 212" has a Secondary People CPEI 196" derived through the Places Qualified Associations for Secondary Effort 230" with the Primary People 116" Element 101".

FIG. 46 builds on FIGS. 8 and 12 by defining that Places Tertiary Owner 222" Elements 101" are associated to People Secondary Owners 212" Elements 101" by People to Places Associations (PP-PL ASSOC) 138" which are stored in the Virtual Formulaic Data Matrix 102".

CPEI 206" when said Places Tertiary Owner 222" Element 101" has the Places Qualified Association for Tertiary Efforts 238 with a People Secondary Owner 212 Element 101, wherein the People Secondary Owner 212" Element 101" has been awarded a Secondary People CPEI 196", and wherein the Places Tertiary Owner 222" Places Qualified Association for Tertiary Efforts 238" has contributed to the People Secondary Owner 212" in achieving their Secondary People CPEI 196".

FIG. 46 also establishes that the Places Qualified Association for Tertiary Efforts 238" between the Places Tertiary Owner 222" Element 101" and the People Secondary Owner 212" Element 101" are considered Tertiary Efforts 350", wherein the Tertiary Effort 350" is the Formula Associative Data Value 115" that is stored within Base Tables 314".

According to FIG. 46, the Tertiary Places CPEI 206" Report is derived and reported from an association between the Places Tertiary Owner 222" and the People Secondary Owner 212", wherein the Effort Instance 186 that stores the Primary People CPEI 188" is updated with the Places Qualified Association for Tertiary Efforts 238" that ties the Places Tertiary Owner 222" to the People Secondary Owner 212".

Said Effort Instances 186" therefore contain the Places Tertiary Owner's 222" Places Qualified Association for Tertiary Efforts 238" to the People Secondary Owner 212", the People Secondary Owner's 212" People Qualified Association for Secondary Efforts 228" to the Primary People 116", and the multiple Element 101" associations that are used to generate the Primary People CPEI 188".

The Tertiary Places CPEI 206" Report is reported from the Virtual Formulaic Data Matrix 102" according to CPEI Reporting Rules 324" for Tertiary Places CPEI 206" including:

a where 448" ($3^{rd}$)—Places Tertiary Owner 222"
did what 444" ($3^{rd}$)—Places Qualified Association 238" (Tertiary Effort 350")
when 446" ($3^{rd}$)—Point in Phasetime (PiPT) 128" for Tertiary Effort 350" to assist
Who 430" ($2^{rd}$)—People Secondary Owner 212" (owner of Secondary People CPEI 196")
did What 432" ($2^{nd}$)—People Qualified Association 228" (People 116" Secondary Effort 229")
When 434" ($2^{nd}$)—Point In Phasetime (PiPT) 128" for Secondary Effort 229" in Support of
WHO 410"—Primary People 116" (owner of Primary People CPEI 188")
did WHAT 412"—Effort 153" (Role) 154"
for WHOM 413"—Primary Project 120" owner
WHERE 416"—Primary Places 118"
WHY 414"—Primary Project 120"
and HOW 418"—Primary Objects 124"
in relation to the WHEN 420"—Point in Phasetime (PiPT) 128"

FIG. 46 also acknowledges that the System and Method comprise the following rules for approving the Places Qualified Associations for Tertiary Efforts 238" used in generating Tertiary Places CPEIs 206":

In order to create the Tertiary Effort 350", the Secondary Effort 229" must first exist.

The People Secondary Owner 212" Element 101" will have to approve the Tertiary Effort 350".

A Tertiary Places CPEI 206" can be established when the Places Tertiary Owner 222" Element 101" receives the approval of their Places Qualified Association for Tertiary Efforts 238" to the People Secondary Owner 212" who has an approved Secondary People CPEI 196".

The owner of the Project 120" which is the subject of the Primary People CPEI 188 can disapprove the Tertiary Effort 350".

The People Secondary Owner 212" will have to approve the Places Qualified Association for Tertiary Efforts 238" between it and the Places Tertiary Owner 222".

The Places Tertiary Owner 222" must provide some type of proof (such as a document or data) that affirms their association to the People Secondary Owner 212".

Figure 47:
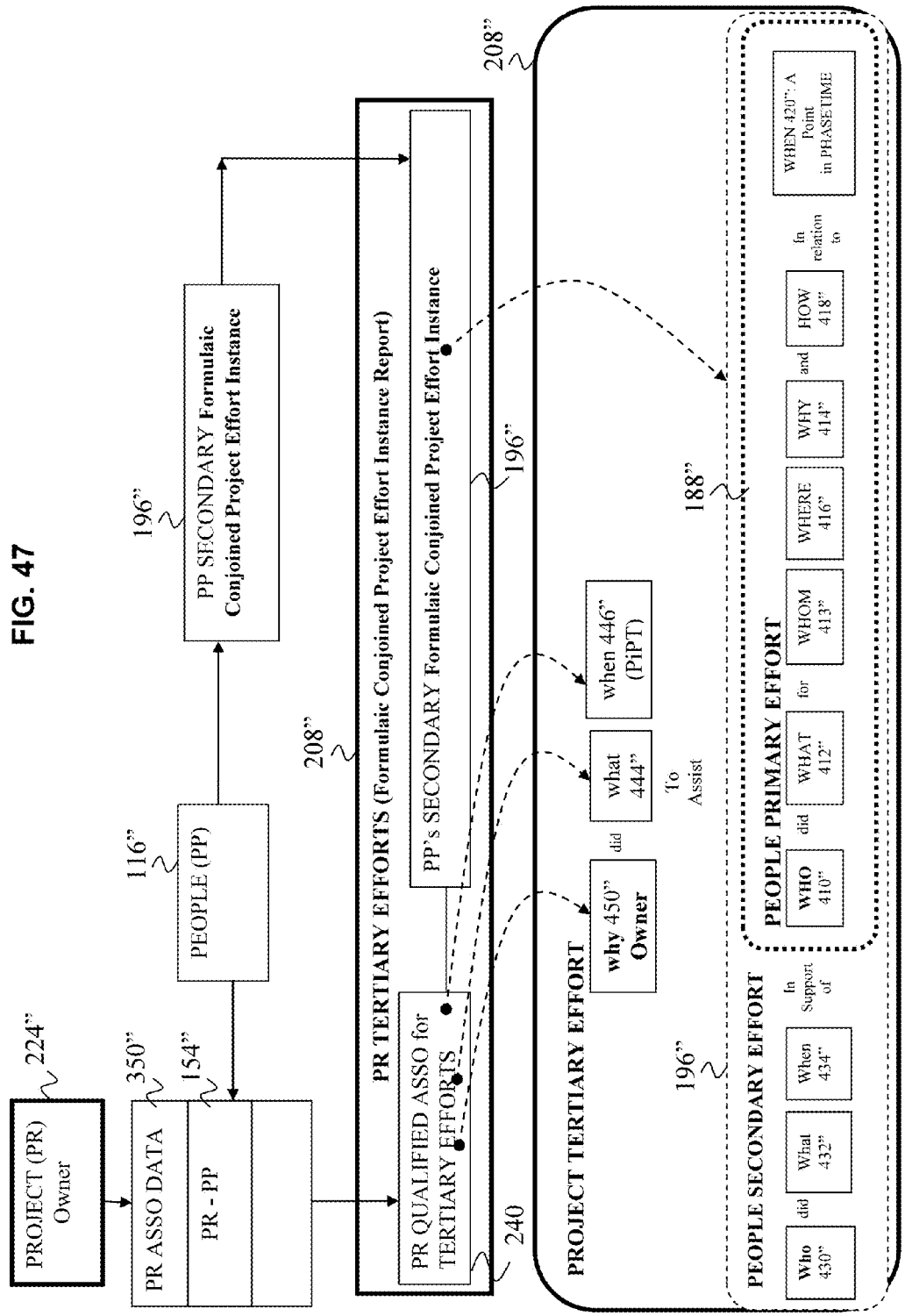
FIG. 47 is a Tertiary Formulaic CPEI Diagram for Projects according to the above preferred embodiment of the present invention.

FIG. 47 is a diagram illustrating how a Tertiary Project CPEI 208" Report is derived and reported for a Projects Tertiary Owner 224" Element 101" through a Project Qualified Association for Tertiary Efforts 240" with the Project Secondary Owner 216"Element 101", wherein the Project Secondary Owner 216" has a Secondary Project CPEI 200" derived through the Project Qualified Associations for a Secondary Effort 232" with the Primary Project 120" Element 101".

FIG. 47 builds on FIGS. 9 and 13 by defining that Projects Tertiary Owners 224" Elements 101" are associated to Project Secondary Owners 216" Elements 101 by Project to Project Associations (PR-Contribution) 158" which are stored in the Virtual Formulaic Data Matrix 102".

The Projects Tertiary Owner 224" Element 101" may be awarded the Tertiary Project CPEI 208" when said Projects Tertiary Owner 224" Element 101" has the Project Qualified Association for Tertiary Efforts 240" with the Project Secondary Owner 216"Element 101", wherein the Project Secondary Owner 216" Element 101" has been awarded a Secondary Project CPEI 200", and wherein the Projects Tertiary Owner's 224" Project Qualified Association for Tertiary Efforts 240" has contributed to the Project Secondary Owner 216" in achieving their Secondary People CPEI 196".

FIG. 47 also establishes that the Project Qualified Association for Tertiary Efforts 240" between the Projects Tertiary Owner 224" Element 101" and the Project Secondary Owner 216" Element 101" are considered Tertiary Efforts 350", wherein the Tertiary Effort 350" is the Formula Associative Data Value 115" that is stored within Base Tables 314".

According to FIG. 47, the Tertiary Project CPEI 208" Report is derived and reported from an association between the Projects Tertiary Owner 224" and the Project Secondary Owner 216", wherein the Effort Instance 186" that stores the Primary Project CPEI 192" is updated with the Project Qualified Association for Tertiary Efforts 240" that ties the Projects Tertiary Owner 224" to the Project Secondary Owner 216".

The Effort Instances 186" therefore contain the Projects Tertiary Owner's 224" Project Qualified Association for Tertiary Efforts 240" to the Project Secondary Owner 216", the Project Secondary Owner's 216" Project Qualified Association for Secondary Effort 232" to the Primary Project 120", and the multiple Element 101" associations that are used to generate a Primary Project CPEI 192".

The Tertiary Project CPEI 208" Report is reported from the Virtual Formulaic Data Matrix 102" according to CPEI Reporting Rules 324" for Tertiary Project CPEI 208" including:

- a why 450" ($3^{rd}$)—Projects Tertiary Owner 224"
- did what 444" ($3^{rd}$)—Projects Qualified Association 240" (Tertiary Effort 350")
- when 446" ($2^{nd}$)—Point in Phasetime (PiPT) 128" for Tertiary Effort 350" to assist
- Who 430" ($2^{nd}$)—People Secondary Owner 212" (owner of Secondary People CPEI 196")
- did What 432" ($2^{nd}$)—People Qualified Association 228" (People 116" Secondary Effort 229")
- When 434" ($2^{nd}$)—Point In Phasetime (PiPT) 128" for Secondary Effort 229" in Support of
- WHO 410"—Primary People 116" (owner of Primary People CPEI 188")
- did WHAT 412"—Effort 153" (Role) 154"
- for WHOM 413"—Primary Project 120" owner
- WHERE 416"—Primary Places 118"
- WHY 414"—Primary Project 120"
- and HOW 418"—Primary Objects 124"
- in relation to the WHEN 420"—Point In Phasetime (PiPT) 128"

FIG. 47 also acknowledges that the System and Method comprise the following rules for approving the Project Qualified Associations for Tertiary Efforts 240" used in generating Tertiary Project CPEIs 208":

- In order to create the Tertiary Effort 350", the Secondary Effort 229" must first exist.
- The Project Secondary Owner 216" Element 101" will have to approve the Tertiary Effort 350".
- A Tertiary Project CPEI 208" can be established when the Projects Tertiary Owner 224" Element 101" receives the approval of their Project Qualified Association for Tertiary Efforts 240" to the Project Secondary Owner 216" who has the approved Secondary Project CPEI 200".
- The owner of the Project 120" which is the subject of the Primary Project CPEI 192" can disapprove the Tertiary Effort 350".
- The Project Secondary Owner 216" will have to approve the Project Qualified Association for Tertiary Efforts 240" between it and the Projects Tertiary Owner 224".
- The Projects Tertiary Owner 224" must provide some type of proof (such as a document or data) that affirms their association to the Project Secondary Owner 216".

Figure 48:
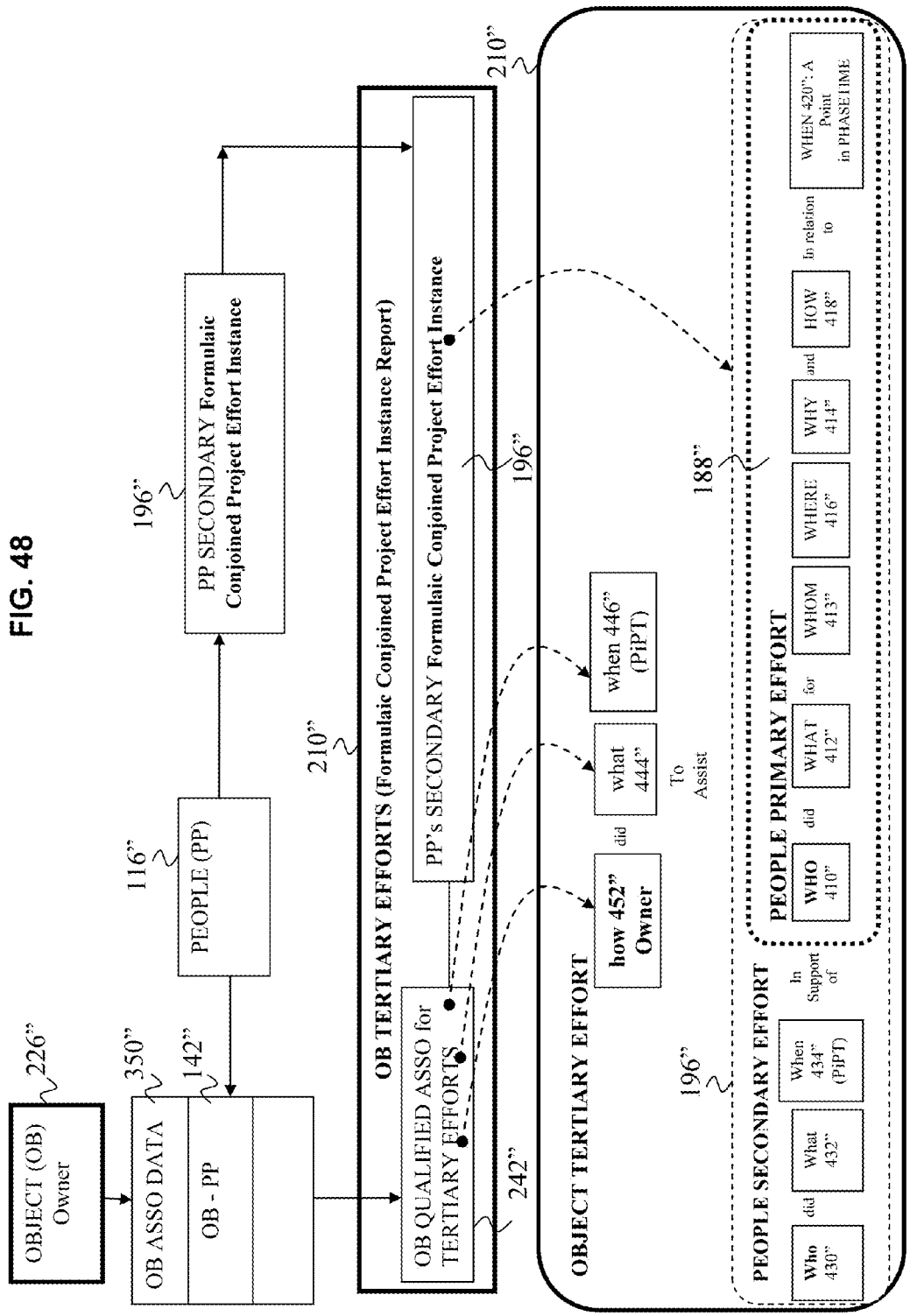
FIG. 48 is a Tertiary Formulaic CPEI Diagram for Objects according to the above preferred embodiment of the present invention.

FIG. 48 is a diagram illustrating how a Tertiary Object CPEI 210" Report is derived and reported for an Objects Tertiary Owner 226" Element 101" through an Object Qualified Association for Tertiary Efforts 242" with the People Secondary Owner 212" Element 101", wherein said People Secondary Owner 212" has a Secondary People CPEI 196" derived through the Places Qualified Associations for Secondary Efforts 230" with the Primary People 116" Element 101".

FIG. 48 builds on FIGS. 10 and 14 by defining that Objects Tertiary Owner 226" Elements 101" are associated to People Secondary Owners 212" Elements 101" by People to Objects Associations (PP-OB ASSOC) 142" which are stored in the Virtual Formulaic Data Matrix 102".

The Objects Tertiary Owner 226" Element 101" may be awarded the Tertiary Object CPEI 210" when said Objects Tertiary Owner 226" Element 101" has the Object Qualified Association for Tertiary Efforts 242" with the People Secondary Owner 212" Element 101", wherein the People Secondary Owner 212" Element 101" has been awarded a Secondary People CPEI 196", and wherein the Objects Tertiary Owner 226" Object Qualified Association for Tertiary Efforts 242" has contributed to the People Secondary Owner 212" in achieving their Secondary People CPEI 196".

FIG. 48 also establishes that the Object Qualified Association for Tertiary Efforts 242" between the Objects Tertiary Owner 226" Element 101" and the People Secondary Owner 212" Element 101" are considered Tertiary Efforts 350", wherein said Tertiary Effort 350" is the Formula Associative Data Value 115" that is stored within Base Tables 314".

According to FIG. 48, the Tertiary Object CPEI 210" Report is derived and reported from an association between the Objects Tertiary Owner 226" and the People Secondary Owner 212", wherein the Effort Instance 186" that stores the Primary People CPEI 188" is updated with the Object Qualified Association for Tertiary Efforts 242" that ties the Objects Tertiary Owner 226" to the People Secondary Owner 212".

The Effort Instances 186" therefore contain the Objects Tertiary Owner's 226" Object Qualified Association for Tertiary Efforts 242" to the People Secondary Owner 212", the People Secondary Owner's 212" People Qualified Association for Secondary Efforts 228" to the Primary People 116", and the multiple Element 101" associations that are used to generate the Primary People CPEI 188".

The Tertiary Object CPEI 210" Report is reported from the Virtual Formulaic Data Matrix 102" according to CPEI Reporting Rules 324" for Tertiary Object CPEI 204 including:

- a how 452" ($3^{rd}$)—Objects Tertiary Owner 226"
- did what 444" ($3^{rd}$)—Objects Qualified Association 242" (Tertiary Effort 350")
- when 446" ($3^{rd}$)—Point in Phasetime (PiPT) 128" for Tertiary Effort 350" to assist
- Who 430" ($2^{nd}$)—People Secondary Owner 212" (owner of Secondary People CPEI 196")
- did What 432" ($2^{nd}$)—People Qualified Association 228" (People 116" Secondary Effort 229")
- When 434" ($2^{nd}$)—Point In Phasetime (PiPT) 128" for Secondary Effort 229" in Support of
- WHO 410"—Primary People 116" (owner of Primary People CPEI 188")
- did WHAT 412"—Effort 153" (Role) 154"
- for WHOM 413"—Primary Project 120" owner
- WHERE 416"—Primary Places 118"
- WHY 414"—Primary Project 120"
- and HOW 418"—Primary Objects 124"
- in relation to the WHEN 420"—Point in Phasetime (PiPT) 128"

FIG. 48 also acknowledges that the System and Method comprise the following rules for approving the Object Qualified Associations for Tertiary Efforts 242" used in generating Tertiary Object CPEIs 210":

In order to create the Tertiary Effort 350", the Secondary Effort 229" must first exist.

The People Secondary Owner 212" Element 101" will have to approve the Tertiary Effort 350".

A Tertiary Object CPEI 210" can be established when the Objects Tertiary Owner 226" Element 101" receives the approval of their Object Qualified Association for Tertiary Efforts 242" to the People Secondary Owner 212" who has an approved Secondary People CPEI 196".

The owner of the Project 120" which is the subject of the Primary People CPEI 188 can disapprove the Tertiary Effort 350".

The People Secondary Owner 212" will have to approve the Object Qualified Association for Tertiary Efforts 242" between it and the Objects Tertiary Owner 226".

The Objects Tertiary Owner 226" must provide some type of proof (such as a document or data) that affirms their association to the People Secondary Owner 212".

Figure 49:
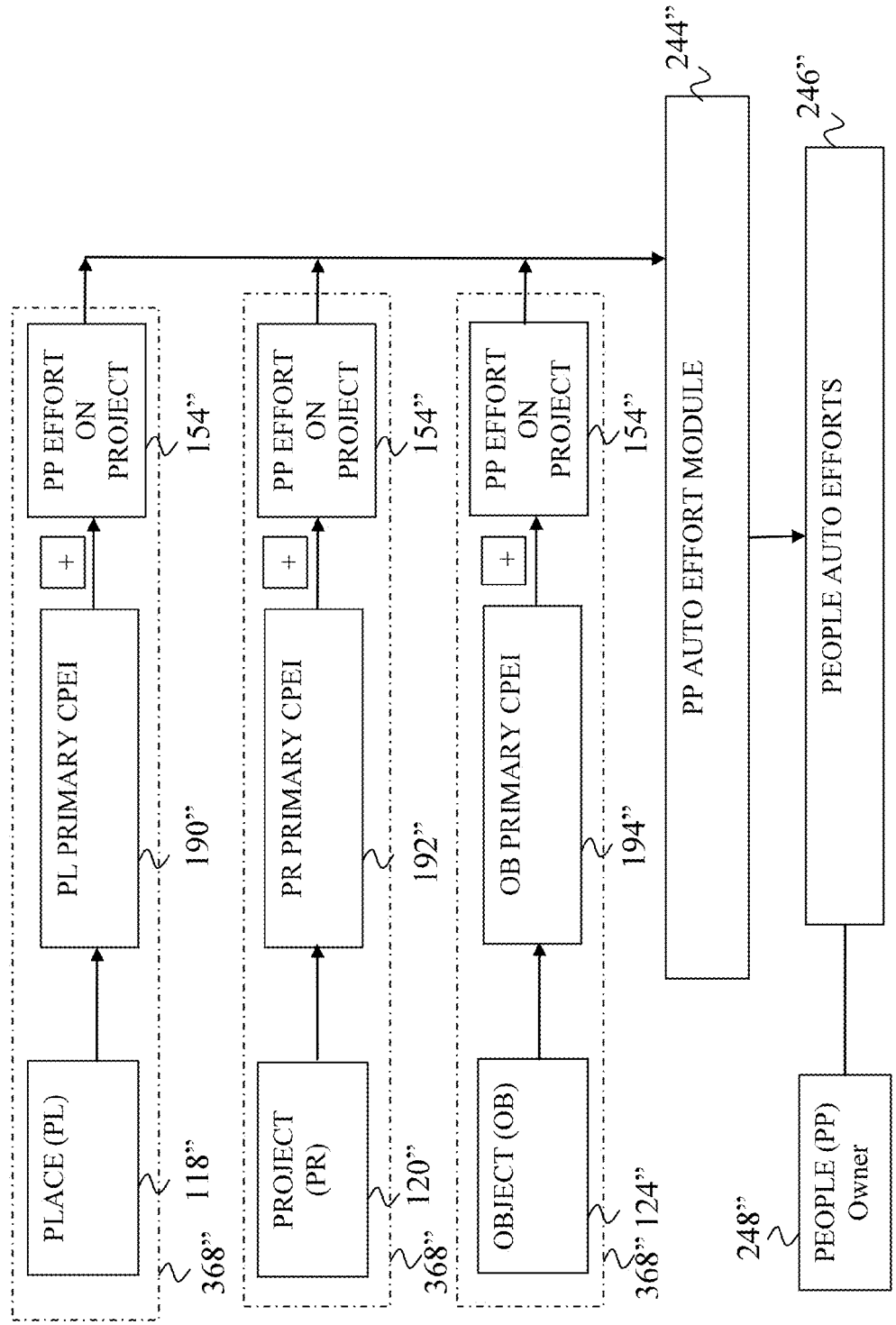
FIG. 49 is a People Auto Effort Diagram according to the above preferred embodiment of the present invention.

FIG. 49 is a diagram illustrating how a People Auto CPEI Reports 246" are derived and reported for People 116" Elements 101" according to the "Formulaic Effort Instance Conjoined Project Effort Display Reporting Method and System Thereof".

According to FIG. 49, the People Auto CPEI Reports 246" will be generated if:

The Places (PL) 118" Element 101" that has a Primary Places CPEI 190" has submitted a People 116" Element 101" along with the People's 116" Effort 153" (Role) 154" on the Project 120" as part of their Primary Places CPEI 190", wherein the People 116" Element 101" had not previously submitted their Effort 153" (Role) 154" on the Project 120" or the People 116" Element 101" is unknown.

The Project (PR) 120" Element 101" that has a Primary Project CPEI 192" has submitted the People 116" Element 101" along with the People's 116" Effort 153" (Role) 154" on the Project as part of their Primary Project CPEI 192", wherein the People 116" Element 101" had not previously submitted their Effort 153" (Role) 154" on the Project 120" or the People 116" Element 101" is unknown.

The Object (OB) 124" Element 101" that has a Primary Object CPEI 194 has submitted the People 116" Element 101" along with the People's Effort 153"(Role) 154" on the Project as part of their Primary Object CPEI 194", wherein the People 116" Element 101" had not previously submitted their Effort 153" (Role) 154" on the Project 120" or the People 116" Element 101" is unknown.

FIG. 49 also illustrates that People Auto CPEI Reports 246" are generated for a People Auto Owner 248" via People Auto Effort Modules 244", wherein the People Auto Effort Modules 244" output Formulaic Primary Data Fields 330" from Effort Instances 186" within the Virtual Formulaic Data Matrix 102" according to CPEI Reporting Rules 324" for People Auto CPEI Reports 246" including:

People Auto CPEI Reports 246" are generated by the System's Method through associations that are input by someone other than the People Auto Owner 248".

These are defined as a Reciprocating Associations 368" which are stored in Base Tables 314" within the Virtual Formulaic Data Matrix 102".

Figure 50:
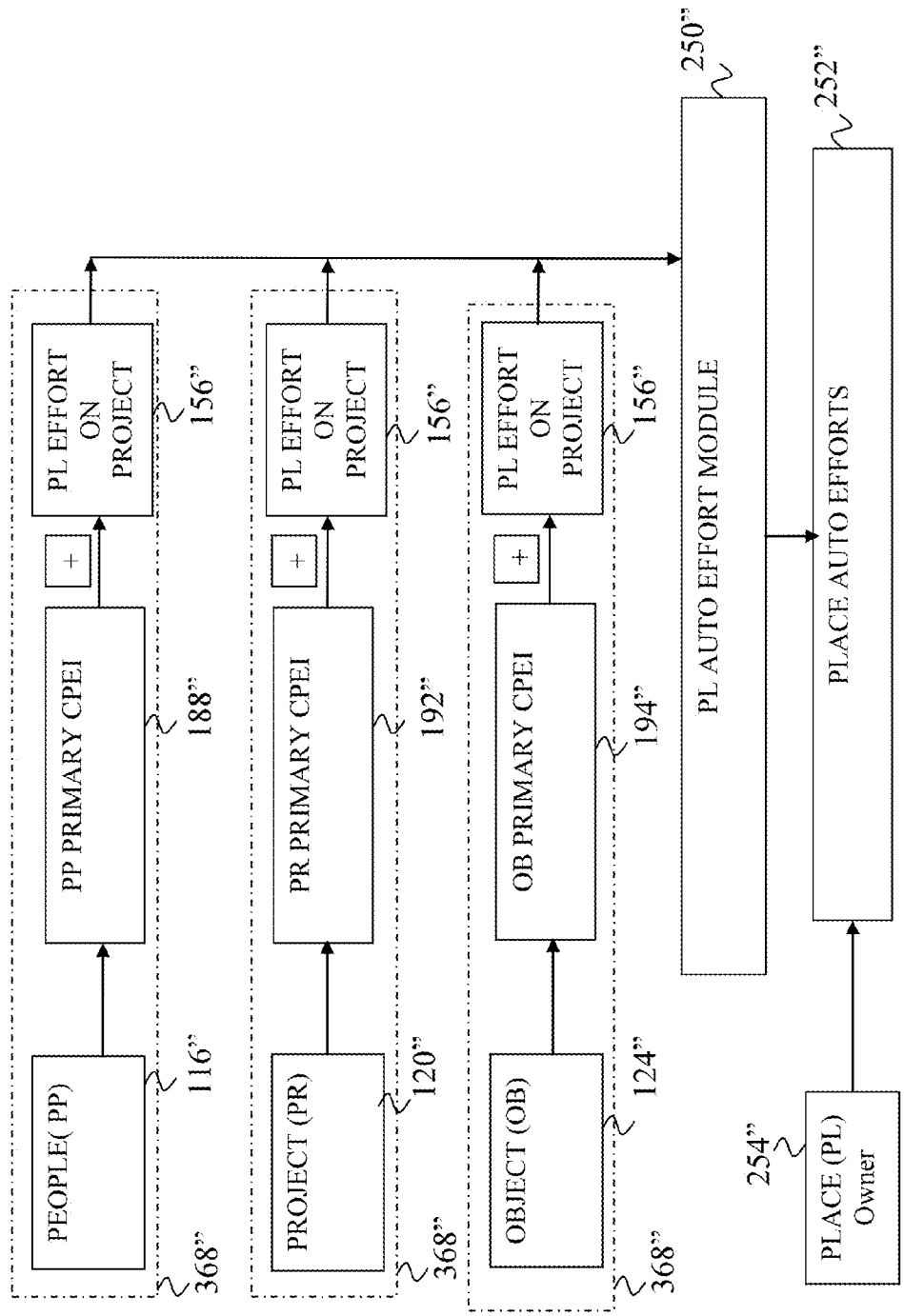
FIG. 50 is a Places Auto Effort Diagram according to the above preferred embodiment of the present invention.

FIG. 50 is a diagram illustrating how Places Auto CPEI Reports 252" are derived and reported for Places 118" Elements 101" according to the "Formulaic Effort Instance Conjoined Project Effort Display Reporting Method and System Thereof" of the preferred embodiment of the present invention.

According to FIG. 50, the Places Auto CPEI Reports 252" will be generated if The People (PP) 116" Element 101" that has the Primary People CPEI 188" has submitted the Places 118" Element 101" along with the Place's 118" Effort 153" (Services) 156" on the Project 120" as part of their Primary People CPEI 188", wherein the Places 118" Element 101" had not previously submitted their Effort 153" (Services) 156" on the Project 120" or the Places 118" Element 101" is unknown.

The Project (PR) 120" Element 101" that has the Primary Project CPEI 192" has submitted the Places 118" Element 101" along with the Place's 118" Effort 153"(Services) 156" on the Project 120" as part of their Primary Project CPEI 192", wherein the Places 118" Element 101" had not previously submitted their Effort 153" (Services) 156" on the Project 120" or the Places 118" Element 101" is unknown.

The Object (OB) 124" Element 101" that has a Primary Object CPEI 194" has submitted the Places 118" Element 101" along with the Place's 118" Effort 153" (Services) 156" on the Project 120" as part of their Primary Object CPEI 194", wherein the Places 118" Element 101" had not previously submitted their Effort 153" (Services) 156" on the Project 120" or the Places 118" Element 101" is unknown.

FIG. 50 also illustrates that Places Auto CPEI Reports 252" are generated for Places Auto Owner 254" via Places Auto Effort Modules 250", wherein said Places Auto Effort Modules 250" output Formulaic Primary Data Fields 330" from Effort Instances 186" within the Virtual Formulaic Data Matrix 102" according to CPEI Reporting Rules 324" for Places Auto CPEI Reports 252" including:

Places Auto CPEI Reports 252" are generated by the System's Method through associations that are input by someone other the Places 118" owner. These are defined as Reciprocating Associations 368" which are stored in Base Tables 314" within the Virtual Formulaic Data Matrix 102".

Figure 51:
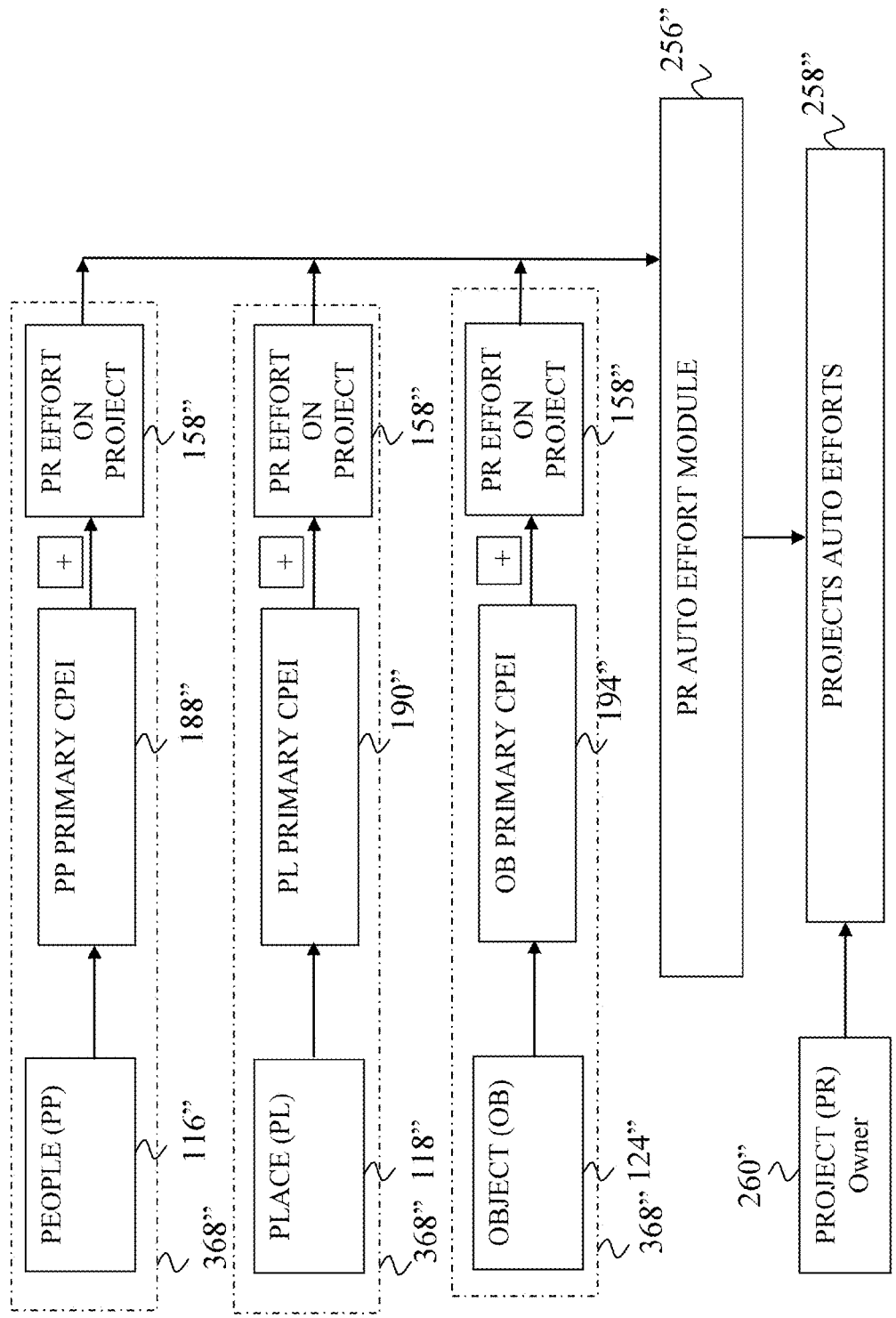
FIG. 51 is a Projects Auto Effort Diagram according to the above preferred embodiment of the present invention.

FIG. 51 is a diagram illustrating how a Project Auto CPEI Reports 258" are derived and reported for Project 120" Elements 101" according to the "Formulaic Effort Instance Conjoined Project Effort Display Reporting Method and System Thereof" of the preferred embodiment of the present invention.

According to FIG. 51, the Project Auto CPEI Report 258 "will be generated if:

The People (PP) 116" Element 101" that has the Primary People CPEI 188" has submitted the Project 120" Element 101" along with the Project's 120" Effort 153" (Contribution 158") on another Project 120" as part of their Primary People CPEI 188", wherein the Project 120" Element 101" had not previously submitted their Effort 153" (Contribution) 158" on the Project 120" or the Project 120" Element 101" is unknown.

The Places (PL) 118" Element 101" that has a Primary Places CPEI 190" has submitted the Project 120" Element 101" along with the Project's 120" Effort 153" (Contribution) 158" on another Project 120" as part of their Primary Places CPEI 190", wherein the Project 120" Element 101" had not previously submitted their Effort 153" (Contribution) 158" on the Project 120" or the Project 120" Element 101" is unknown.

The Object (OB) 124" Element 101" that has a Primary Object CPEI 194" has submitted the Project 120" Element 101" along with the Project's 120" Effort 153" (Contribution) 158" on another Project 120" as part of their Primary Object CPEI 194", wherein the Project 120" Element 101" had not previously submitted their Effort 153" (Contribution) 158" on the Project 120" or the Project 120" Element 101" is unknown.

FIG. 51 also illustrates that Project Auto CPEI Reports 258" are generated for Project Auto Owner 260" via a Projects Auto Effort Modules 256" wherein said Projects Auto Effort Modules 256" output Formulaic Primary Data Fields 330" from Effort Instances 186" within the Virtual Formulaic Data Matrix 102" according CPEI Reporting Rules 324" for Project Auto CPEI Reports 258" including:

Project Auto CPEI Reports 258" are generated by the System's Method through associations that are input by someone other the Project 120" owner. These are defined as Reciprocating Associations 368" which are stored in Base Tables 314" within the Virtual Formulaic Data Matrix 102".

Figure 52:
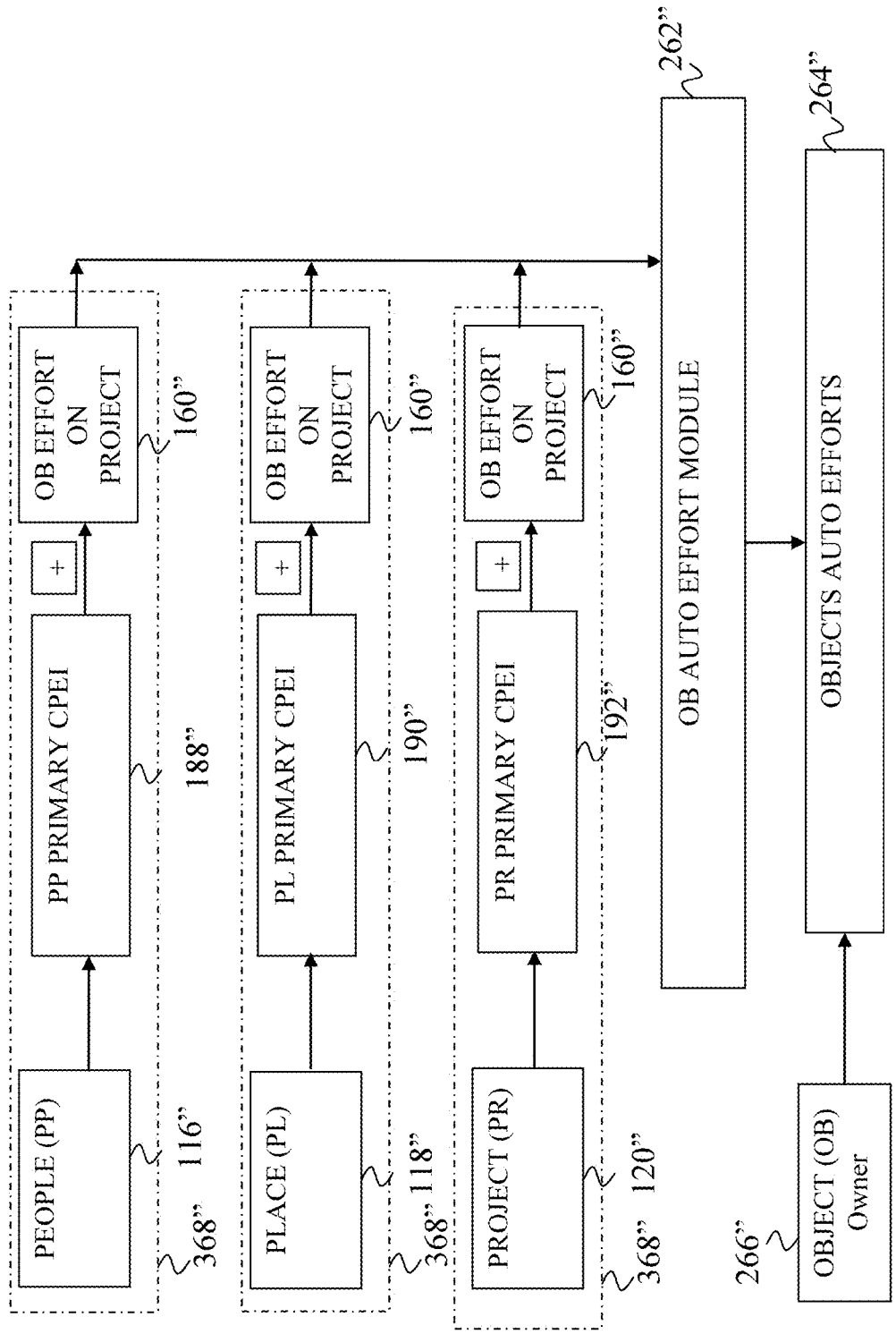
FIG. 52 is an Objects Auto Effort Diagram according to the above preferred embodiment of the present invention.

FIG. 52 is a diagram illustrating how an Object Auto CPEI Reports 264" are derived and reported for Object 124" Elements 101" according to the "Formulaic Effort Instance Conjoined Project Effort Display Reporting Method and System Thereof" of the preferred embodiment of the present invention.

According to FIG. 52, the Object Auto CPEI Reports 264" will be generated if:

The People (PP) 116" Element 101" that has the Primary People CPEI 188" has submitted the Object 124" Element 101" along with the Object's 124" Effort 153" (Utilization) 160" on another Project 120" as part of their Primary People CPEI 188", wherein the Object 124" Element 101" had not previously submitted their Effort 153" (Utilization) 160" on the Project 120" or the Object 124" Element 101" is unknown.

The Places (PL) 118" Element 101" that has a Primary Places CPEI 190" has submitted the Object 124" Element 101" along with the Object's 124" Effort 153" (Utilization) 160" on another Project 120" as part of their Primary Places CPEI 190", wherein the Object 124" Element 101" had not previously submitted their Effort 153" (Utilization) 160" on the Project 120" or the Object 124" Element 101" is unknown.

The Project (PR) 120" Element 101" that has a Primary Project CPEI 192" has submitted the Object 124" Element 101" along with the Object's 124" Effort 153" (Utilization) 160" on another Project 120" as part of their Primary Project CPEI 192", wherein the Object 124" Element 101" had not previously submitted their Effort 153" (Utilization) 160" on the Project 120" or the Object 124" Element 101" is unknown.

FIG. 52 also illustrates that Object Auto CPEI Reports 264" are generated for Object Auto Owner 266" via Object Auto Effort Modules 262", wherein said Object Auto Effort Modules 262" output Formulaic Primary Data Fields 330" from Effort Instances 186" within the Virtual Formulaic Data Matrix 102" according CPEI Reporting Rules 324" for Object Auto CPEI Reports 264" including:

Object Auto CPEI Reports 264" are generated by the System's Method through associations that are input by someone other the Object 124" owner. These are defined as Reciprocating Associations 368" which are stored in Base Tables 314" within the Virtual Formulaic Data Matrix 102".

Figure 53:
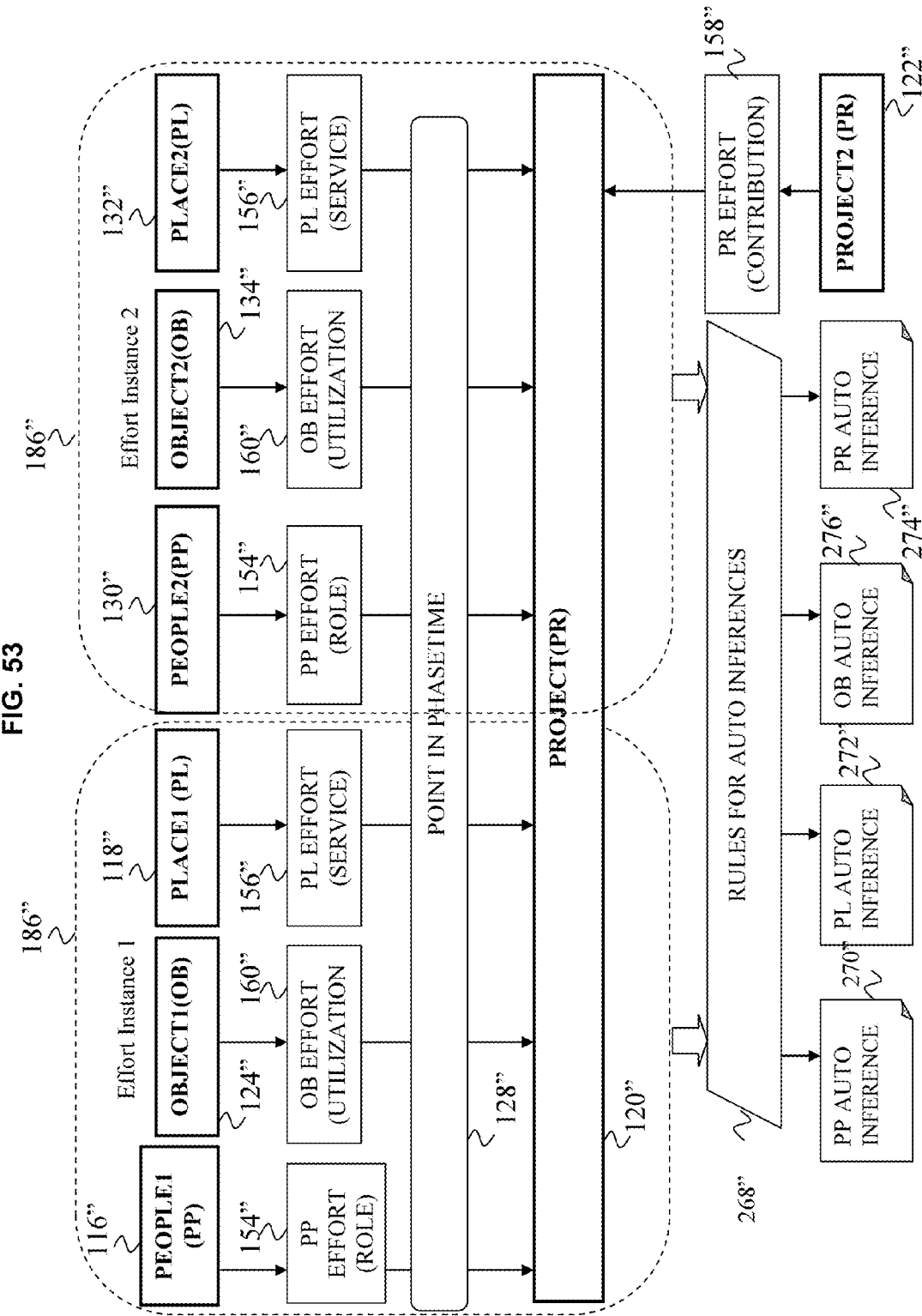
FIG. 53 is an Auto Inference Diagram according to the above preferred embodiment of the present invention.

FIG. 53 also illustrates that a People Auto Inference Effort 270", a Places Auto Inference Effort 272", a Project Auto Inference Effort 274", and an Object Auto Inference Effort 276" are generated for Elements 101", wherein the Auto Inference Efforts 270", 272", 274", 276" are derived from Inferred associated data output from Effort Instances 186" within the Virtual Formulaic Data Matrix 102" according to the following a Rules For Auto Inferences 268":

1. Auto Inference Associations 367" are associations automatically generated by the System when two Elements 101" have Efforts 153" on the common Project 120" at the common Point in Phasetime (PiPT) 128".
2. Auto Inference Associations 367" are not stored in the tables in the Virtual Formulaic Data Matrix 102".
3. Auto Inference Associations 367" are considered unverified associations as the association has not been verified.
4. If an Auto Inference Association 367" is confirmed by the Element 101" in the Inferred association, the Element 101" can request that it be converted to the Primary CPEI 188", 190", 192", 194".

FIG. 53 also defines that Auto Inference Associations 367" can only occur between Elements 101" within two Effort Instances 186" who share the common Project (PR) 120" and the Point in Phasetime (PiPT) 128". The Elements 101" include:

People (PP) 116"
A People2 (PP2) 130"
Places (PL) 118"
Places2 (PL2) 132"
Projects (PR) 120"
Project2 (PR2) 122"
Objects (OB) 124"
Object2 (OB 2) 134"

FIG. 53 also stipulates that People Auto Inference Efforts 270", Places Auto Inference Efforts 272", Projects Auto Inference Efforts 274", and Objects Auto Inference Efforts 276" are generated from the above Element 101" based on the so stated Rules for Auto Inferences 268".

Figure 54:
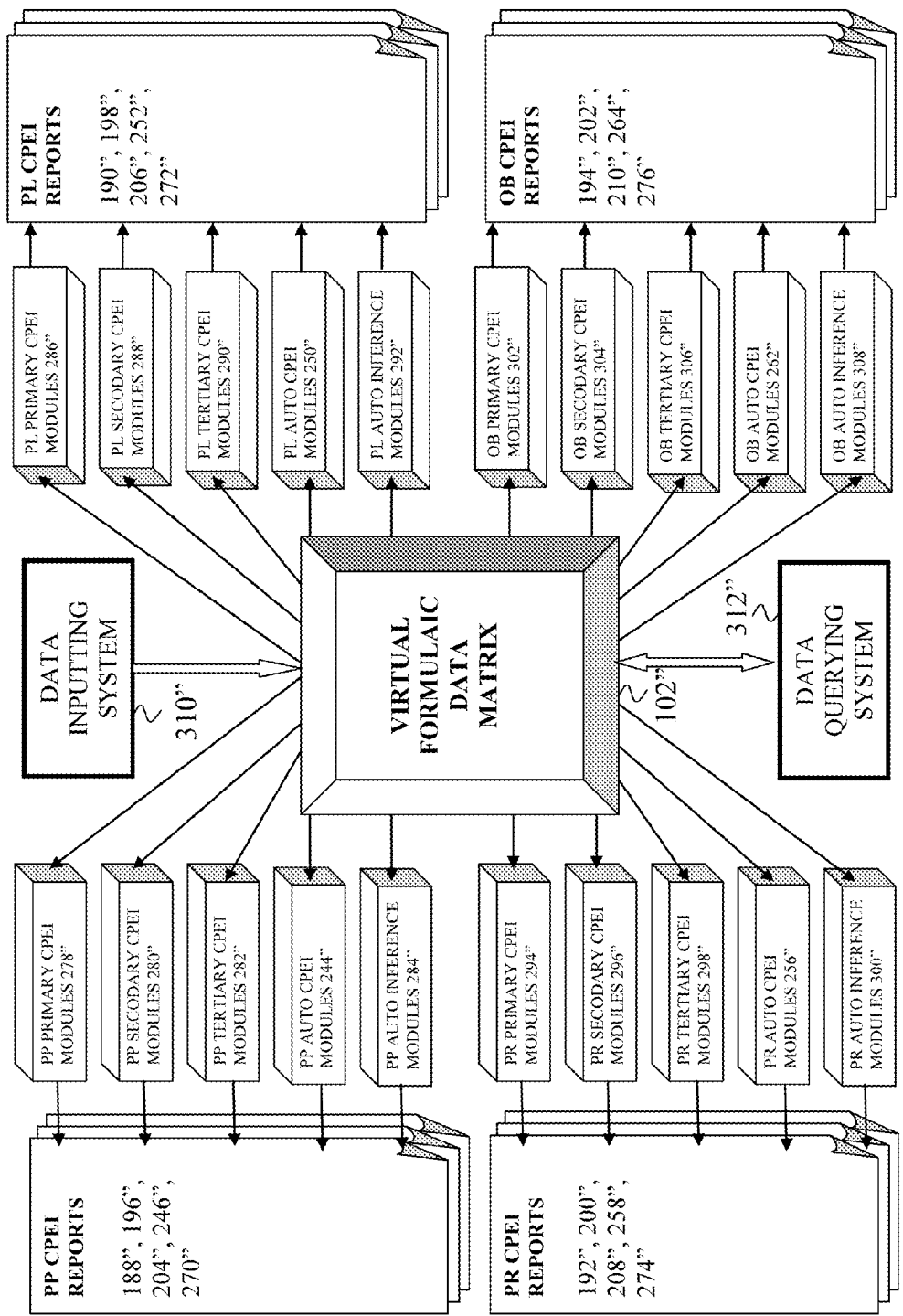
FIG. 54 illustrates Formulaic Matrix Reporting Modules according to the above preferred embodiment of the present invention.

FIG. 54 is a diagram that illustrates the various Virtual Formulaic Data Matrix 102" reporting modules used to generate and report Primary CPEI 188", 190", 192", 194" data, Secondary CPEI 196", 198", 200", 202" data, and Tertiary CPEI 204", 206", 208", 210" data for each Element 101" entered via a Data Inputting System 310" and reported in response to a query utilizing a Data Querying System 312" according to established "Formulaic Conjoined Project Effort Instance Display Method and Search System Process Thereof" rules.

According to FIG. 54, the Virtual Formulaic Data Matrix 102" outputs People 116" data within People 116" reports via the following modules:

A People Primary CPEI Modules 278"—Output People (PP) 116" data within Primary People CPEI 188" reports.

A People Secondary CPEI Modules 280"—Output People (PP) 116" data within Secondary People CPEI 196" reports.

A People Tertiary CICPE Modules 282"—Output People (PP) 116" data within Tertiary People CPEI 204" reports.

People Auto Effort Modules 244"—Output People (PP) 116" data within People Auto CPEI Reports 246".

A People Auto Inference Effort Modules 284—Output People (PP) 116" data within People Auto Inference Effort 270" reports.

FIG. 54 also illustrates that the Virtual Formulaic Data Matrix 102" outputs Places 118" data within Places 118" reports via the following modules:

A Places Primary CPEI Modules 286"—Output Places (PL) 118" data within Primary Places CPEI 190" reports.

A Places Secondary CPEI Modules 288"—Output Places (PL) 118" data within Secondary Places CPEI 198" reports.

A Places Tertiary CPEI Modules 290"—Output Places (PL) 118" data within Tertiary Places CPEI 206" reports.

Places Auto Effort Modules 250"—Output Places (PL) 118" data within Places Auto CPEI Reports 252".

A Places Auto Inference Effort Modules 292"—Output Places (PL) Auto Inference data within Places Auto Inference Effort 272" reports.

FIG. 54 also illustrates that the Virtual Formulaic Data Matrix 102" outputs Projects 120" data within Project 120" reports via the following modules:

A Project Primary CPEI Modules 294"—Output Project (PR) 120" data within Primary Project CPEI 192" reports.

A Project Secondary CPEI Modules 296"—Output Project (PR) 120" data within Secondary Project CPEI 200" reports.

A Project Tertiary CPEI Modules 298"—Output Project (PR) 120" data within Tertiary Project CPEI 208" reports.

Project Auto Effort Modules 256"—Output Project (PR) 120" data within Project Auto CPEI Reports 258".

A Project Auto Inference Effort Modules 300"—Output Project (PR) 120" data within Project Auto Inference Effort 274" reports.

FIG. 54 also illustrates that the Virtual Formulaic Data Matrix 102" outputs Object 124" data within Object 124" reports via the following modules:

An Object Primary CPEI Modules 302"—Output Object (OB) 124" data within Primary Object CPEI 194" reports.

An Object Secondary CPEI Modules 304"—Output Object (OB) 124" data within Secondary Object CPEI 202" reports.

An Object Tertiary CPEI Modules 306"—Output Object (OB) 124" data within Tertiary Object CPEI 210" reports.

Object Auto Effort Modules 262"—Output Object (OB) 124" data within Object Auto CPEI Reports 264".

An Object Auto Inference Effort Modules 308"—Output Object (OB) 124" data within Object Auto Inference Effort 276" reports.

FIGS. 55A-55D are diagrams that illustrate the various Primary CPEI (People, Places, Projects, and Objects) 188", 190", 192", 194" Displays graphically reporting attributes.

Figure 55A:
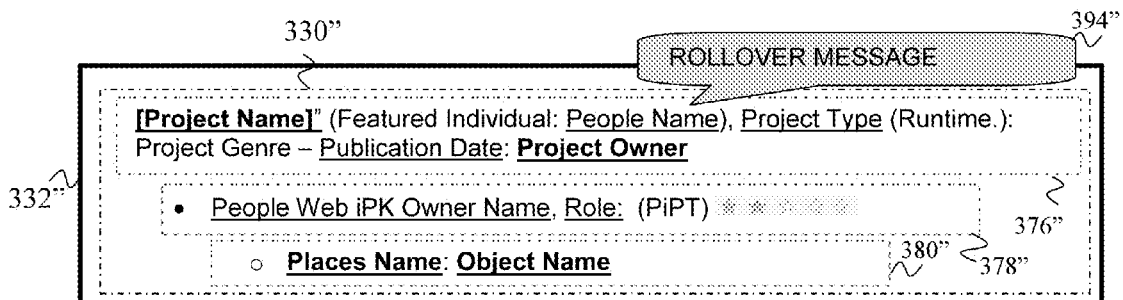
FIGS. 55A-55D illustrate Primary CPEI Field and Appendage Diagrams according to the above preferred embodiment of the present invention.
Figure 55B:
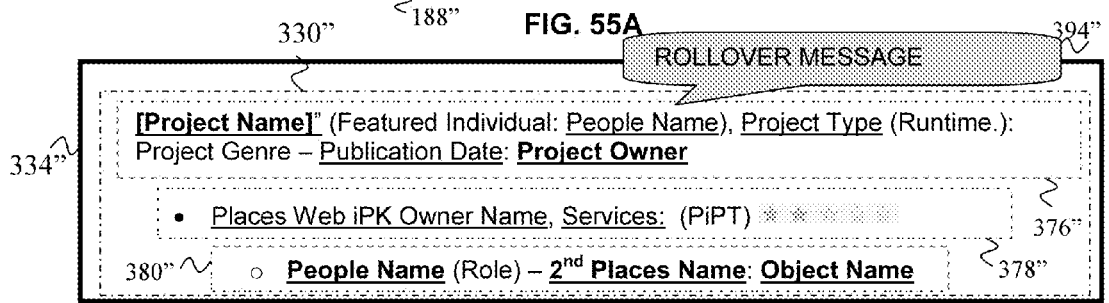
Figure 55C:
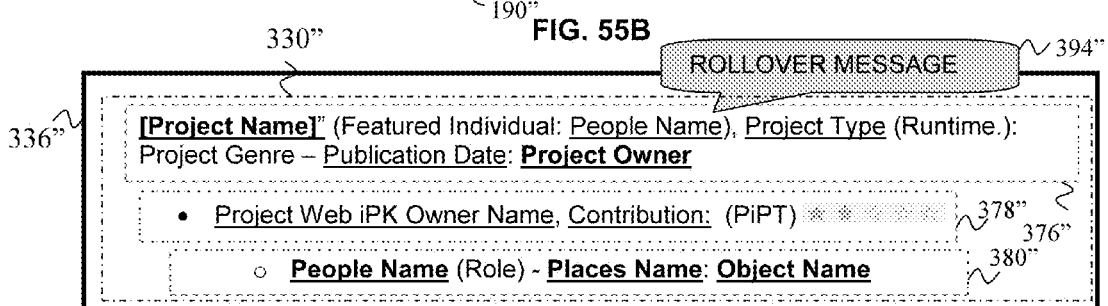
Figure 55D:
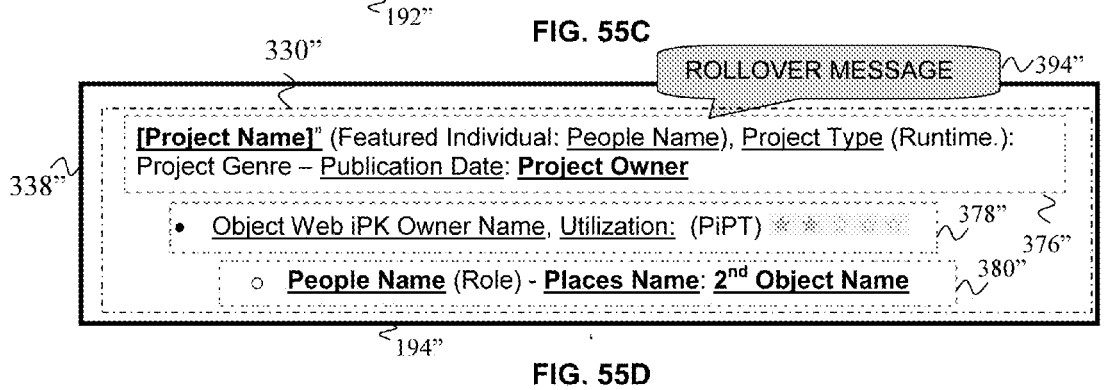

FIG. 55A illustrates that the Primary People CPEI 188" display includes Formulaic Primary Data Fields 330" which can include, but not limited to, the following:

Primary People CPEI 188" owner name
Primary People CPEI 188" owner Effort 153" (Role) 154"
Project 120" Name
Featured Individual (People 116") name
Featured Individual (People 116") type
Project 120" type
Project 120" genre
Project 120" runtime
Project 120" publication date
Project 120" owner name
Places 118" name
Objects 124" name FIG. 55B illustrates that a Primary Places CPEI 190" display includes Formulaic Primary Data Fields 330" which can include, but not limited to, the following:

Primary Places CPEI 190" owner's name
Primary Places CPEI 190" owner's Effort 153" (Services) 156"
Project's 120" name
Featured Individual (People 116") name
Featured Individual (People 116") type
Project's 120" type
Project's 120" genre
Project's 120" runtime
Project's 120" publication date
Project's 120" owner name
People's 116" name and Role 154
Places2 132" name
Object's 124" name FIG. 55C illustrates that a Primary Project CPEI 192" display includes Formulaic Primary Data Fields 330" which can include, but not limited to, the following:

Primary Project CPEI 192" owner's name
Primary Project CPEI 192" owner's Effort 153" (Contribution) 158"
Project's 120" name
Featured Individual (People 116") name
Featured Individual (People 116") type
Project's 120" type
Project's 120" genre
Project's 120" runtime
Project's 120" publication date
Project's 120" owner name
People's 116" name and Role 154"
Place's 118" name
Object's 124" name FIG. 55D illustrates that a Primary Object CPEI 194" display includes Formulaic Primary Data Fields 330" which can include, but not limited to, the following:

Primary Object CPEI 194" owner's name
Primary Object CPEI 194" owner's Effort 153" (Utilization) 160" Project's 120" name
Featured Individual (People 116") name
Featured Individual (People 116") type
Project's 120" type
Project's 120" genre
Project's 120" runtime
Project's 120" publication date
Project's 120" owner name
People's 116" name and Role 154"
Place's 118" name
Object2 134" name According to FIG. 55A the Primary People CPEI 188" Displays will graphically display the following appendages:

A Primary Main Effort Body 376": Displays Formulaic Primary Data Fields 330" pertaining to the Project 120" and a Project Relational Data 174".

A Primary Lower Appendage One 378": Displays Formulaic Primary Data Fields 330" pertaining to the People 116" owner's Effort 153" (Role) 154", level rating, and the Point In Phasetime (PiPT) 128" in which the People 116" owner's Effort 153" (Role) 154" occurred.

A Primary Lower Appendage Two 380": Displays Formulaic Primary Data Fields 330" pertaining to the Places 118" and Object 124" who are associated to the People 116" owner by their Efforts 153" on the Project 120".

According to FIG. 55B the Primary Places CPEI 190" Displays will graphically display the following appendages:
- Primary Main Effort Body 376": Displays Formulaic Primary Data Fields 330" pertaining to the Project 120" and Project Relational Data 174".
- Primary Lower Appendage One 378": Displays Formulaic Primary Data Fields 330" pertaining to the Places 118" owner's Effort 153" (Services) 156", level rating, and the Point In Phasetime (PiPT) 128" in which the Places 118" owner's Effort 153" (Services) 156" occurred.
- Primary Lower Appendage Two 380": Displays Formulaic Primary Data Fields 330" pertaining to the People 116", Places2 132", and Object 124" who are associated to the Places 118" owner by their Efforts 153" on the Project 120".

According to FIG. 55C the Primary Project CPEI 192" Displays will graphically display the following appendages:
- Primary Main Effort Body 376": Displays Formulaic Primary Data Fields 330" pertaining to the Project2 122" (subject of the CPEI) and Project2's Project Relational Data 174".
- Primary Lower Appendage One 378": Displays Formulaic Primary Data Fields 330" pertaining to the Project 120" owner's Effort 153" (Contribution) 158", level rating, and the Point In Phasetime (PiPT) 128" in which the Project 120" owner's Effort 153" (Contribution) 158" occurred.
- Primary Lower Appendage Two 380": Displays Formulaic Primary Data Fields 330" pertaining to the People 116", Places 118", and Object 124" who are associated to the Project 120" owner by their Efforts 153" on the Project2 122".

According to FIG. 55D the Primary Objects CPEI 194" Displays will graphically display the following appendages:
- Primary Main Effort Body 376": Displays Formulaic Primary Data Fields 330" pertaining to the Project 120" and Project Relational Data 174".
- Primary Lower Appendage One 378": Displays Formulaic Primary Data Fields 330" pertaining to the Object 124" owner's Effort 153" (Utilization) 160", level rating, and the Point In Phasetime (PiPT) 128" in which the Object 124" owner's Effort 153" (Utilization) 160" occurred.
- Primary Lower Appendage Two 380": Displays Formulaic Primary Data Fields 330 pertaining to the People 116", Places 118", and Object2 134" who are associated to the Object 124" owner by their Efforts 153" on the Project 120".

FIGS. 55A-55D also establishes that said Formulaic Primary Data Fields 330" may be hyperlinks to additional data that can include, but not limited to, the following:
- Other Primary CPEI 188", 190", 192", 194" Displays
- Other Secondary CPEI 196", 198", 200", 202" Displays
- Other Tertiary CPEI 204", 206", 208", 210" Displays
- E-commerce or consumer [Buy It Now] commerce websites
- Other websites or web networks
- Interactive reports
- Other general effort data
- Reviews
- Ratings
- Media (images, video, graphics, icons, etc.)

FIGS. 55A-55D also establish that said Formulaic Primary Data Fields 330" may access a Primary Rollover Messages 394" when a user "rolls over" or "mouse over" a particular Field. Said Rollover Messages may display, but not limited to, the following:
- Text Instructions
- Hyperlinks to additional data
- Media (images, video, graphics, icons, etc.)
- Descriptions of hyperlinks FIGS. 56A-56D are diagrams that illustrate the various Secondary CPEI (People, Places, Projects, and Objects) 196", 198", 200", 202" Displays graphically reporting attributes.

Figure 56A:
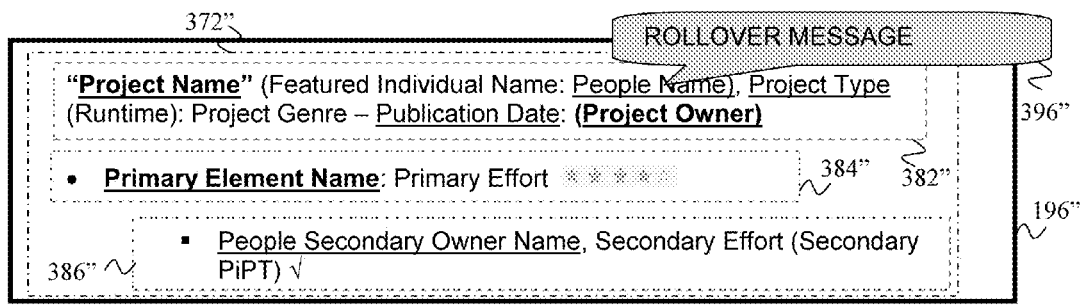
FIGS. 56A-56D illustrate Secondary CPEI Field and Appendage Diagrams according to the above preferred embodiment of the present invention.
Figure 56B:
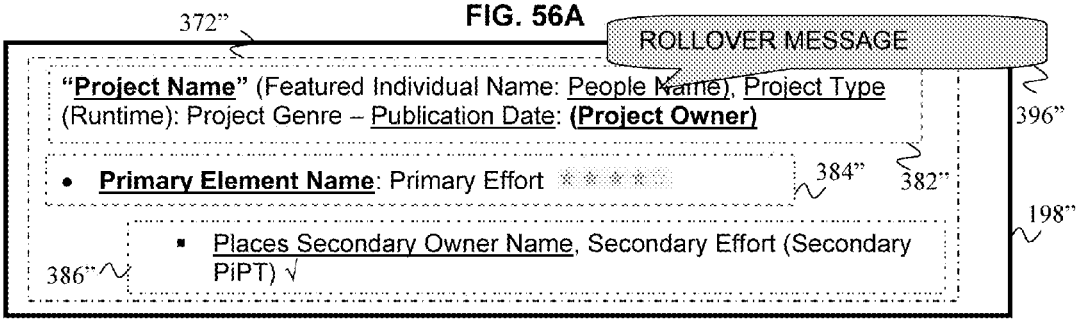
Figure 56C:
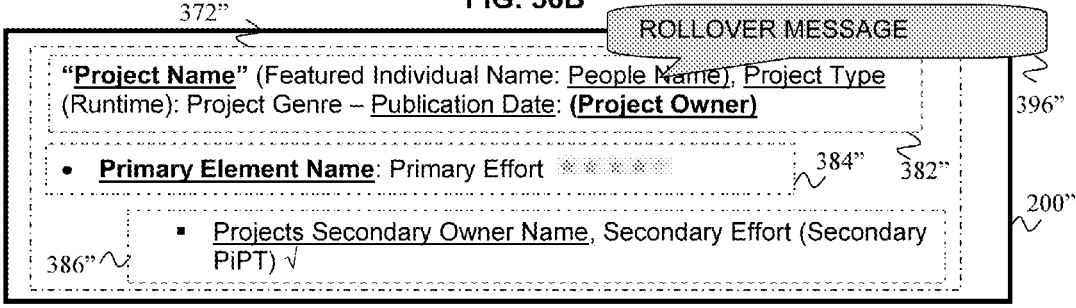
Figure 56D:
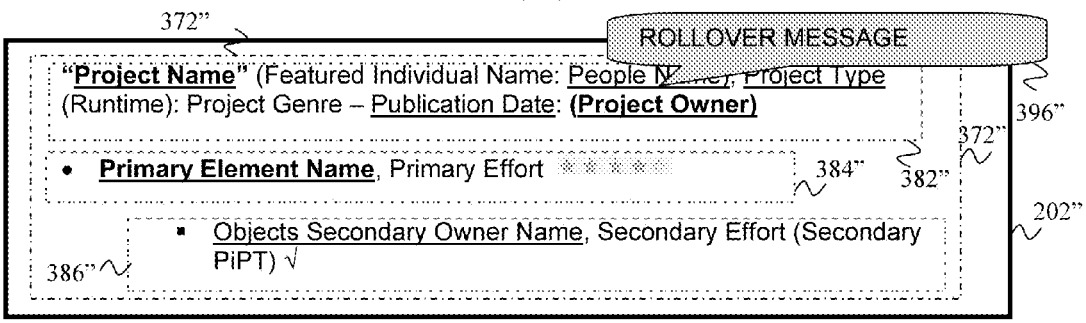

FIG. 56A illustrates that a Secondary People CPEI 196" display includes a Formulaic Secondary Data Fields 372" which can include, but not limited to, the following:
- Secondary People CPEI 196" owner's name
- Secondary People CPEI 196" owner's Secondary Effort 229"
- Secondary Point In Phasetime (PiPT) 128"
- A Primary Element 340" name and Effort 153" on Primary Project 120"
- Primary Project 120" name
- Featured Individual (People 116") Name
- Featured Individual (People 116") Type
- Primary Project 120" type
- Primary Project 120" genre
- Primary Project 120" runtime
- Primary Project 120" publication date FIG. 56B illustrates that a Secondary Places CPEI 198" display includes Formulaic Secondary Data Fields 372" which can include, but not limited to, the following:
- Secondary Places CPEI 198" owner's name
- Secondary Places CPEI 198" owner's Secondary Effort 229"
- Secondary Point In Phasetime (PiPT) 128"
- Primary Element 340" name and Effort 153" on Primary Project 120"
- Primary Project 120" name
- Featured Individual (People 116") Name
- Featured Individual (People 116") Type
- Primary Project 120" type
- Primary Project 120" genre
- Primary Project 120" runtime
- Primary Project 120" publication date FIG. 56C illustrates that a Secondary Project CPEI 200" display includes Formulaic Secondary Data Fields 372" which can include, but not limited to, the following:
- Secondary Project CPEI 200" owner's name
- Secondary Project CPEI 200" owner's Secondary Effort 229"
- Secondary Point In Phasetime (PiPT) 128"
- Primary Element 340" name and Effort 153" on Primary Project 120"
- Primary Project 120" name
- Featured Individual (People 116") Name
- Featured Individual (People 116") Type
- Primary Project 120" type
- Primary Project 120" genre
- Primary Project 120" runtime
- Primary Project 120" publication date FIG. 56D illustrates that a Secondary Object CPEI 202" display includes Formulaic Secondary Data Fields 372" which can include, but not limited to, the following:
- Secondary Object CPEI 202" owner's name
- Secondary Object CPEI 202" owner's Secondary Effort 229"
- Secondary Point In Phasetime (PiPT) 128"
- Primary Element 340" name and Effort 153" on Primary Project 120"
- Primary Project 120" name
- Featured Individual (People 116") Name Featured Individual (People 116") Type
Primary Project 120" type
Primary Project 120" genre
Primary Project 120" runtime
Primary Project 120" publication date According to FIG. 56A, the Secondary People CPEI Displays 196" will graphically display the following appendages:

Secondary Main Effort Body 382": Displays Formulaic Secondary Data Fields 372" pertaining to the Primary Project 120" and Primary Project Relational Data 174".

A Secondary Main Body Appendage One 384": Displays the Formulaic Secondary Data Fields 372" pertaining to the Primary Element 340" to which the People 116" owner is associated along with said Primary Element 340" owner's Effort 153" on the Primary Project 120", the Primary Element's 340" level rating, and the Point In Phasetime (PiPT) 128" in which the Primary Element's 340" Effort 153" occurred.

A Secondary Main Body Appendage Two 386": Displays the Formulaic Secondary Data Fields 372" pertaining to the People 116" owner's Secondary Effort 229", level rating, and the Point In Phasetime (PiPT) 128" in which the Secondary Effort 229" occurred.

According to FIG. 56B, the Secondary Places CPEI 198" Displays will graphically display the following appendages:

Secondary Main Effort Body 382": Displays Formulaic Secondary Data Fields 372" pertaining to the Primary Project 120" and Primary Project Relational Data 174".

Secondary Main Body Appendage One 384": Displays the Formulaic Secondary Data Fields 372" pertaining to the Primary Element 340" to which the Places 118" owner is associated along with said Primary Element 340" owner's Effort 153" on the Primary Project 120", the Primary Element's 340" level rating, and the Point In Phasetime (PiPT) 128" in which the Primary Element's 340" Effort 153" occurred.

Secondary Main Body Appendage Two 386": Displays the Formulaic Secondary Data Fields 372" pertaining to the Places 118" owner's Secondary Effort 229", level rating, and the Point In Phasetime (PiPT) 128" in which the Secondary Effort 229" occurred.

According to FIG. 56C, the Secondary Project CPEI 200" Displays will graphically display the following appendages:

Secondary Main Effort Body 382": Displays Formulaic Secondary Data Fields 372" pertaining to the Primary Project 120" and Primary Project Relational Data 174".

Secondary Main Body Appendage One 384": Displays the Formulaic Secondary Data Fields 372" pertaining to the Primary Element 340" to which the Project 120" owner is associated along with said Primary Element 340" owner's Effort 153" on the Primary Project2 122" (subject of the Primary CPEI), the Primary Element's 340" level rating, and the Point In Phasetime (PiPT) 128" in which the Primary Element's 340" Effort 153" occurred.

Secondary Main Body Appendage Two 386": Displays the Formulaic Secondary Data Fields 372" pertaining to the Project 120" owner's Secondary Effort 229", level rating, and the Point In Phasetime (PiPT) 128" in which the Secondary Effort 229" occurred.

According to FIG. 56D, the Secondary Object CPEI 202" Displays will graphically display the following appendages:

Secondary Main Effort Body 382": Displays Formulaic Secondary Data Fields 372" pertaining to the Primary Project 120 and Primary Project Relational Data 174".

Secondary Main Body Appendage One 384": Displays the Formulaic Secondary Data Fields 372" pertaining to the Primary Element 340" to which the Object 124" owner is associated along with said Primary Element 340" owner's Effort 153" on the Primary Project 120", the Primary Element's 340" level rating, and the Point In Phasetime (PiPT) 128" in which the Primary Element's 340" Effort 153" occurred.

Secondary Main Body Appendage Two 386": Displays the Formulaic Secondary Data Fields 372" pertaining to the Object 124" owner's Secondary Effort 229", level rating, and the Point In Phasetime (PiPT) 128" in which the Secondary Effort 229" occurred.

FIGS. 56A-56D also establishes that the Formulaic Secondary Data Fields 372" may be hyperlinks to additional data that can include, but not limited to, the following:

Other Primary CPEI 188", 190", 192", 194" Displays
Other Secondary CPEI 196", 198", 200", 202" Displays
Other Tertiary CPEI 204 206", 208", 210" Displays
E-Commerce or consumer [Buy It Now] commerce sites
Interactive reports
Other general effort data
Reviews
Ratings
Media (images, video, graphics, icons, etc.)

FIGS. 56A-56D also establish that said Formulaic Secondary Data Fields 372" may access a Secondary Rollover Messages 396" when a user "rolls over" or "mouse over" a particular Field. Said Rollover Messages may display, but not limited to, the following:

Text Instructions
Hyperlinks to additional data
Media (images, video, graphics, icons, etc.)
Descriptions of hyperlinks FIGS. 57A-57D are diagrams that illustrates the various Tertiary CPEI (People, Places, Projects, and Objects) 204", 206", 208", 210" Displays graphically reporting attributes.

Figure 57A:
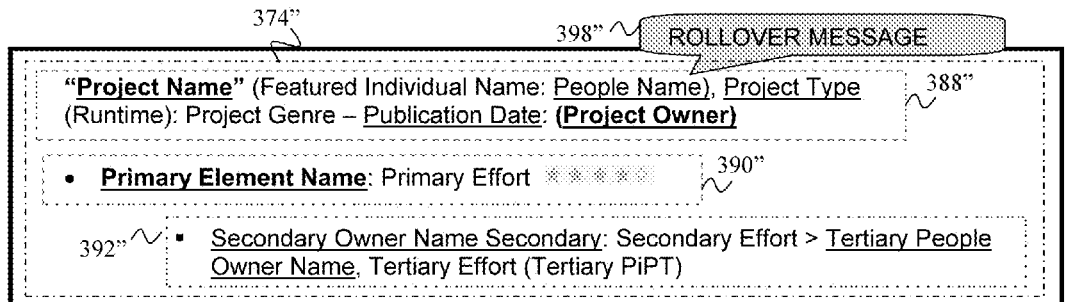
FIGS. 57A-57D illustrate Tertiary CPEI Field and Appendage Diagrams according to the above preferred embodiment of the present invention.
Figure 57B:
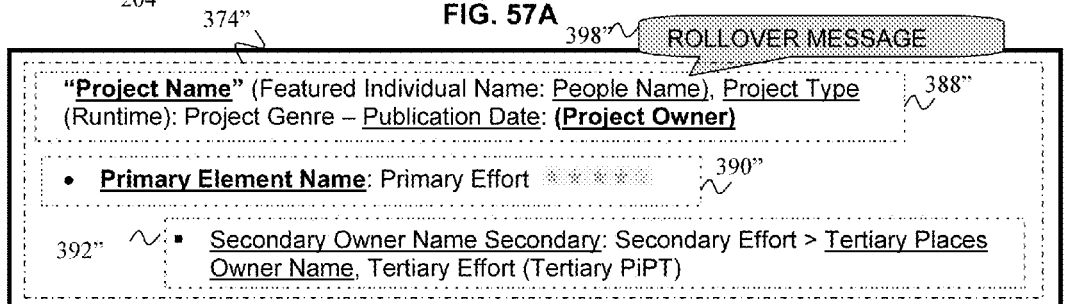
Figure 57C:
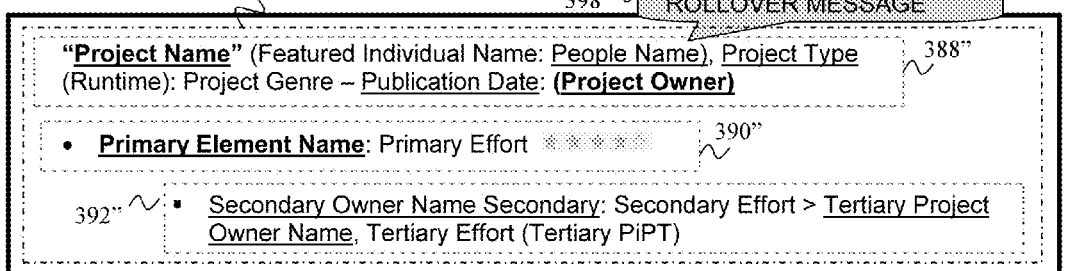
Figure 57D:
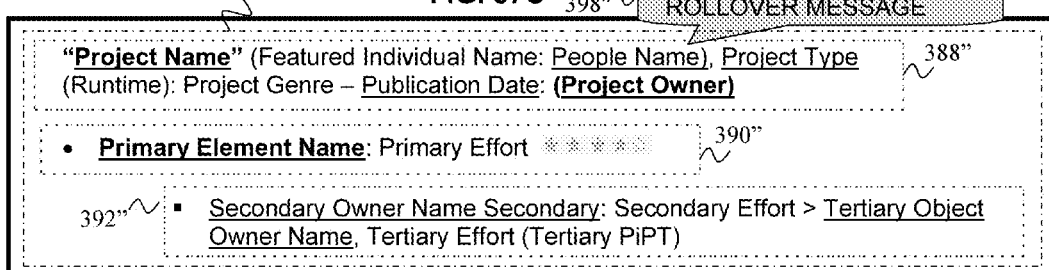

FIG. 57A illustrates that the Tertiary People CPEI 204" display includes a Formulaic Tertiary Data Fields 374" which can include, but not limited to, the following:

Tertiary People CPEI 204" owner's name
Tertiary People CPEI 204" owner's Tertiary Effort 350"
Tertiary Point In Phasetime (PiPT) 128"
Secondary Element 341" name and Secondary Effort 229"
Primary Element 340" name and Effort 153" on Primary Project 120"
Primary Project 120" name
Featured Individual (People 116") Name
Featured Individual (People 116") Type
Primary Project 120" type
Primary Project 120" genre
Primary Project 120" runtime
Primary Project 120" publication date FIG. 57B illustrates that the Tertiary Places CPEI 206" display includes Formulaic Tertiary Data Fields 374" which can include, but not limited to, the following:

Tertiary Places CPEI 206" owner's name
Tertiary Places CPEI 206" owner's Tertiary Effort 350"
Tertiary Point In Phasetime (PiPT) 128"
Secondary Element 341" name and Secondary Effort 229"
Primary Element 340" name and Effort 153" on Primary Project 120"
Primary Project 120" name
Featured Individual (People 116") Name
Featured Individual (People 116") Type
Primary Project 120" type
Primary Project 120" genre
Primary Project 120" runtime
Primary Project 120" publication date FIG. 57C illustrates that the Tertiary Project CPEI 208" display includes Formulaic Tertiary Data Fields 374" which can include, but not limited to, the following:
- Tertiary Project CPEI 208" owner's name
- Tertiary Project CPEI 208" owner's Tertiary Effort 350"
- Tertiary Point In Phasetime (PiPT) 128"
- Secondary Element 341" name and Secondary Effort 229"
- Primary Element 340" name and Effort 153" on Primary Project 120"
- Primary Project 120" name
- Featured Individual (People 116") Name
- Featured Individual (People 116") Type
- Primary Project 120" type
- Primary Project 120" genre
- Primary Project 120" runtime
- Primary Project 120" publication date FIG. 57D illustrates that a Tertiary Object CPEI 210" display includes Formulaic Tertiary Data Fields 374" which can include, but not limited to, the following:
- Tertiary Object CPEI 210" owner's name
- Tertiary Object CPEI 210" owner's Tertiary Effort 350"
- Tertiary Point In Phasetime (PiPT) 128"
- Secondary Element 341" name and Secondary Effort 229"
- Primary Element 340" name and Effort 153" on Primary Project 120"
- Primary Project 120" name
- Featured Individual (People 116") Name
- Featured Individual (People 116") Type
- Primary Project 120" type
- Primary Project 120" genre
- Primary Project 120" runtime
- Primary Project 120" publication date According to FIG. 57A, the Tertiary People CPEI 204" Displays will graphically display the following appendages:
- A Tertiary Main Effort Body 388": Displays Formulaic Tertiary Data Fields 374" pertaining to the Primary Project 120" and Primary Project Relational Data 174".
- A Tertiary Main Body Appendage One 390": Displays the Formulaic Tertiary Data Fields 374" pertaining to the Primary Element 340" to which the Secondary Element 341" is associated along with said Primary Element 340" owner's Effort 153" on the Primary Project 120", the Primary Element's 340" level rating, and the Point In Phasetime (PiPT) 128" in which the Primary Element's 340" Effort 153" occurred.
- A Tertiary Main Body Appendage Two 392": Displays the Formulaic Tertiary Data Fields 374" pertaining to the People 116" owner's Tertiary Effort 350", level rating, and the Point In Phasetime (PiPT) 128" in which the Tertiary Effort 350" occurred, as well as the Secondary Element 341" name, level rating, and Secondary Effort 229".

According to FIG. 57B, the Tertiary Places CPEI 206" Displays will graphically display the following appendages:
- Tertiary Main Effort Body 388": Displays Formulaic Tertiary Data Fields 374" pertaining to the Primary Project 120" and Primary Project Relational Data 174".
- Tertiary Main Appendage One 390": Displays the Formulaic Tertiary Data Fields 374" pertaining to the Primary Element 340" to which the Secondary Element 341" is associated along with said Primary Element 340" owner's Effort 153" on the Primary Project 120", the Primary Element's 340" level rating, and the Point In Phasetime (PiPT) 128" in which the Primary Element's 340" Effort 153" occurred.
- Tertiary Main Body Appendage Two 392": Displays the Formulaic Tertiary Data Fields 374" pertaining to the Places 118" owner's Tertiary Effort 350", level rating, and the Point In Phasetime (PiPT) 128" in which the Tertiary Effort 350" occurred, as well as the Secondary Element 341" name, level rating, and Secondary Effort 229".

According to FIG. 57C, the Tertiary Project CPEI 208" Displays will graphically display the following appendages:
- Tertiary Main Effort Body 388": Displays Formulaic Tertiary Data Fields 374" pertaining to the Primary Project2 122" (subject of the Primary CPEI) and Primary Project2's Project Relational Data 174".
- Tertiary Main Body Appendage One 390": Displays the Formulaic Tertiary Data Fields 374" pertaining to the Primary Element 340" to which the Secondary Element 101" is associated along with said Primary Element 340" owner's Effort 153" on the Primary Project 120", the Primary Element's 340" level rating, and the Point In Phasetime (PiPT) 128" in which the Primary Element's 340" Effort 153" occurred.
- Tertiary Main Body Appendage Two 392": Displays the Formulaic Tertiary Data Fields 374" pertaining to the Project 120" owner's Tertiary Effort 350", level rating, and the Point In Phasetime (PiPT) 128" in which the Tertiary Effort 350" occurred, as well as the Secondary Element 341" name, level rating, and Secondary Effort 229".

According to FIG. 57D, the Tertiary Object CPEI 210" Displays will graphically display the following appendages:
- Tertiary Main Effort Body 388": Displays Formulaic Tertiary Data Fields 374" pertaining to the Primary Project 120" and Primary Project Relational Data 174".
- Tertiary Main Body Appendage One 390": Displays the Formulaic Tertiary Data Fields 374" pertaining to the Primary Element 340" to which the Secondary Element 341" is associated along with said Primary Element 340" owner's Effort 153" on the Primary Project 120", Primary Element 340" level rating, and the Point In Phasetime (PiPT) 128" in which the Primary Element's 340" Effort 153" occurred.
- Tertiary Main Body Appendage Two 392": Displays the Formulaic Tertiary Data Fields 374" pertaining to the Object 124" owner's Tertiary Effort 350", level rating, and the Point In Phasetime (PiPT) 128" in which the Tertiary Effort 350" occurred, as well as the Secondary Element 341" name, level rating, and Secondary Effort 229".

FIGS. 57A-57D also establishes that the Formulaic Tertiary Data Fields 374" may be hyperlinks to additional data that can include, but not limited to, the following:
- Other Primary CPEI 188", 190", 192", 194" Displays
- Other Secondary CPEI 196", 198", 200", 202" Displays
- Other Tertiary CPEI 204", 206", 208", 210" Displays
- E-Commerce or consumer [Buy It Now] commerce sites
- Interactive reports
- Other general effort data
- Reviews
- Ratings
- Media (images, video, graphics, icons, etc.)

FIGS. 57A-57D also establish that the Formulaic Tertiary Data Fields 374" may access a Tertiary Rollover Messages 398" when a user "rolls over" or "mouse over" a particular Field. Said Rollover Messages may display, but not limited to, the following:
- Text Instructions
- Hyperlinks to additional data
- Media (images, video, graphics, icons, etc.)
- Descriptions of hyperlinks One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A point in phasetime system for reporting at least an effort of an element on an end product from a group including art, industry, and nature by a point in phasetime thereof within an appropriate phase of development thereof, wherein the point in phasetime method reports efforts for past, present, and future projects by the effort's phasetime macro, micro, and nano points in phasetime views, wherein the point in phasetime system comprises:
- a master computer, housing a relational phasetime database, for receiving and storing points in phasetime data on a development event and efforts of elements related to a project development of an end product, receiving and storing element effort data and phasetime data thereof in the phasetime database as to a phase of development thereof, receiving and storing general profile data on elements having development event efforts in the project development of a product, structuring effort and phasetime data as to the number and types of phases in the project development of the product, and reporting the phasetime data in a phasetime matrix report;
- a mode of communication, including a computerized device, for scientifically gathering phasetime effort data for elements having project development event efforts on the end product;
- a client machine electronically linked to the master computer for submitting points in phasetime effort data for elements having project development event efforts, querying the phasetime database and receiving a search return report from the phasetime database with a link to a phasetime matrix report of a selected element; and
- a search system wherein element development efforts and phasetime data are queried by the client machine, retrieved from the phasetime database of the master computer by a phasetime report generator module, and dynamically reported to the client machine;
- wherein the phasetime matrix report includes a project header, a phasetime matrix, and a matrix point in phasetime effort, wherein the phasetime matrix and the matrix point in phasetime effort form a two-dimensional graphical display with three-dimensional attributes that appears in two interactive windows at least displaying data regarding a project's phases of development and start and end date timeframes thereof, and an element's effort and point in phasetime of the element effort, which is proportionally displayed within a context of the effort's appropriate phase of production development, an arrow of phasetime x-axis which graphically depicts a project's past, present, and future phase of development, a graphical display of other element efforts in that same phase of development, and a graphical display that accesses effort's phasetime macro, micro, and nano storyline views; wherein the phasetime matrix at least comprises: a first part, wherein matrix header displays a project name, past, present, and future indicator icons indicating if the reported project is a past project already published, a present project currently in production for which a release date has been contracted, or a future project not yet in production but for which a projected release date has been contracted, and macro, micro and nano indicator icons indicating if the reported effort is a phasetime macro landscape view, a phasetime micro portrait view, or a phasetime nano close-up view; a second part, a phasetime matrix window segment, comprising an effort owner's name and effort, a production artifacts link, an effort owner's point of contact, a y axis vertically displaying all the phases of production in the project's development, selecting from a group including concept development, pre-production, production, post production, manufacturing/distribution/promotion, and post manufacturing/distribution/promotion; an x axis horizontally comprising an arrow of phasetime which is divided into segments that correspond to a duration of each of the production phasetimes on a project, with an arrow pointing left indicating past project data, an arrow pointing right indicating future project data, and a clockworks function that tracks both project phasetimes and product content runtimes wherein individual arrow of phasetime clockwork icons representing each phase of development of the project enable a browser to access phasetime macro, micro, and nano views for display within the lower third section of the phasetime matrix; an open phase box indicator wherein proportional box size graphically approximates the duration of a development phasetime's reported start and end dates for each development phasetime reported by an x axis arrow of phasetime and y axis phasetime designations; a shaded phase box inside the open phase box depicting an effort's start and end dates and in which phasetime the effort occurred, a third part, a phasetime point in phasetime effort window segment which interacts with part two's arrow of phasetime, comprising a window automatically displaying efforts of other elements with efforts occurring within the same phase of development as the owner's effort which appears in part two's effort display box, with links from those other element efforts to that element's effort report; a window dynamically displaying other element efforts which occurred on the same project within different phases of development when a user rolls over and clicks on an open phase box in part two's phasetime matrix window with links from each of those displayed other element efforts to that element's individual effort report; and a window dynamically displaying all element efforts which occurred on the same project in all phases of development with phasetime macro, micro, and nano storyline views when a user rolls over and clicks on an appropriate arrow of phasetime clockworks icon from which a user then accesses a selected storyboard beats in phasetime macro, micro, and nano storyline view.

2. The system, as recited in claim 1, further comprising a storyboard beats in phasetime player which at least displays an element's phasetime macro, micro, and nano views according to the storyboard beats in phasetime for past, present, and future projects/products for an element having a production development effort on a published project or on a project with a publication date, wherein production data are processed by a storyline editor wherein hierarchical and relational storyline data views are mapped, stored by, and accessed through effortology editorial keys by an effortologist who edits effort data per appropriate storyline beats in phasetime rules and procedures, wherein the storyboard beats in phasetime player comprises: a header section displaying storyboard attributes including report name, effort owner's name, point in phasetime view being displayed in the storyboard, project name, and a featured individuals on the project; a center section for the display of phasetime macro, micro, and nano storyline views, which views of an element's effort are accessed through a beats in phasetime storylinevent icon that has been processed by a storyline editor, a phasetime macro landscape view that is a storyline product overview wherein beats in phasetime associate an element's effort instance to appropriate phasetime macro landscape view attributes, as determined by an effortologist, which are comprised of hi-line micro view data of the element's development event instance, a phasetime micro portrait view that is a storyline product micro sequence wherein beats in phasetime associate an element's effort instance to appropriate phasetime micro portrait view attributes which are comprised of hi-line nano view data of the element's development event instance, and a phasetime nano close-up view that is a storyline product nano blueprint wherein beats in phasetime link an element's effort instance to appropriate phasetime nano close-up attributes which are comprised of nano view data of each element's development event instance, which are then associated to a storyboard's beats in phasetime storylinevent icon, a lower section displaying (a) a micro points in phasetime link enabling a user to link to and view people, places, projects, and objects elements who have a macro, micro or nano storyboard beats in phasetime report on the project, (b) search arrow of phasetime links allowing the user to search the phases of a project's development, the past, present and future development phases of the published product, and the phasetime macro, micro, and nano attributes for said project and c) an effortology editorial key that at least enables the user to select hierarchical and relational storyboard beats in phasetime reports by storylinevents wherein storylineffforts and storylinefx have had an effect on the product's storyline, which enables the user to access a story behind the effort and the beats in phasetime for the subject project, and furthermore, an effortology editorial key allowing the user to alter said storyboard storyline report which includes the storylinevents, storylineffforts, storylinefx, and the story behind the efforts, and view the altered storyline report in the storyboard beats in phasetime.

3. The system, as recited in claim 1, further comprising a live Dual Validated Independently Verified Dynamic (DVIVD) Match Audit System which comprises:
a first device for transmitting element effort event data, which data details an effort of an element on an event, and a source data exhibit;
a second device for receiving the element effort event data and the source data exhibit; and
a computerized device for storing said element effort event data in a repository database and said source data exhibit in an exhibit database, for validating and independently verifying said element effort event data utilizing a real time match audit method for collecting, examining, and tracking said element effort event data assigning dataset fulfillment audit levels to said element effort event data, and reporting said element effort event data in an audited report.

4. The system, as recited in claim 3, wherein the element effort event data are validated and independently verified utilizing a real time match audit method comprising the steps of:

receiving and examining said element effort event data;
inputting the element effort event data in said repository database and source data exhibit in the exhibit database in the computerized device;
validating and independently verifying the effort event data which have been accurately inputted into the repository database, and furthermore verifying the effort event data in the repository database matches the effort event source data exhibit in the exhibit database by a first semi-automated audit process;
migrating the effort event data from the repository database into a staging area upon approval of the first audit process;
assigning a dataset fulfillment audit level to the effort event data by a system auditor; and
migrating the effort event data from the staging area into a core database in the computerized device at the dataset fulfillment audit level upon auditor approval.

5. The system, as recited in claim 4, wherein said element effort event data are further validated and independently verified by a fully automated second audit process comprising the steps of:
auditing the effort event data and the effort event data audit levels reported from the core database against the effort event data and the effort event data audit levels in the repository database:
reporting an audit match or an audit mismatch resulting from the second audit process of the effort event data reported from the core database against the effort event data in the repository database;
reporting a database location of any the audit mismatch resulting from the second audit process;
making any required corrections in the core database or the repository database when a mismatch occurs;
reporting an audited Conjoined Project Effort Instance (CPEI) display of the effort event data by a data generating module upon query, whether the effort event data was inputted by an effort owner directly or whether the effort event data was dynamically generated by the system's method automatically from the effort event data inputted by other the elements;
displaying an icon according to system rules and auditing processes when reporting the CPEI which delineates the effort acknowledged by an event project owner as a credited effort from the effort not acknowledged by the event project owner as the credited effort; and
transmitting the audited CPEI to a client machine for display with the accompanying icon indicating the CPEI audit level and whether the CPEI displayed is said effort or is the credited effort.

6. The system, as recited in claim 1, further comprising a formulaic virtual data matrix system built upon said core database, wherein the formulaic virtual data matrix system, upon query, automatically associates the element effort event data to other the element effort event data according to the element effort event data respective points in phasetime through simple and complex associations, enabling the CPEI data generating modules to dynamically generate dimensional CPEI data reporting for the queried targeted element, the CPEI data generating modules, at least including:
a people (PP) primary CPEI module, a people secondary CPEI module, a people tertiary CPEI module, a people auto CPEI module, and a people auto inference module for reporting a past, present, and future people CPEI report;
a places (PL) primary CPEI module, a places secondary CPEI module, a places Tertiary CPEI module, a places auto CPEI module, and a places auto inference module for reporting a past, present, and future places CPEI report;

a project (PR) primary CPEI module, a project secondary CPEI module, a project tertiary CPEI module, a project auto CPEI module, and a project auto inference module for reporting a past, present, and future project CPEI report; and an object (OB) primary CPEI module, an object secondary CPEI module, an object tertiary CPEI module, an object auto CPEI module, and an object auto inference module for reporting a past, present, and future object CPEI report.

7. The system, as recited in claim 6, wherein the dimensional CPEI data reports are reported in a multitude of well-formatted, functional, and interaction designed published formulaic conjoined project effort instance report displays, per the CPEI reporting system modules, and per the formulaic infrastructure and syntax display rules, wherein the CPEI report dataset displays at least comprises:

element effort event data element attributes selected featured individuals unfulfilled data field rollover messages hyperlinks from the CPEI report displaying formula natural language primitives: who, what, whom, where, why, how, and PiPT, to other the element effort event data CPEI reports displaying:

who did what in phasetime programmed formulaic report displays for the primary CPEI, the secondary CPEI, and the tertiary CPEI, wherein the formulaic report displays further comprises at least:

a main effort body displaying a project and project attributes for all said effort displays, at least two lower appendages for displaying primary efforts, a first appendage displaying said primary element effort, said primary effort level ratings, and said primary effort point in phasetime, and a second appendage displaying associated elements, at least two upper appendages for displaying the secondary efforts, a first appendage displaying the secondary element effort, the secondary effort level rating, and the secondary effort point in phasetime, and a second appendage displaying the primary element to which the secondary element effort is associated, along with the primary element effort and the primary element effort point in phasetime, and at least two upper appendages for displaying the tertiary efforts, a first appendage displaying at least the tertiary element effort, the tertiary effort level rating, and the tertiary effort point in phasetime, as well as the secondary element name, and the secondary element effort to which the tertiary effort is associated, and a second upper appendage displaying the primary element name to which the secondary element is associated, the primary element effort, the primary element point in phasetime, and the primary element level rating, wherein the well-formatted, functional, and interaction designed published formulaic CPEI report displays may vary in formula displayed data and content configuration according to the formulaic infrastructure and syntax display rules, and the well-formatted, functional, and interaction designed published formulaic CPEI report display appendages may vary in display order and alpha numeric line notation according to the formulaic infrastructure and syntax display rules.

\* \* \* \* \*